United States Patent [19]

Butler et al.

[11] Patent Number: 4,639,557
[45] Date of Patent: Jan. 27, 1987

[54] REMOTE TESTING SYSTEM FOR ELECTRICAL CIRCUITS

[75] Inventors: Myron C. Butler, Edmond, Okla.; William R. Hilligoss; Lawrence O. Hilligoss, both of Ashland, Oreg.

[73] Assignee: Communications Technology Corporation, Los Angeles, Calif.

[21] Appl. No.: 781,412

[22] Filed: Sep. 27, 1985

[51] Int. Cl.[4] .............................................. H04B 3/46
[52] U.S. Cl. ........................................ 379/29; 379/18
[58] Field of Search ............... 179/175.2 C, 175.2 R, 179/175.2 A, 175.2 B, 175.3 R, 175.3 F; 340/514, 657

[56] References Cited

U.S. PATENT DOCUMENTS 3,822,367  7/1974  Humphrey ................... 179/175.3 R
4,076,970  2/1978  Lubarsky, Jr. et al. ..... 179/175.2 R

OTHER PUBLICATIONS

"The Bell System Technical Journal, Jul.–Aug. 1982" pp. 1209–1274: Mechanized Loop Testing Strategies and Techniques, F. J. Uhrbane; and Mechanized Loop Testing Design, O. B. Dale, T. W. Robinson and E. J. Theriot; and Second–Generation Mechanized Loop Testing System—A Distributed Microprocessor Application, H. Rubin.
16.9.7 Switched Maintenance Access Systems for Special Service Circuits.
16.9.8 Switched Access Remote Test System (SARTS).
37100 Centralised Remote Access and Test System for Voice and Data Circuits, Hewlett Packard.
Solutions for Telecommunications and Datacommunications, Hewlett Packard–37050S FDM Network Monitoring System (6/83); Hewlett-Packard Telecommunications Test Equipment.
Digital/Analog Remote Test System Model 100R-7, DARTS, Design Development, Inc.
Model 9900 Series CMTS System, Wiltron.

Primary Examiner—Stafford D. Schreyer
Attorney, Agent, or Firm—Laney, Dougherty, Hessin & Beavers

[57] ABSTRACT

An apparatus for remotely testing electrical circuits, such as telephone circuits, includes a stand-alone unit which is located in the end office, for example, for remote access by use of an ordinary push-button telephone set sending dual tone multiple frequency signals. The apparatus has a twin-bus structure wherein one of the busses is an analog bus through which the telephone link is made and over which analog test signals are communicated; the other bus is a digital bus for communicating digital control and data signals with a microcomputer included within the apparatus. Operating between the two busses are suitable interface circuits for receiving the control signals from the telephone set and for communicating the analog test signals to a selected electrical circuit to be tested. The analog test signals are generated by an analog test signal circuit also connected between the analog and digital busses. The microcomputer, connected only to the digital bus, controls the operation of the apparatus in response to dual tone multiple frequency control signals received from the telephone set. Responses from the test are transmitted to the remote site as synthesized speech signals for verbally communicating the results through the telephone set.

20 Claims, 56 Drawing Figures

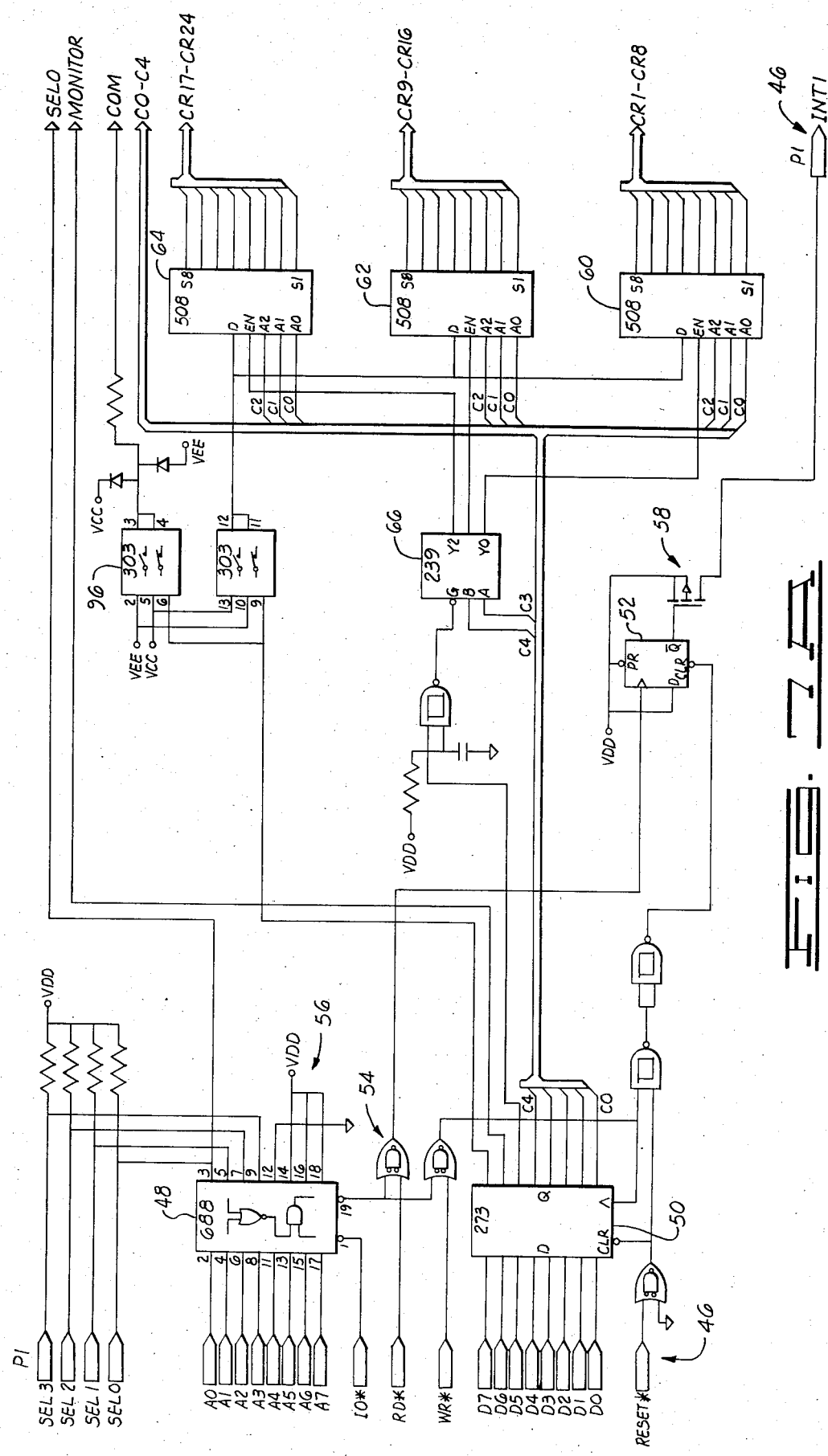

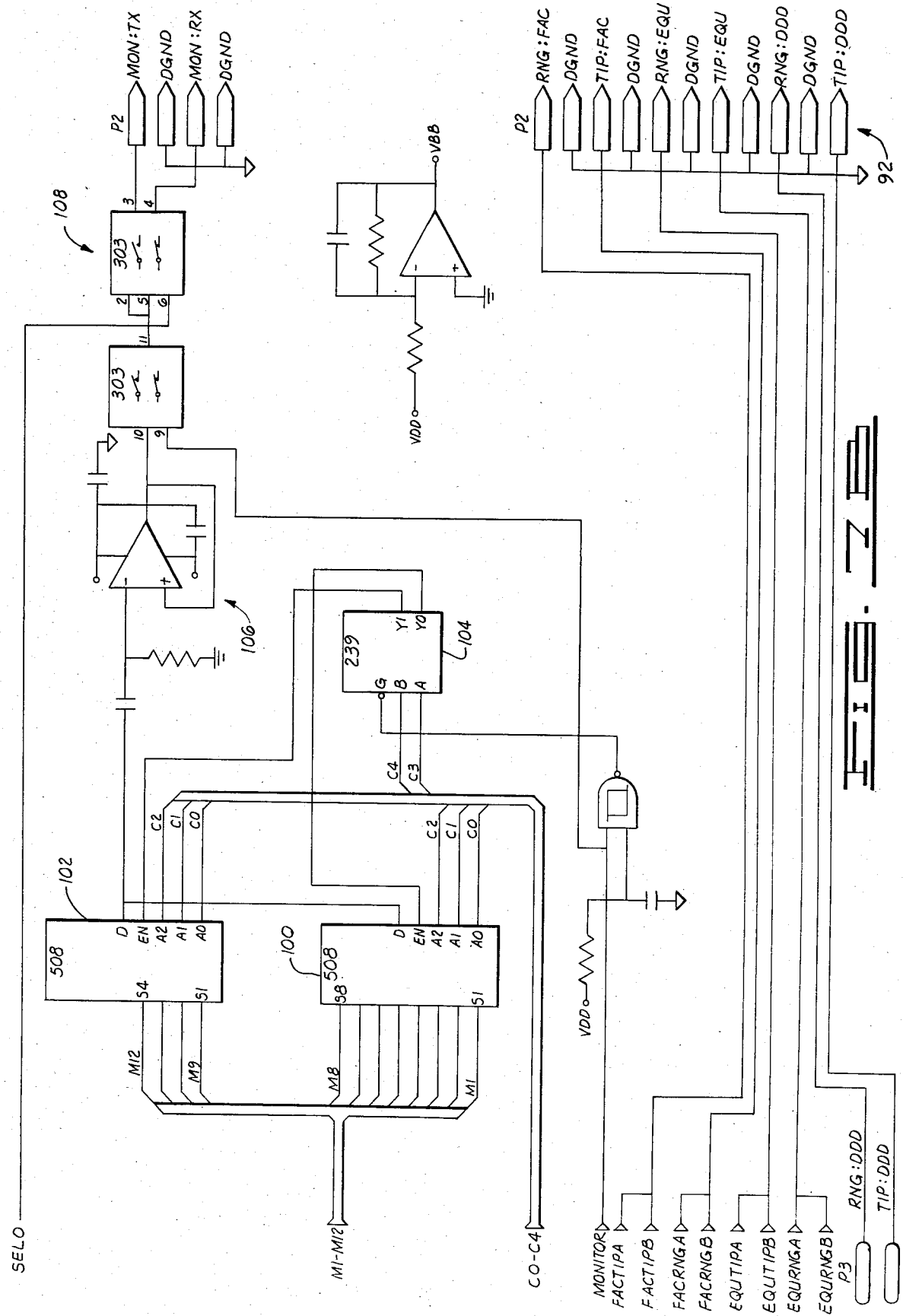

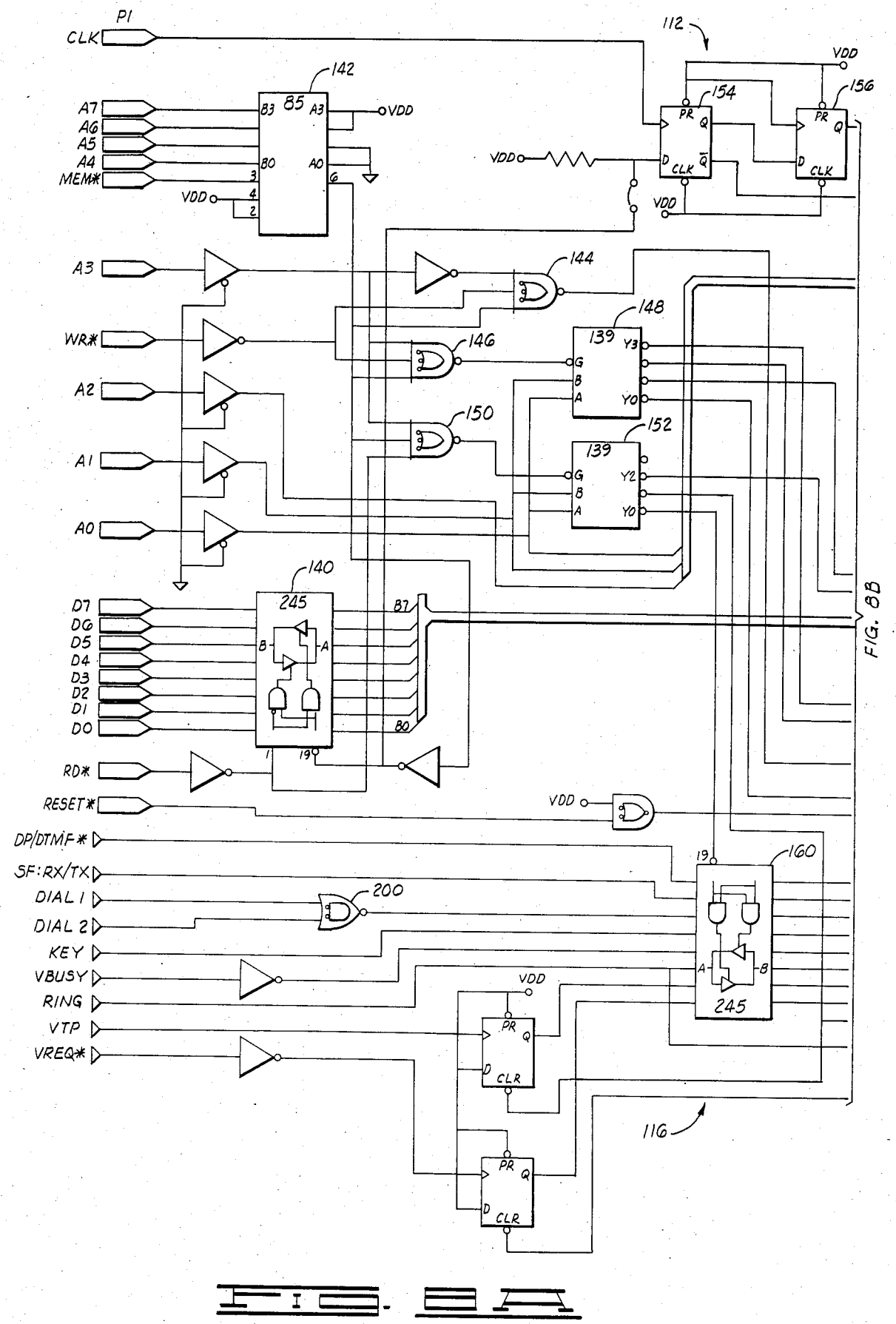

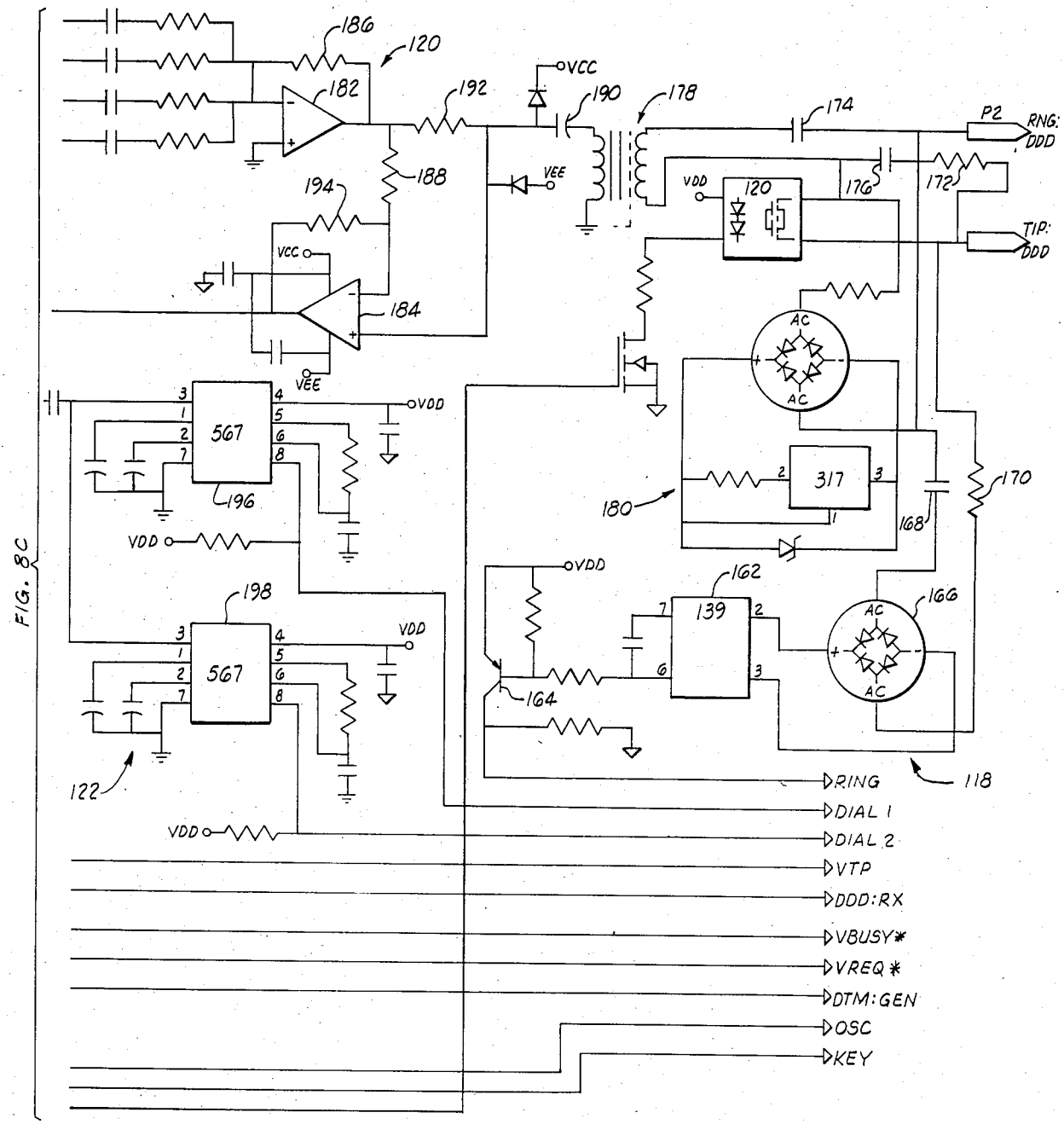

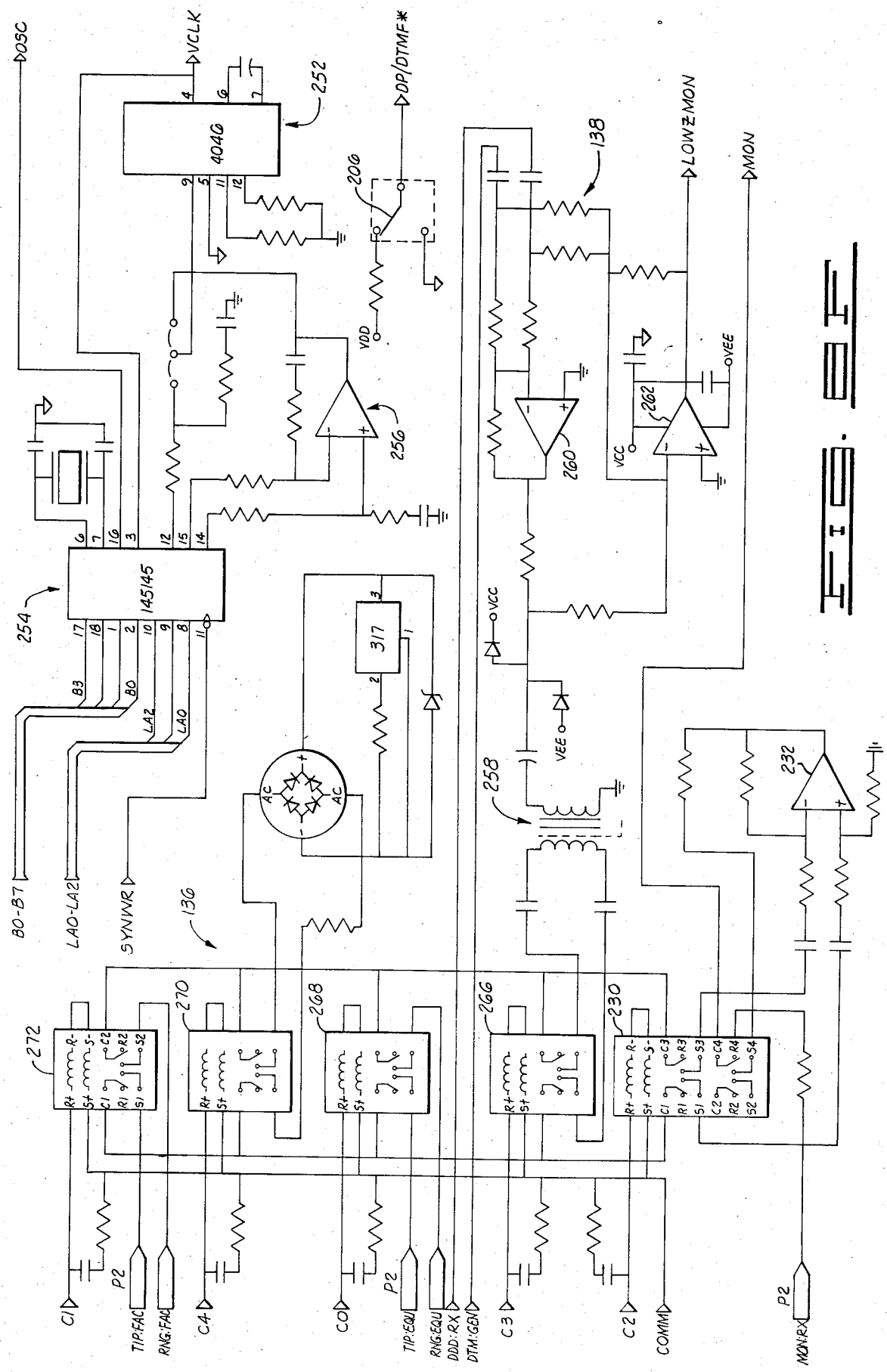

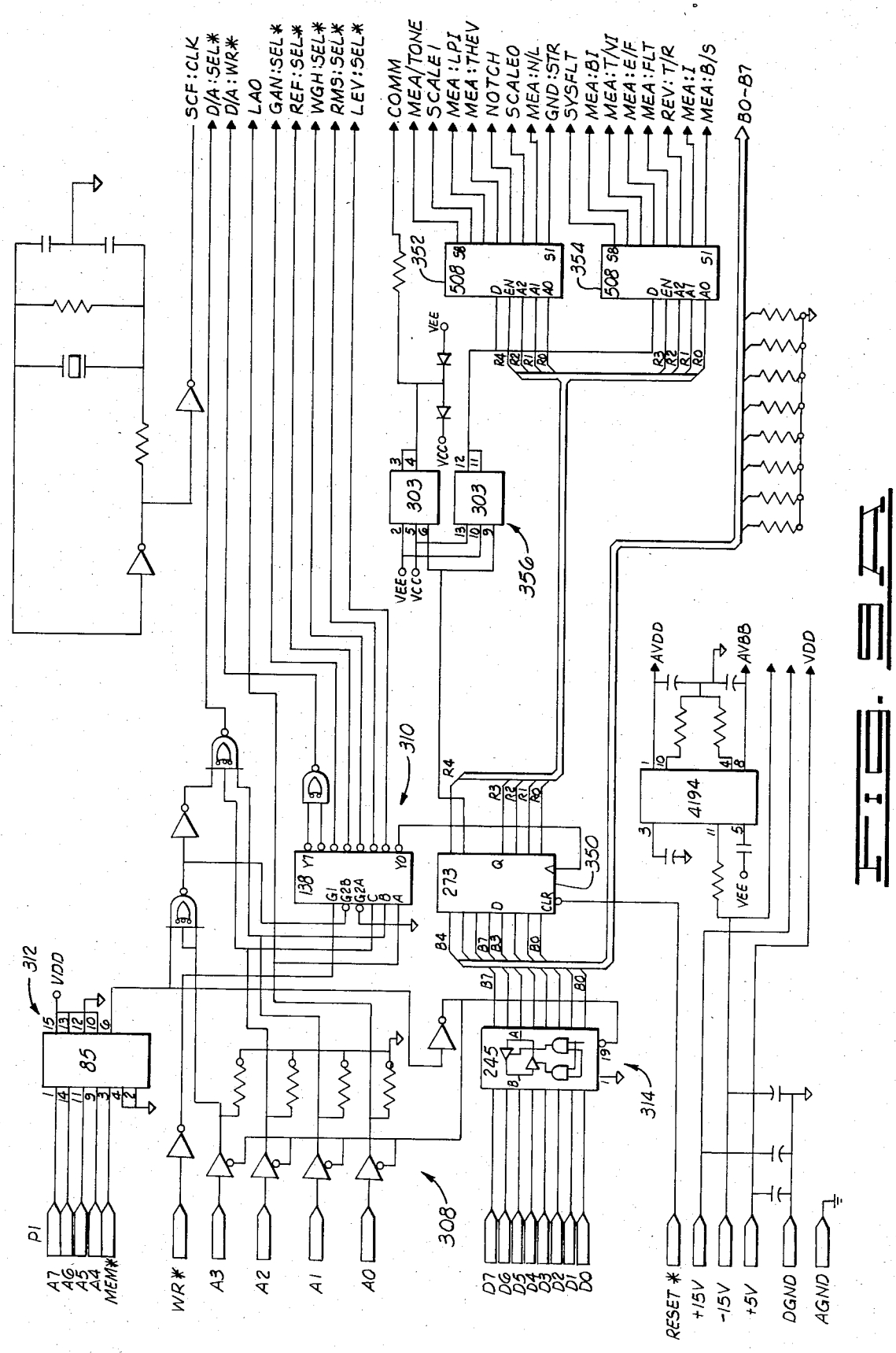

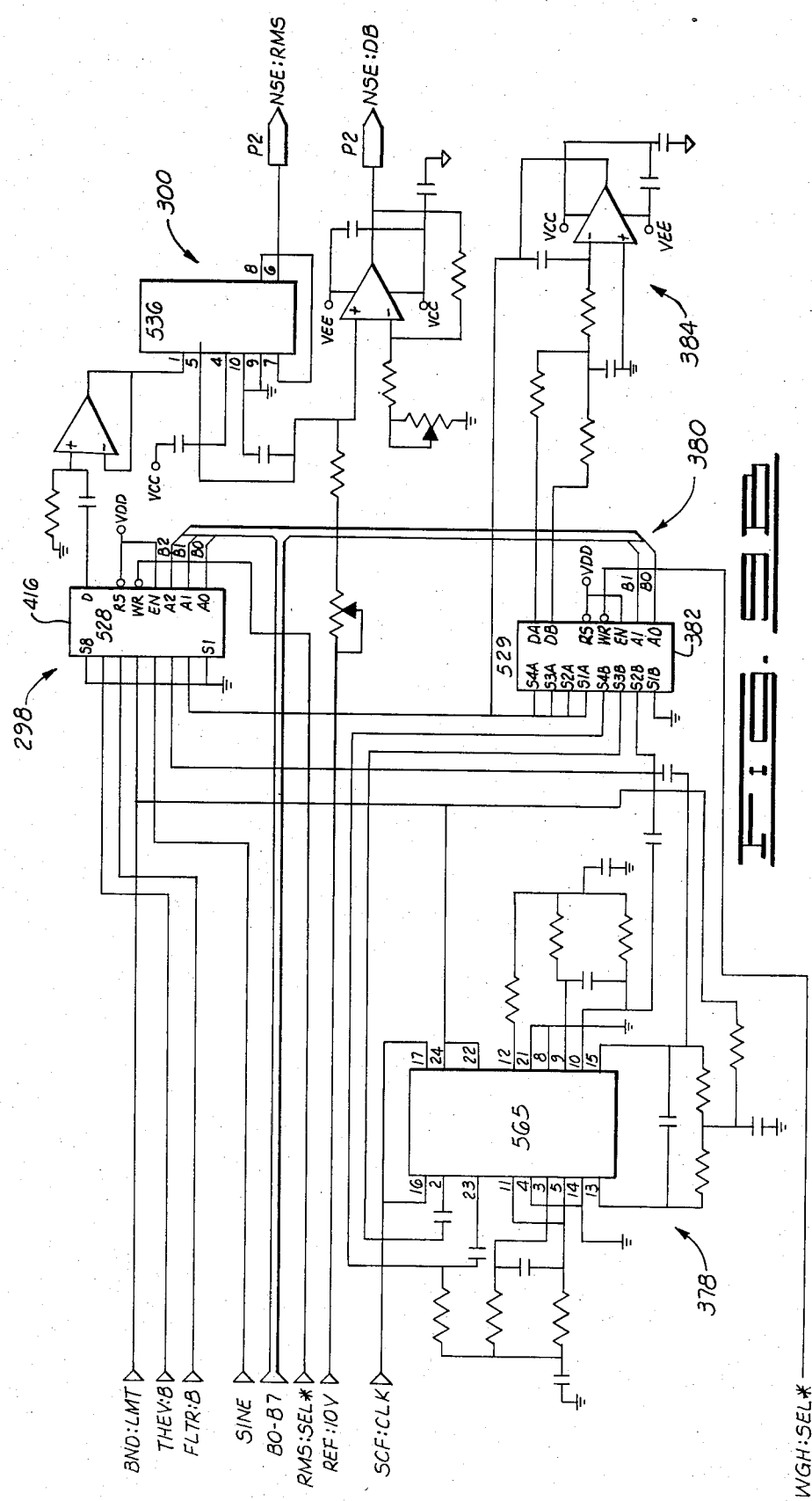

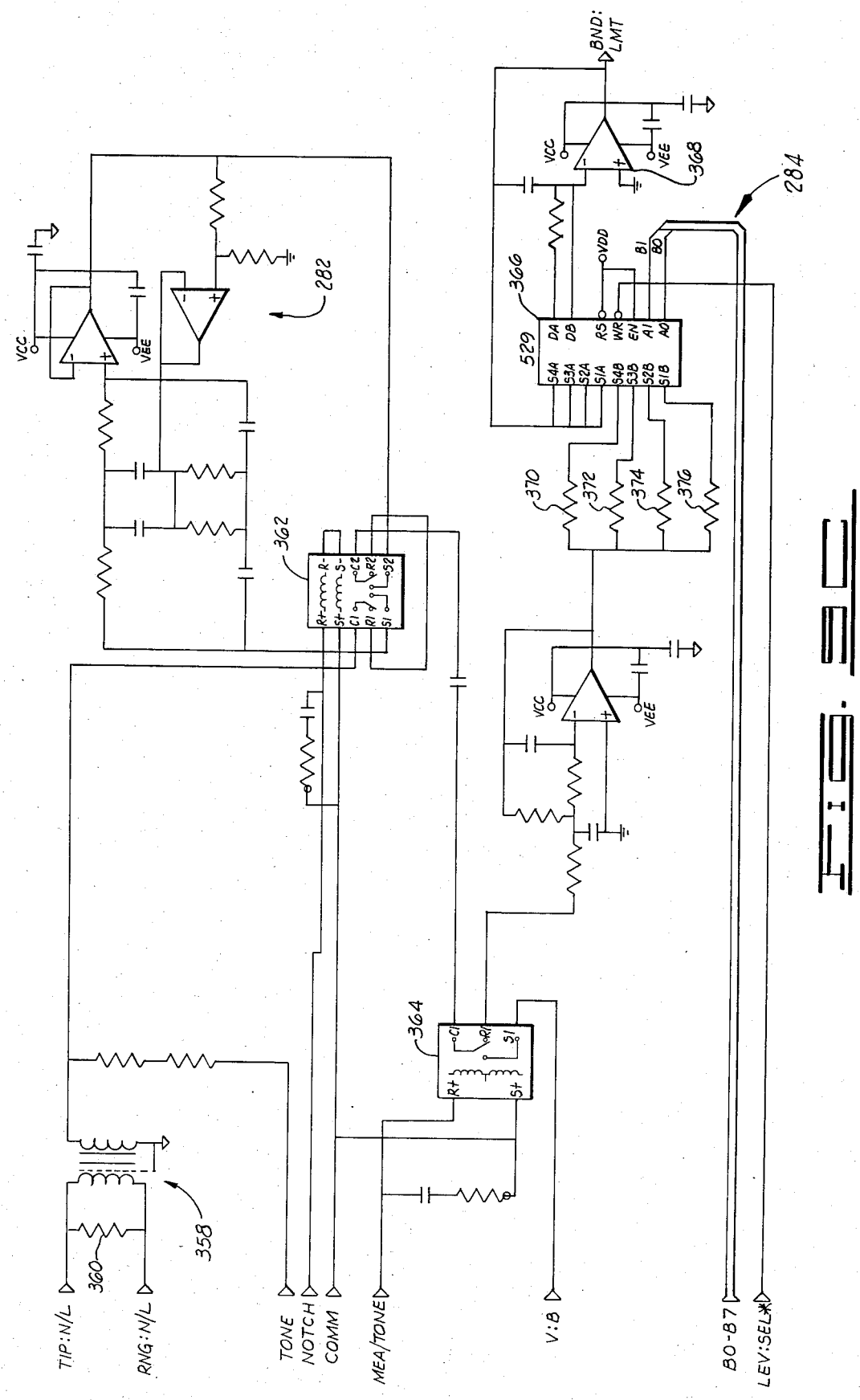

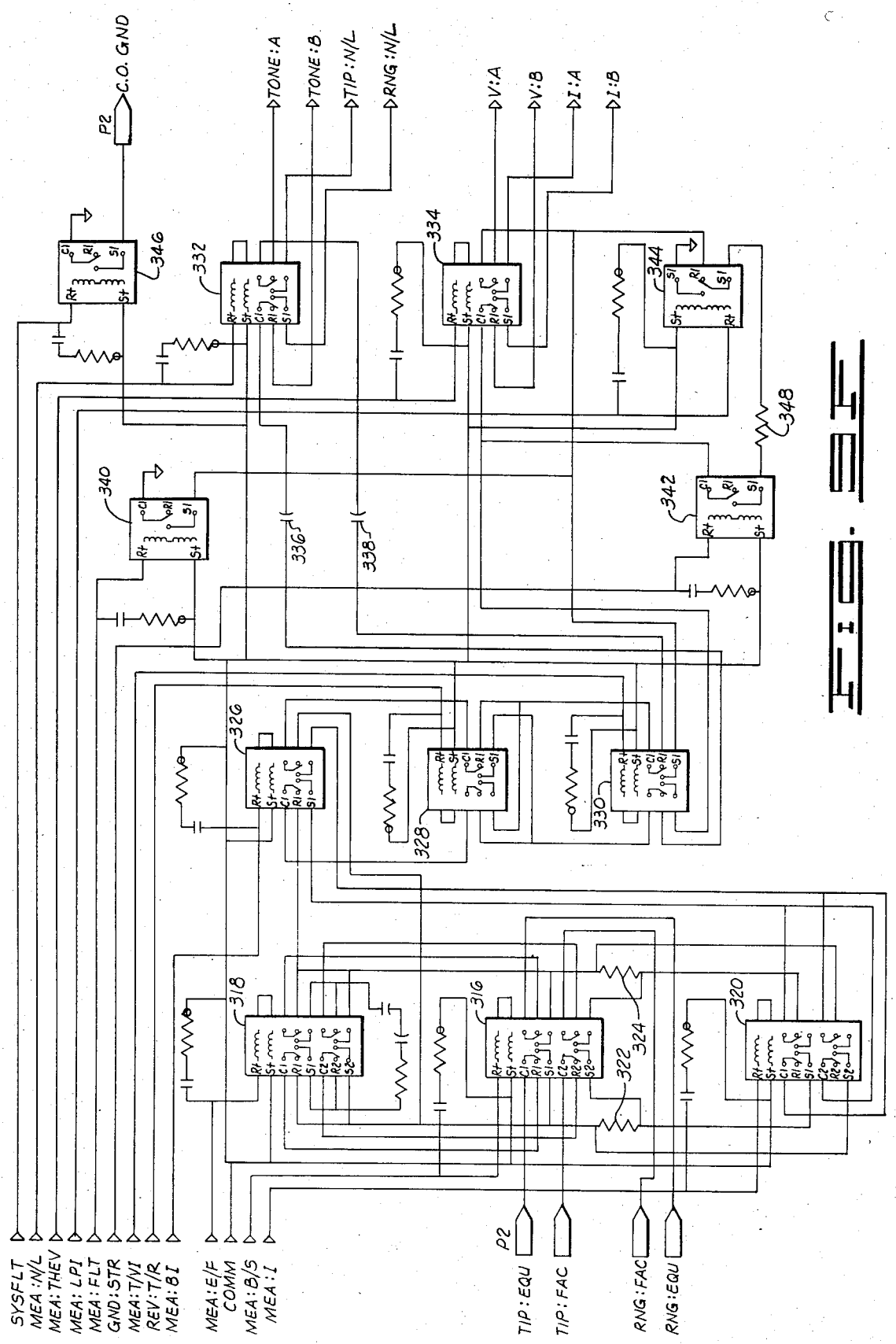

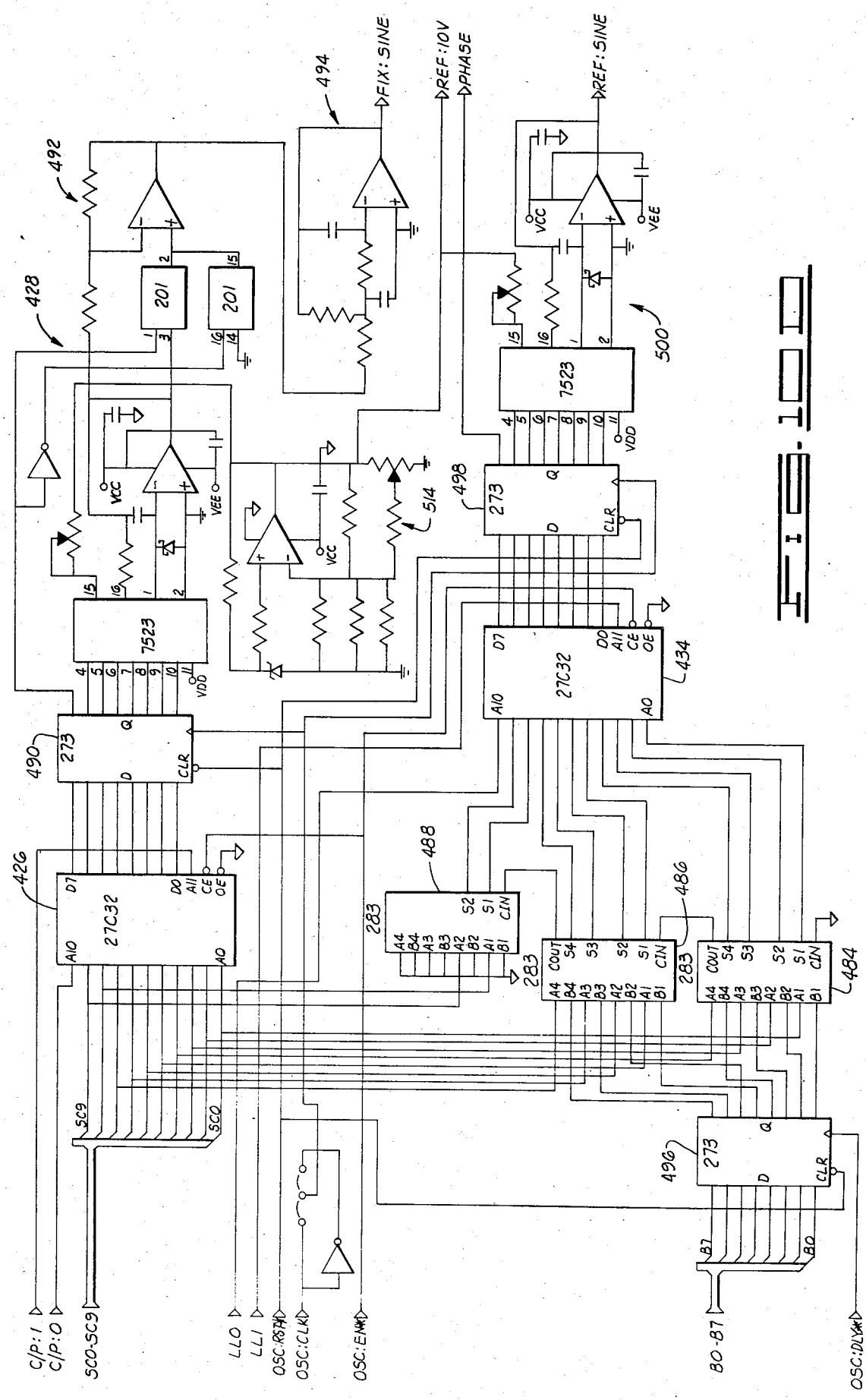

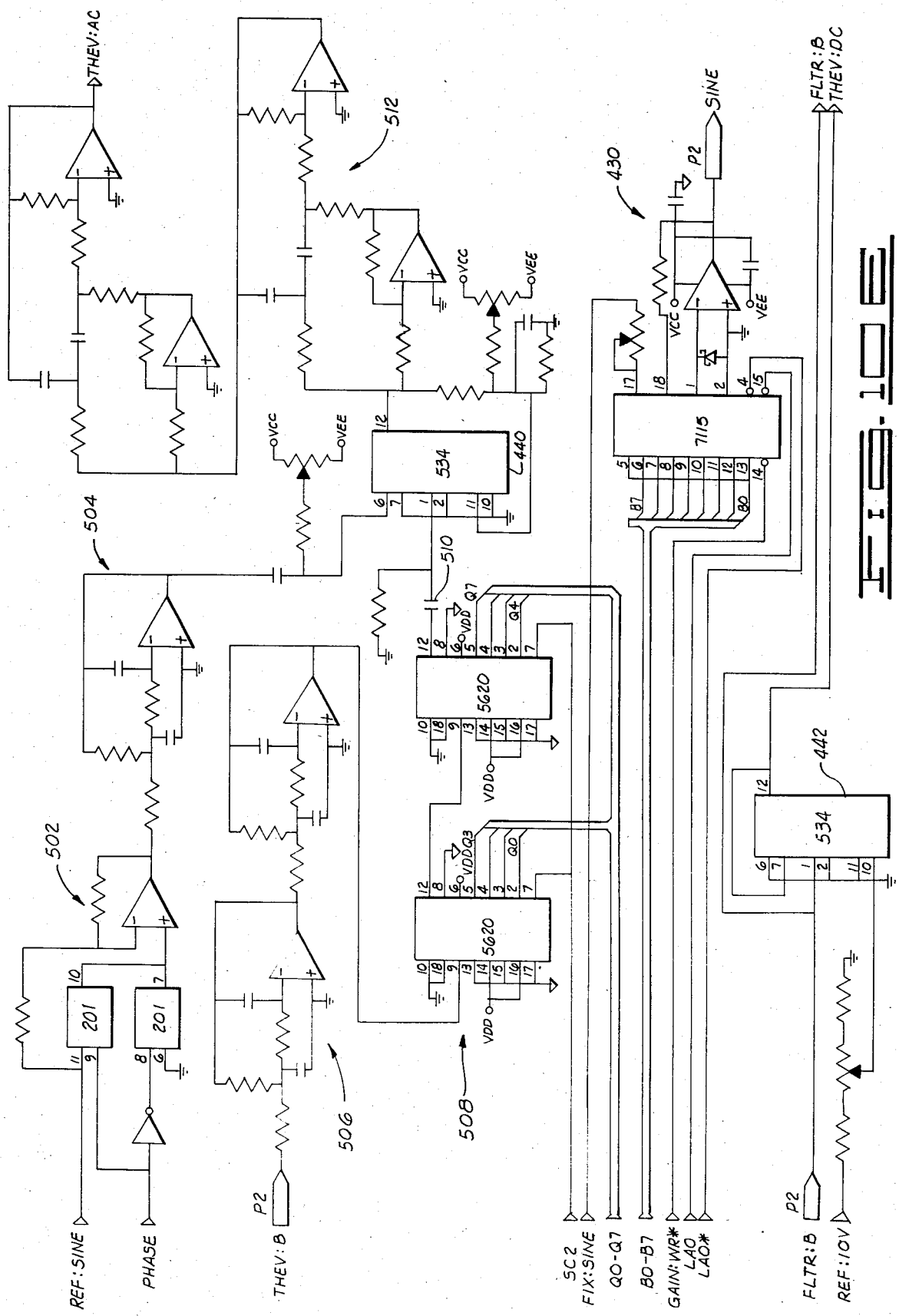

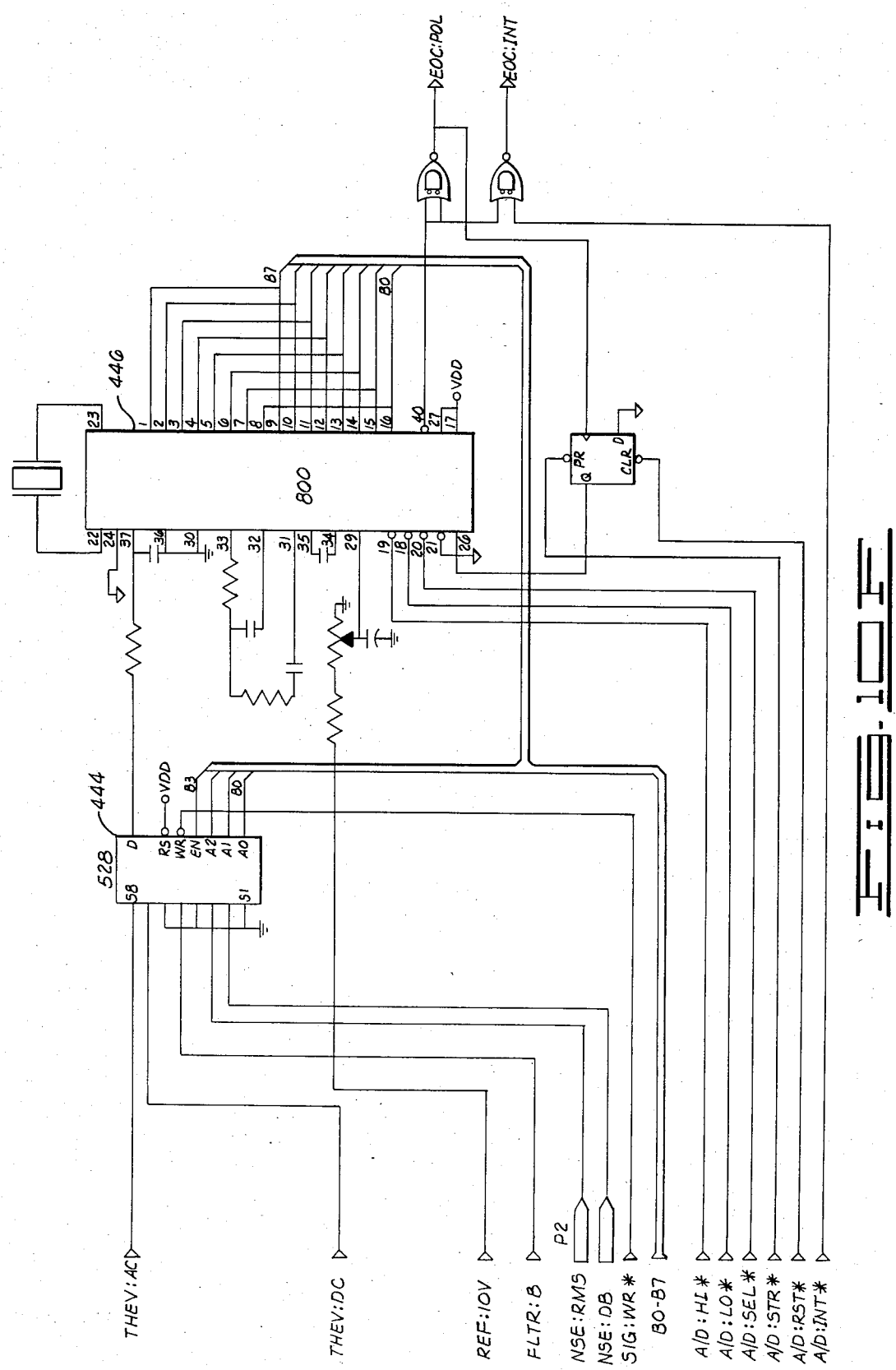

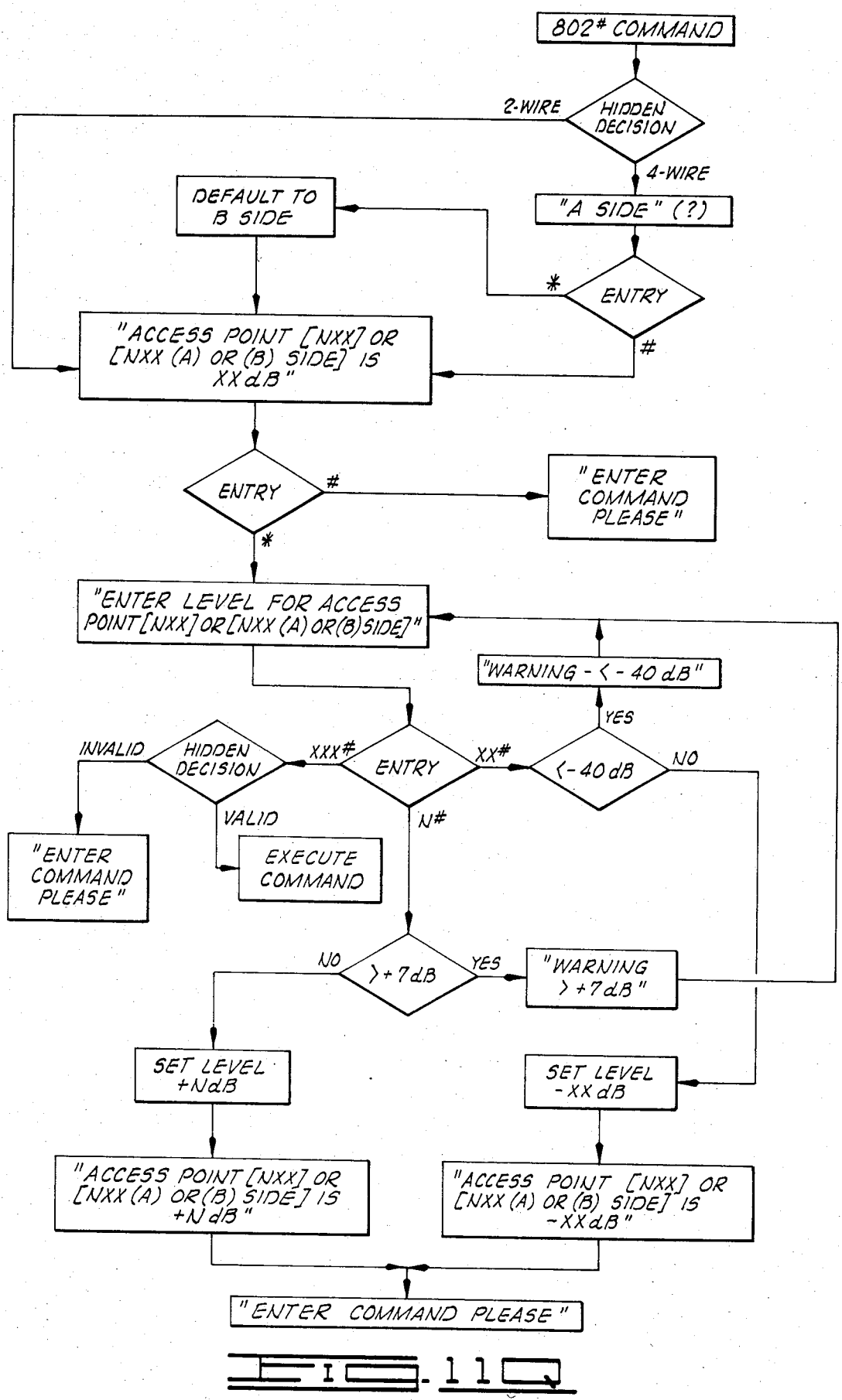

REMOTE TESTING SYSTEM FOR ELECTRICAL CIRCUITS

BACKGROUND OF THE INVENTION

This invention relates generally to apparatus and methods for remotely testing electrical circuits and more particularly, but not by way of limitation, to apparatus and methods for controlling from a remote location the testing of special service or private line telephone circuits passing through a common local location.

The need to test electrical circuits, particularly leased special service telephone circuits, has been recognized for many years. With regard to such leased telephone circuits, for example, testing a circuit line to determine the physical location where a problem exists saves money because maintenance personnel can then be more efficiently utilized. By remotely conducting such tests from a common test location, problems can be more quickly solved for better satisfying users of such leased private line telephone services.

One system which has been used to test special service/private line circuits utilizes test boards to which each testable circuit is physically, manually connectible to other circuits or test equipment by plugs and jacks. This technique has the shortcoming of requiring a large space where the test jacks and the hard wiring from the circuits can be maintained.

Automated or mechanized systems have also been developed and used in remotely testing telephone circuits. Many of these systems are large so that they can handle large portions of the telephone network. Some systems are somewhat smaller. However, one feature common to each of these test systems known to us is their requirement for a central computer to control the testing. The need for such a central computer makes these systems relatively expensive and necessitates that adequate communication links be established between the computer and the test equipment of the particular system. That is, where a central computer is used, it is located at a single location so that the operator needs to work from that location or otherwise arrange for multiple communication with both the central computer and the test circuitry.

These systems known to us also require relatively high quality conditioned communication links to handle the synchronous data transmissions where communications are between digital machines and where information is digitally transmitted to visual displays such as cathode ray tube terminals and/or hard copy printers. All of the described prior systems require the use of modems. Communications from these systems are in ASCII or FSK format; none are by synthesized speech verbally communicating the test results.

Another shortcoming of these systems is that many, if not all, are too costly for small-scale applications where the need for testing exists, but where only a few circuits to be tested are in use. One example of such an application could be a small or rural community having a telephone central office from which only a few special service circuits are provided to customers.

Still another shortcoming of many of these systems is that they require extensive training of personnel to properly operate the central computer-based systems.

One large testing system is utilized by the automated repair service bureau of the Bell System. This bureau includes a mechanized loop testing (MLT) system used to test switched telephone circuits. Another type of loop testing system which is automated is disclosed in U.S. Pat. No. 4,076,970 to Lubarsky, Jr. et al.

Another part of the Bell System circuit maintenance network is the switched access remote test system (SARTS) which utilizes switched maintenance access systems (SMAS) for special service circuits and which also uses remote test systems (RTS).

We are also aware of two test systems provided by Hewlett-Packard. These are the 37100 centralized remote access and test system for voice and data circuits and the 37050S FDM network monitoring system. Both of these are central computer-based systems. The 37100 system utilizes a minicomputer system for maintaining remote control. It also includes access modules and test and measurement units located at the local station for connecting with the circuits to be tested.

Two other systems known to us of particular pertinence because they are disclosed as being for use with relatively small telephone central offices which are to be remotely tested are the Wiltron Model 9900 series centralized maintenance test system and the Design Development, Inc. digital/analog remote test system Model 100R-7. Although these are disclosed to be for smaller applications, they both still utilize centrally located computer systems for controlling the testing and they both require large quantities of on-line memory.

Publications more specifically describing the aforementioned systems and Form PTO-1449 are submitted concurrently with the filing of this application.

In view of the foregoing, there is the need for a less costly test system whereby locations having only a small number of circuits can be accommodated so that these few circuits can be adequately tested to obtain the well-known advantages of faster and cheaper maintenance brought about by having the capability of remote testing. One example of such a location includes end telephone offices having a relatively small number of 2-wire and/or 4-wire special service or private line circuits extending therefrom to the subscribers. Another example of where such a test system is needed within the specific telephone context is at a large subscriber installation where subscriber loop carrier facilities are installed at the subscriber's premises. Again within the telephone context, a preferred embodiment of such a test system should be capable of stand-alone operation so that it does not need to accommodate special or proprietary computer or communications protocols.

To make such a desired system less costly, the system should be designed so that it does not require or use a single central computer to control a number of different units at different locations. However, such a system should still have the ability to comprehensively test the circuits, but without requiring complicated human control or training. Such a system should also be compatible with other mechanized testing systems. While meeting these needs, it is also desirable for such a system to be "smart" enough to "remember" previous transmission or other desired parameters which might need to be varied. This would allow the system to be easily modified and yet the operator would not need to continually re-enter the same parameters every time a test is conducted if such parameters were not changed. Furthermore, it is desirable to have voice communications of the test results provided to the operator over this system, thereby enhancing the ease of using the system while obviating the need for data quality transmission links.

SUMMARY OF THE INVENTION

The present invention overcomes the above-noted and other shortcomings of the prior art by providing a novel and improved apparatus and method for remotely testing electrical circuits. The system of the present invention is relatively less expensive than other systems known to us; therefore, it can be used in many smaller applications not economically served by such present systems known to us. However, the present invention provides a large number of testing capabilities, but without the need for extensive operator training and without any understanding of operating a computer or a computer terminal because the entire testing and reporting performed through the present invention can be made through a push-button telephone set, or voice terminal, in the preferred embodiment. Specifically, commands are entered by actuation of the dual tone, multiple frequency pad of the telephone set, and test reports are made by audible synthesized voice transmissions. The present invention also has the capability of evolving test parameters for individual locations or circuits by using an evolutionary data base automatically updated as new parameters are entered.

In the preferred embodiment the present invention provides a stand-alone, remotely accessible test/access system for testing two-wire or four-wire special service or private line circuits. One application for this system is in end offices where the quantity of this type of circuit does not justify a more expensive mechanized test/access system of the types described hereinabove. Another application for this system is in large subscriber installations where subscriber carrier facilities are installed at the customers' premises. Other applications within and without the telephone system are contemplated as possible.

The present invention provides a system for testing a selectable one of a plurality of electrical circuits. The system broadly includes testing means for receiving a control signal from a test site where the tester or operator is located and for generating and applying a test signal to the electrical circuit selected in response to the control signal, and the system also broadly includes synthesized voice means, connected to the testing means, for generating audible speech signals to verbally communicate a result from the testing means to the test site.

In a specific application the present invention provides a system for testing, from a remote site, a selectable one of a plurality of telephone system circuits passing through a common site located remotely from the remote site, but connected with the remote site by a suitable communications circuit, such as via a dial-up connection through the public switched telephone network (PSTN). This specific system broadly comprises signal generating means, disposed at the remote site and connected to the communications circuit, for generating a first frequency-encoded control signal to select one of the plurality of telephone circuits to be tested and for generating a second frequency-encoded control signal to select a type of test to be performed on the selected circuit. This includes transmitter means for transmitting selectable dual tone multiple frequency signals as the first and second control signals. The system also comprises frequency-encoded communication means, disposed at the common site and connected with the communications circuit, for establishing two-way communication with the signal generating means so that the first and second control signals are received therefrom and so that responses can be communicated thereto. Also included within the test system of this specific embodiment is a test means, disposed at the common site and connected with the frequency-encoded communication means, for generating a test signal in response to the second control signal and for controlling the frequency-encoded communication means to provide the responses. The system still further comprises selector means, disposed at the common site and connected with the test means and the frequency-encoded communication means, for communicating the test means with the selected circuit in response to the first control signal so that the test signals are imposed on the selected circuit in response to the second control signal.

The frequency-encoded communication means, the test means and the selector means are provided within a unitized apparatus located only at the central office or local site from which the plurality of circuits to be tested emanate or connect. Specifically, there is no need for a central computer located remotely from the unitized apparatus.

The frequency-encoded communication means, the test means, and the selector means more particularly include and are provided from an analog bus network through which analog electrical signals are communicated; a digital bus network through which digital electrical signals are communicated; first interface means, connected to the analog bus network and the digital bus network, for receiving through the analog bus network analog control signals; control means, connected to the digital bus network, for generating digital control signals in response to the analog control signals; analog test signal generating means, connected to the analog bus network and the digital bus network, for generating analog test signals with which to test the electrical circuits in response to the digital control signals; second interface means, connected to the analog bus network and the digital bus network, for communicating the analog test signals to one of the electrical circuits selected in response to the digital control signals; and wherein the control means includes means for digitally determining a result from the analog test signals communicated by the second interface means, and the first interface means includes means for verbally communicating the result.

In the preferred embodiment, the analog control signals are characterized as dual tone multiple frequency signals. Also in the preferred embodiment, the means for communicating the result includes speech synthesizing means, responsive to the control means, for transferring the result by speech synthesizing signals. Also within the preferred embodiment, the control means includes evolutionary data base means for automatically updating and maintaining a current base of communications operating information.

The method of the present invention broadly includes the steps of transmitting a plurality of control signals from a remote location; receiving the control signals at a local location having access to the plurality of circuits; generating at the local location at least one test signal in response to the received control signals; selecting at the local location one of the circuits in response to the control signals; communicating at the local location the at least one test signal to the selected circuit; monitoring at the local location the selected circuit for a response to the at least one test signal; measuring at the local location a response detected during the step of monitoring the selected circuit; generating at the local location an answer based on the measured response; and communicating the answer to the remote location by synthesized speech or voice signals.

Therefore, from the foregoing, it is a general object of the present invention to provide a novel and improved method and apparatus for remotely testing electrical circuits. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 6 is a block diagram of an analog signal measurement portion of the apparatus of the preferred embodiment.

FIGS. 7A-7D are schematic circuit diagrams of a specific embodiment of the network interface matrix portion.

FIGS. 8A-8G are schematic circuit diagrams of a specific embodiment of the direct dial interface portion.

FIGS. 10A-10F are schematic circuit diagrams of a specific embodiment of the analog signal measurement portion.

DESCRIPTION OF THE PREFERRED EMBODIMENT

Figure 1:
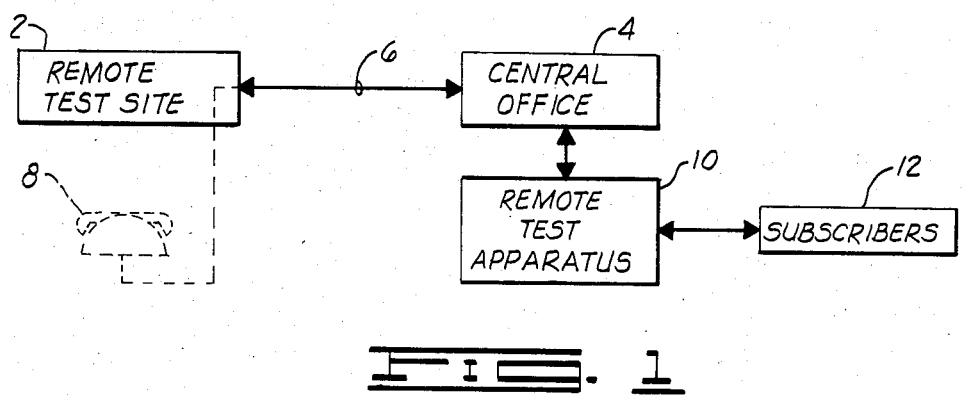
FIG. 1 is a block diagram illustrating one environment in which the present invention can be used.

The present invention provides a test system for testing electrical circuits. The preferred embodiment of this system will be described with reference to the system used for testing a selectable one of a plurality of telephone system circuits (specifically, leased private line/special service circuits for the preferred embodiment) passing through a common site located remotely from a remote site at which the test is to be controlled, but connected with the remote site by a communications circuit. This environment is depicted in FIG. 1 wherein a remote test location or site 2, such as a remote central office, and a local central office 4 are shown in communication with each other over a communication link 6 of a suitable type as known to the art, such as a public switched telephone network (PSTN) circuit.

At the remote site 2 where the testing is to be controlled, there is located a signal generating means, connected to the communications circuit 6, for generating frequency-encoded control signals to select one of a plurality of telephone circuits at the local office 4 for testing and to select a type of test to be performed on the selected circuit. FIG. 1 depicts the signal generating means as a push-button telephone set, or voice terminal, 8 of a type as known to the art. The set 8 provides a transmitter/receiver means for transmitting and receiving dual tone multiple frequency (DTMF) signals. In other embodiments of the present invention the signal generating means can be implemented by other equipment capable of sending suitable DTMF or DTMF-emulating signals (or other suitable signals for which such other embodiment is adapted). In the illustrated preferred embodiment control is effected through the telephone set 8 by sequentially depressing the numbered keys in respective predetermined sequences to define multiple-digit single-number control commands transmitted over the transmission system. Individual command numbers are followed by the "pound sign" (#) key actuation. This control will be more particularly described hereinbelow.

To respond to these control signals, the system of the present invention includes a remote test apparatus 10 shown in FIG. 1 to be connected at the local office 4 to subscriber lines 12. In the exemplary environment of FIG. 1, these subscriber lines are private lines or special service lines of types as known to the art.

The remote test apparatus 10 includes circuits for performing the communicating, accessing and testing functions which are needed in remote test systems; however, these functions are uniquely implemented by the combined elements constructing the apparatus 10 of the preferred embodiment. Broadly, the communicating function is implemented by frequency-encoded communication means connected with the communications circuit 6 for establishing two-way communication with the signal generating means (located at the remote site 2) so that the control signals from the signal generating means are received therefrom and so that responses from the tests to be conducted can be communicated thereto. In the preferred embodiment this means includes means for generating speech synthesized signals so that the responses are communicated as audible voice signals back to the operator at the remote site 2 through the receiver of the terminal 8.

The testing function of the apparatus 10 is broadly implemented by test means, connected with the frequency-encoded communication means, for generating a test signal in response to at least one of the control signals sent from the remote site 2 and for controlling the frequency-encoded communication means to provide the responses. The test means broadly includes analog signal processor means for generating a plurality of analog signals, means for operating the analog signal processor means in response to at least one of the control signals from the remote site 2 so that a selectable one of the plurality of analog signals is output from the analog signal processor means as the test signal in response to the at least one control signal, analog signal measurement means for digitizing analog responses received from the selected circuit, and means for operating the frequency-encoded communication means in response to the digitized responses from the analog signal measurement means.

The accessing function performed by the apparatus 10 is achieved by selector means, connected with the test means and the frequency-encoded communication means, for communicating the test means with the selected circuit in response to at least one of the control signals from the remote site 2 so that the test signals are imposed on the selected circuit in response to at least one of the other control signals.

Figure 2:
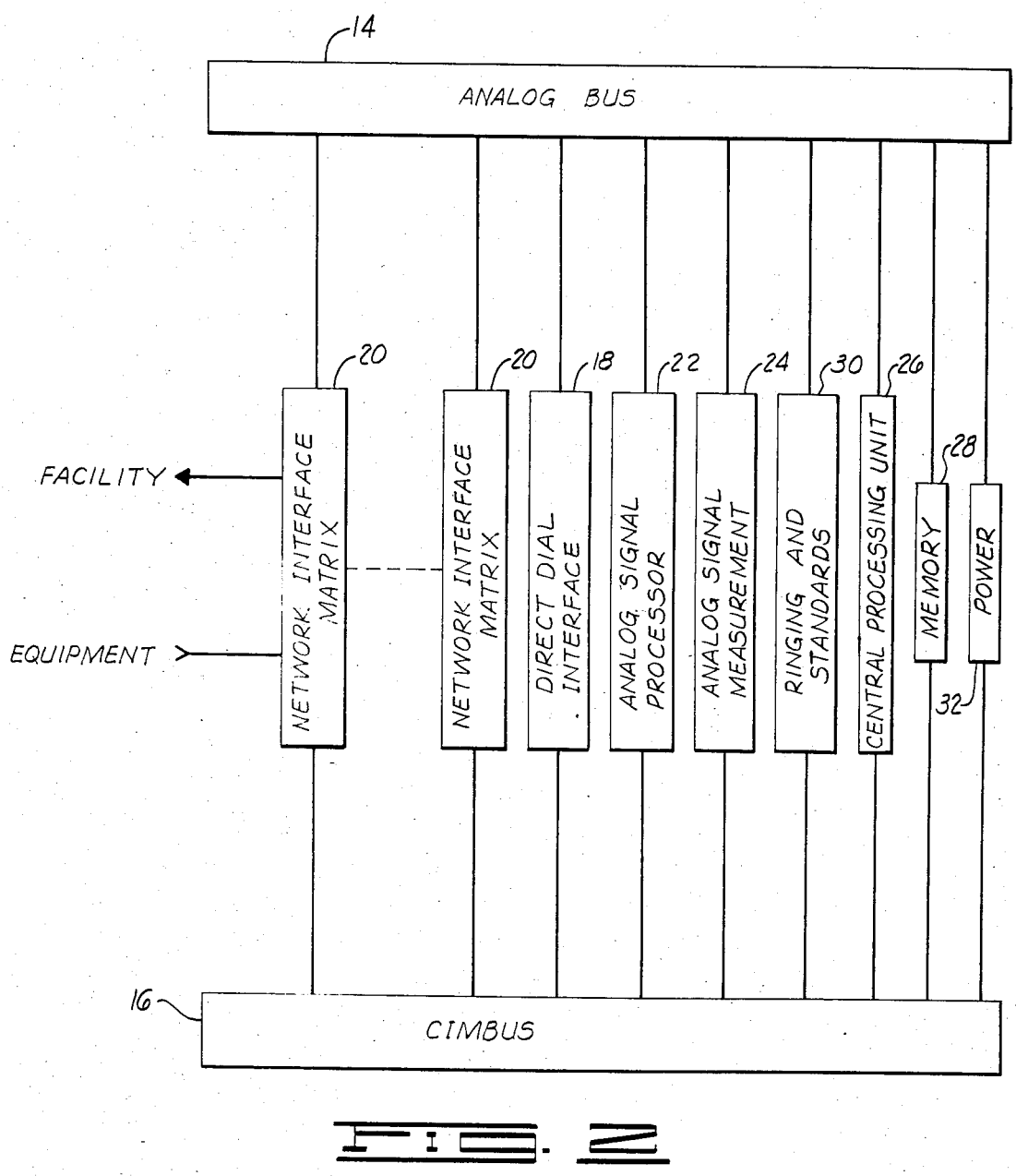
FIG. 2 is a block diagram of the apparatus constructed in accordance with the preferred embodiment of the present invention.

The foregoing features of the apparatus 10 of the present invention are defined in the preferred embodiment by a twin-bus construction illustrated in the block diagram of FIG. 2. The apparatus 10 depicted in FIG. 2, and more particularly shown in FIGS. 3–10, is constructed of discrete and integrated circuit components, which integrated circuit components are generally of a CMOS construction for reducing power consumption requirements. The physical construction is such that the apparatus 10 can be contained in an industry standard card cage with mounting facilities to mate with the Western Electric drilling standard for 23-inch telephone relay racks. That is, the apparatus 10 has a compact, unified construction which does not require special communication links with any remote, centralized computer used to control other apparatus because no such central computer is found in the present invention. The components of this compact apparatus, and by which the aforementioned means are defined, will be briefly described with reference to FIG. 2 and thereafter more particularly described with reference to the remaining drawings.

The preferred embodiment of the apparatus 10 shown in FIG. 2 includes an analog bus network 14 through which analog electrical signals are communicated. These signals include those received over the communication link 6 from the remote site 2. These and the other signals and their connection with the analog bus network 14 are illustrated in FIGS. 3–10.

The apparatus 10 of the FIG. 2 embodiment also includes a digital bus network 16, specifically identified as a CIMBUS which is a CMOS digital bus of a type as known to the art. It is through the digital bus network 16 that digital electrical signals are communicated among the parts of the apparatus 10. These specific signals and connections associated with the digital bus network 16 are also shown in FIGS. 3–10.

This embodiment of the apparatus 10 also includes direct dial interface means 18, connected to the analog bus network 14 and the digital bus network 16, for receiving through the connector means provided by the analog bus network 14 the control signals from the remote site 2, which remote signals within the preferred embodiment are analog electrical signals corresponding to the DTMF signals generated in response to actuation of the keys of the telephone set 8, which is illustrated as the preferred embodiment of the signal generating means and which is connected to the analog bus network through the communications link 6. The direct dial interface means 18 includes means for communicating the result of the test performed with the present invention. This means includes speech synthesizing means for generating audible speech or voice signals transmitted by suitable means back to the remote test location 2 to verbally communicate the result, such as in the form of verbalized numerical data. The direct dial interface means 18 will be more particularly described hereinbelow with reference to FIGS. 4 and 8A–8G.

Forming another part of the preferred embodiment of the apparatus 10 shown in FIG. 2 is at least one network interface matrix 20 connected to both the analog bus network 14 and the digital bus network 16. As indicated in FIG. 2, there can be a plurality of matrices 20; up to sixteen can be used in the preferred embodiment. Each matrix 20 provides interface means for communicating analog test signals to a selected one of the electrical circuits in response to digital control signals provided over the digital bus network 16. The electrical circuits selected through the matrices 20 are the telephonic circuits to be tested in the preferred embodiment. These circuits include a facility portion directed to the end user or subscriber and an equipment portion directed to the equipment within the local office 4. The network interface matrix 20 will be more particularly described hereinbelow with reference to FIGS. 3 and 7A–7D.

The apparatus 10 of the preferred embodiment also includes analog test signal means, connected to the analog bus network 14 and the digital bus network 16, for generating analog test signals, with which to test the electrical circuits, in response to digital control signals. This means is particularly implemented through an analog signal processor 22 shown in FIG. 2. This circuit is more particularly described hereinbelow with reference to FIGS. 5 and 9A–9F.

The FIG. 2 embodiment of the apparatus 10 also includes control means having means, connected only to the digital bus network 16, for generating digital control signals in response to the analog control signal received over the communications circuit 6 from the remote site 2. As described herein, the control means also includes means for determining a result from the analog test signal communicated to the circuit or circuits under test through the network interface matrices 20. This control means is shown in FIG. 2 as including an analog signal measurement circuit 24 and a local central processing unit 26 having a memory circuit 28 associated therewith. The analog signal measurement circuit 24 will be more particularly described hereinbelow with reference to FIGS. 6 and 10A–10F. The hardware of the central processing unit 26 and the memory 28 will not be more particularly described herein because these components are of standard types for use with a CIMBUS data and control transferred system used and known in the art. In the preferred embodiment the central processing unit 26 includes a National Semiconductor NSC 800 microprocessor and the memory 28 includes suitable read only memory and random access memory devices of known types. Functionally, the central processing unit 26 and the memory 28 are programmed in any suitable manner such as in accordance with the operations described hereinbelow and apparent from the drawings and in accordance with the flow charts shown in FIGS. 11A–11AA to be more particularly described hereinbelow. These elements are also programmed to provide evolutionary data base means for automatically updating and maintaining a current base of communications operating information. For example, predetermined transmission parameters used in transmitting the results from the apparatus 10 to the remote site 2 are initially stored within the memory, but they can be subsequently changed from the remote site 2. Such new parameters are automatically retained and subsequently used instead of the original parameters until the central processing unit 26 is otherwise instructed through the analog control signals.

FIG. 2 also shows that the preferred embodiment of the apparatus 10 includes a ringing and standards circuit 30 and a power circuit 32. Although the power circuit 32 is of a suitable type for energizing the apparatus 10, it is not otherwise of patentable significance to the invention claimed herein. The ringing and standard circuit 30 is likewise not of patentable significance to the presently claimed invention; however, it is of a suitable construction to provide ringing and standards signals of types as known to be used in testing circuits of the type tested by the preferred embodiment of the present invention. For example, the circuit includes a square wave generator for generating a 20-hertz ringing signal. It also provides standard measurements for conducting self-testing diagnostic routines.

With the foregoing general descriptions of the environment within which the preferred embodiment of the present invention can be used and of the preferred embodiment of the apparatus 10 forming a part of the overall system of the present invention, the direct dial interface circuit 18, the network interface matrix circuit 20, the analog signal processor circuit 22 and the analog signal measurement circuit 24 will be more particularly described with reference to the remaining drawings. Through this description and through a review of the remaining drawings, the configurations of the analog bus network 14 and the digital bus network 16 will also become apparent.

With reference to FIGS. 3 and 7A-7D, a specific embodiment of one of the network interface matrix circuits 20 will be described. Generally, the illustrated circuit 20 meets the specifications for interfacing with the CIMBUS digital bus network 16. Each matrix 20 provides in-series test access points to twelve two-wire voice frequency data grade circuits; twelve four-wire circuits are accommodated when two of the matrices 20 are used together. Up to sixteen matrix circuit boards can be used in the preferred embodiment, thereby providing access points for up to 192 two-wire circuits and up to 96 four-wire circuits. The network interface matrix also allows non-intrusive monitoring of voice frequency data circuits, and the network interface matrix is capable of splitting the selected circuit, thereby isolating the facility and equipment sides of the circuit, and of bussing both to assorted test circuits. The network interface matrix also provides simultaneous splitting and termination of both facility and equipment sides of the selected circuit. Splitting of the circuits is accomplished via relays used to isolate the facility and equipment sides from each other whereby both sides can then be automatically routed to signal testing and generating devices over the analog bus network 14.

Figure 3:
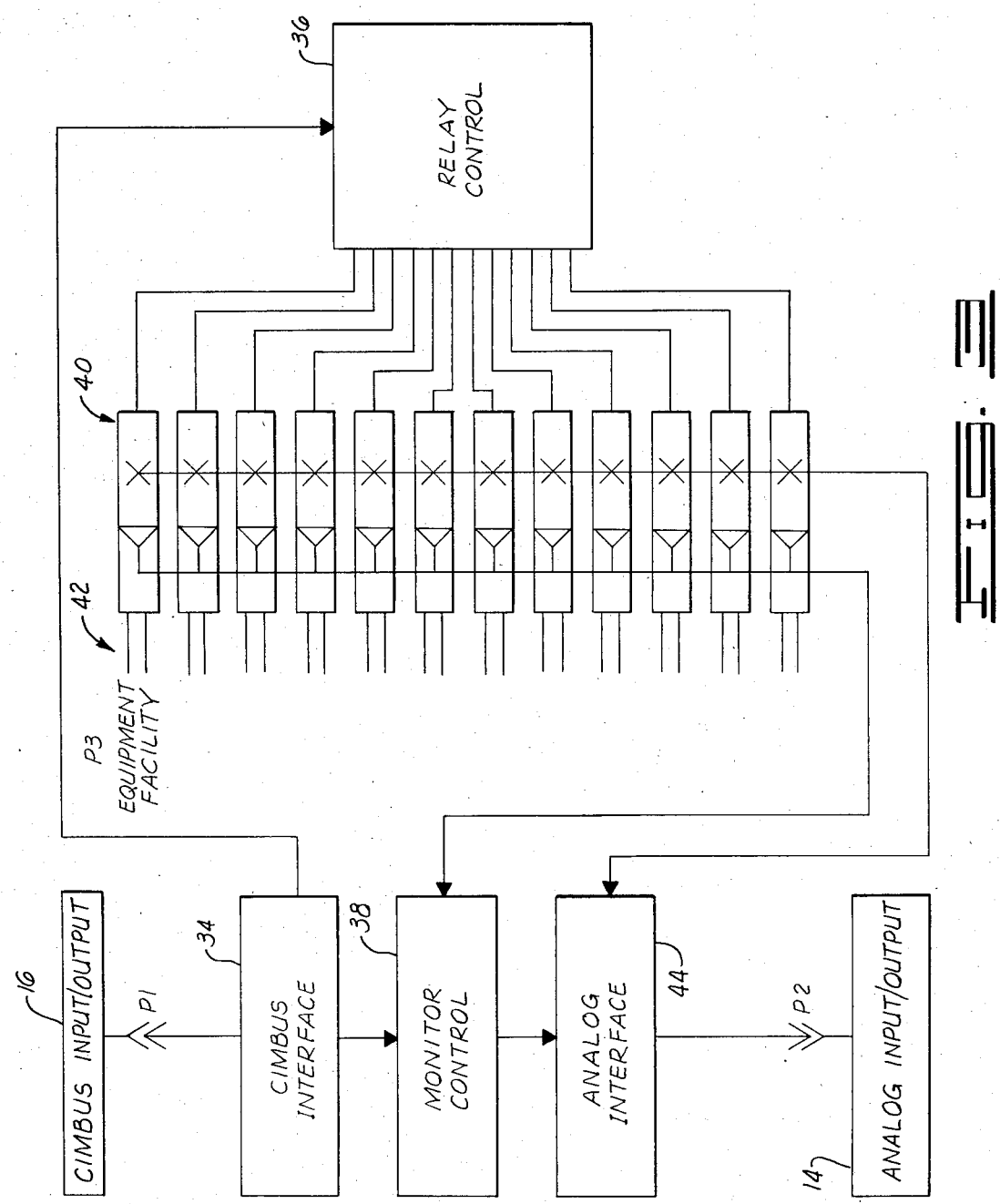
FIG. 3 is a block diagram of a network interface matrix portion of the apparatus of the preferred embodiment.

FIG. 3 shows that the network interface matrix 20 includes a CIMBUS interface 34 through which control signals are provided to a relay control 36 and a monitor control 38. The relay control 36 in turn operates access relays 40 to which the facility and equipment portions of the circuits to be tested are connected through a facility/equipment interface 42. Signals from the access relays 40 and from the monitor control 38 are connected to the analog bus network 14 through an analog interface 44.

Broadly, the interface 34 provides the standard address, data, control and power interconnections to conform to and communicate with other devices compatible with and connected to the digital bus network 16. The relay control 36 handles all relay switching functions including facility and equipment routing. The monitor control 38 selects and routes voice frequency data circuits to the monitor bus. The facility/equipment interface 42 provides the interconnections necessary to place the network interface matrix 20 in series with the voice frequency data grade circuits. The analog interface 44 routes the monitor signal and the facility/equipment sides of the selected circuit to test devices located elsewhere within the present invention. Each of these structural and functional portions of the network interface matrix 20 will next be more specifically described with reference to the schematic circuit diagrams shown in FIGS. 7A-7D.

A specific embodiment of the CIMBUS interface 34 is shown in FIG. 7A. The interface includes a suitable connector 46 of a type as known to the art for connecting with the bus 16 to receive the indicated signals labeled in FIG. 7A. Through the connector 46 (labeled P1 throughout the drawings), the network interface matrix 20 is input/output mapped into the CIMBUS addressing scheme. Address lines A0-A7 and select lines SEL0-SEL3 are used to directly control an address decoder 48. The data lines, D0-D7, of the CIMBUS are tied to the inputs of a control register 50, which is cleared (along with an interrupt latch 52) by the CIMBUS reset lines (RESET*, where the * indicates an active low signal). The read (RD*) and write (WR*) signals from the CIMBUS are connected through logic gates 54 in response to the input/output board select signal derived from the address decoder 48.

To select one of the up to sixteen network interface matrix boards 20 which can be used within the preferred embodiment of the present invention, the preferred embodiment utilizes two forms of network interface matrix board select decoding: base input/output port decoding and CIMBUS slot decoding. The base input/output port decoding is accomplished by comparing the address lines A4-A7 through the upper four bits of the address decoder 48, which in the preferred embodiment is an eight-bit magnitude comparator. The slot decoding is accomplished by comparing the address lines A0-A3 with four slot identifying select lines, SEL-0-SEL3, through the lower four bits of the address decoder 48. In the preferred embodiment, the SEL-0-SEL3 lines are pulled up to $V_{DD}$ through respective resistors and tied to the four CIMBUS lines P1-A18, P1-C18, P1-A20 and P1-C20. These four CIMBUS lines are disconnected from their typically assigned signals and are, instead, either pulled down or left floating depending on the particular CIMBUS slot in which the network interface matrix board is received. With this decoding scheme, a base input/output port is chosen by hardwiring on the board (as indicated by the reference numeral 56 in FIG. 7A), but the actual port location is determined by the physical slot it occupies and how that slot of the card cage has been wired. Thus, to select a particular board, the address A0-A7 must match both the base input/output port address and the slot address.

To determine how many of the network interface matrix boards have been inserted into slots and addressed for use, the interrupt signal, INT1, is provided when a board select signal is generated and a read signal is sent from the central processor 26. When this occurs, the read signal is passed through its associated gate of the gates 54 to clock the interrupt latch 52, thereby toggling a logic high into the latch 52 which causes the Q* output to go to a logic low level. This output is tied to the gate of a transistor 58, the drain of which is tied to the INT1 line of the bus 16. When Q* goes low, the transistor 58 is biased on causing the INT1 line to go to a logic high, thereby signaling the processor 26 that a board is present at that address. If a read is performed and no interrupt is returned, the processor assumes no board exists at that address.

The interface section 34 also includes the control register 50 which in the preferred embodiment is an octal latch of a suitable type. Each bit in the latch is assigned to control one or more functions in the relay and monitor sections of the network interface matrix 20 as is apparent from the schematic circuit diagrams of FIGS. 7A-7D and as subsequently described. The function of each bit is described in the following table:

| Data Bit | Description |
| --- | --- |
| 0-4 | Control 0-4 (C0-C4) - These 5 bits are used to address individual relays for circuit routing and monitor functions. |
| 5 | Relay Enable - When this bit is high the relay addressed by C0-C4 will change to the state indicated by bit 7. |
| 6 | Monitor Enable - When this bit is high, the monitor line addressed by C0-C4 will be routed to the main monitor bus. |
| 7 | Connect/Terminate* - When bit 5 is high, this bit determines whether the relay selected by C0-C4 will bridge (leave the circuit connected) or split (connect the circuit to the facility/equipment bus or terminate with 600 ohm resistor and a series 3.4 ufd capacitor). |

Selection of the access relays 40 in response to signals from the control register 50 is achieved through the relay control 36 which is shown in FIG. 7A to include three 1-to-8 line analog demultiplexers 60, 62, 64. Each of these provides signals for controlling a respective set of eight relays within the access relays 40, which access relays 40 include twelve relay sets having two relays in each set. The three select lines for each of the demultiplexers 60, 62, 64 are controlled by bits C0-C2 of the control register 50. A 2-to-4 line demultiplexer 66 decodes the respective enable for each of the demultiplexers 60, 62, 64 from bits 3 and 4 of the control register 50 (i.e., C3 and C4). The demultiplexer 66 is enabled when bit 5 of the control register 50 is in a logic high state.

Figure 7C:
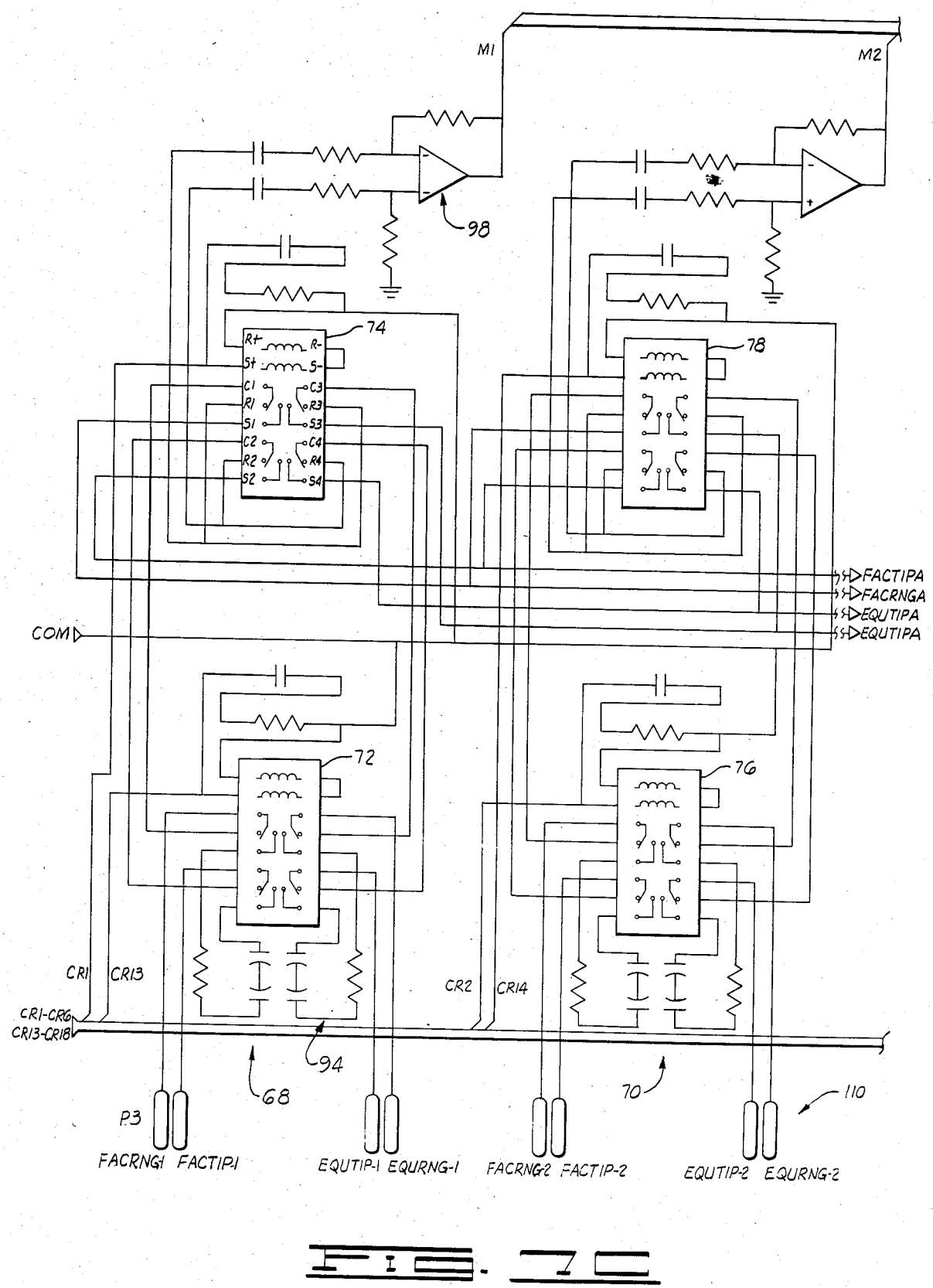
Figure 7D:
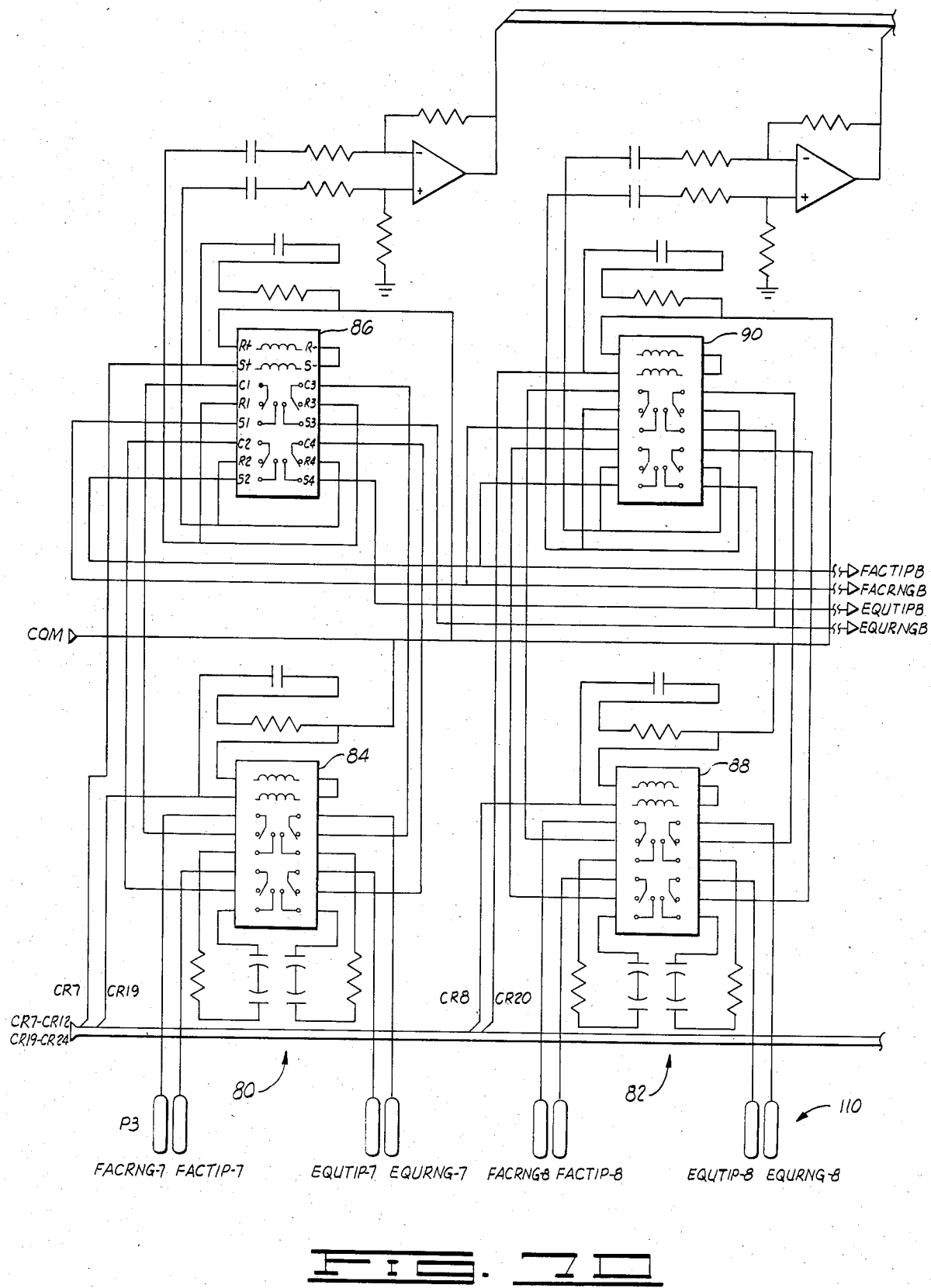

The control signals from the relay control demultiplexers 60, 62, 64 are provided to respective ones of the relays, examples of which are shown in FIGS. 7C and 7D. FIG. 7C shows one set of relays 68 and another set of relays 70. Each of these sets of relays includes two respective relays. The relays of the set 68 are identified by the reference numerals 72, 74, and those of the set 70 by the reference numerals 76, 78. The two sets 68, 70 are two of a first group of six relay sets which are connectible to six respective circuits to be tested, each of which circuit has an equipment portion and a facility portion as known to the art. The remaining four sets of relays not shown in FIG. 7C are constructed similarly to those which are shown and have been omitted for purposes of simplifying the drawings. A second group of similarly constructed sets of relays is exemplified by relay sets 80, 82 shown in FIG. 7D. The set 80 includes relays 84, 86, and the set 82 includes relays 88, 90. Four additional relay sets are included in the group exemplified in FIG. 7D, and the six relay sets of this group are connected to the remaining six circuits which can be connected to one network interface matrix board 20. That is, each network interface matrix board 20 provides test access points for twelve voice frequency data circuits, with each of the circuits having two relays assigned thereto. Each of these circuits can be independently placed into one of three states: bridge/monitored, split/facility monitored, or split/terminated.

In the bridged state, the circuit passes through the network interface matrix unaffected; however, it is monitored as subsequently described hereinbelow.

In the split/facility monitored state, both the tip and ring portions of the circuit are physically broken; in this state only the facility portion can be monitored. In such a split state, the facility side of the circuit is connected to busses designated facility tip and ring (FACTIP and FACRNG), and the equipment side of the circuit is connected to busses designated equipment tip and ring (EQUTIP and EQURNG). All four of these busses are common to the testable circuits through their respective relays within both a single network interface matrix board and all boards within the overall apparatus 10. Each of the four busses can be accessed by the test means located elsewhere within the apparatus 10; this access is through the analog interface 44 which specifically includes a suitable connector 92 shown in FIG. 7B.

In the split/terminated state, the split circuit is separated from the monitor and test busses. In terminating the split circuit, a 600-ohm resistor and a series 3.4 microfarad capacitor are connected across the tip and ring of both the facility and equipment sides. Examples of these components are labeled with the reference numeral 94 shown in FIG. 7C.

A particular one of the states is selected by controlling the relay control demultiplexers 60, 62, 64 and a switching circuit 96 with commands from the processor 26 generated in response to the control signals from the remote site. In response to this control, the states of four interdependent single-pole double-throw latching switches contained within each relay are selected. The states of the switches are responsive to the operation of set and reset polarized coils shown to be included within each of the relays. FIGS. 7C and 7D show that the positive side of each set coil is connected to its respective control line from the relay control 36 and the positive side of each reset coils is tied to the common (COM) line. In this configuration, the state of the latched switches in a particular relay is changed by placing a voltage of the proper polarity across the selected serially connected set and reset coils.

When a relay is selected by the control demultiplexer, the polarity of the voltage applied across the coil is determined by the state of bit 7 of the control register 50 which controls the switching circuit 96. When this signal is low, a negative voltage is placed on the COM line and a positive voltage is placed on the positive side of the set coil in the selected relay via the relay control signal provided from the respective demultiplexer 60, 62, 64. When this signal is high, the polarities are switched.

With reference to the set of relays 68 shown in FIG. 7C, the relay 72 is referred to as a bridge/terminate relay because it splits the circuit and terminates both sides when it is placed in the terminated state. When it is placed in the bridged state, it routes the circuit to the relay 74, referred to as a bridged/split relay. There the circuit is either passed through the network interface matrix and only monitored (in the bridged state) or it is split and routed to the appropriate busses for testing purposes (in the split state).

To monitor the circuit selected through one of the relay sets, the network interface matrix 20 includes the monitor control portion 38. This enables selected monitoring of one of twelve 2-wire voice frequency data circuits monitored through a single network interface matrix board 20 or twelve 4-wire voice frequency data circuits monitored with two network interface matrix boards 20. This monitoring function allows one to determine whether the selected circuit is in use prior to splitting it. Once the circuit has been split, only the facility side is monitored.

For monitoring the signals, each relay set has a respective dedicated AC-coupled unity gain differential amplifier 98 associated therewith (see FIG. 7C). Thus, there are twelve such amplifiers 98 since there are twelve relay sets for monitoring twelve circuits in a single network interface matrix board 20.

The outputs of all twelve monitoring amplifiers 98 are routed to two 8-to-1 line analog multiplexers 100, 102 shown in FIG. 7B. The select lines on each of the multiplexers are controlled by the C0-C2 bits of the control register 50. A 2-to-4 line demultiplexer 104 decodes the enable signals for the multiplexers 100, 102 in response to bits C3 and C4 of the control register 50. The demultiplexer 104 is enabled by the monitor bit of the control register 50.

The output of the monitor signal multiplexers 100, 102 is AC-coupled to a unity gain amplifier 106. The output of this amplifier is routed to one of two busses, either a monitor transmit (MON:TX) bus or a monitor receive (MON:RX) bus, via a bus select multiplexer 108. The multiplexer 108 is controlled by the state of the SEL0 signal which is determined by the slot the respective board is occupying. In the preferred embodiment, if the slot is an odd numbered slot, the MON:TX bus is selected, and if the slot is even numbered, the MON:RX slot is selected. The MON:TX and the MON:RX busses are connected through the connector 92 to the analog bus network 14 as illustrated in FIG. 7B.

When four-wire circuits are interfaced, the transmit and receive circuits thereof must be connected to separate network interface matrix boards. Therefore, to monitor a complete four-wire circuit, the monitor transmit and receive signals must be derived from two different network interface matrix boards and summed together. This is accomplished by the aforementioned construction of the monitor bus. Thus, when a network interface matrix board is installed in an odd numbered slot, the selected monitor signal from that board is routed through the bus select multiplexer 108 to the monitor transmit bus. When a network interface matrix board is installed in an even numbered slot, the selected monitor signal from that board is routed through the bus select multiplexer 108 to the monitor receive bus. These two busses are summed together and made available on the communication link 6. When interfacing two-wire circuits, a particular slot is of no consequence so long as the monitor bus assignment is taken into consideration when monitoring that board.

Because the network interface matrix 20 is designed to be installed in-series with the circuits it is to service, each circuit requires two pairs of connectors, one for the facility side and one for the equipment side. These connectors are indicated in FIGS. 7C and 7D by the reference numeral 110. These provide the physical connectors of the facility/equipment interface 42.

As previously mentioned, the analog interface 44 is specifically implemented by a suitable connector 92 having the signals designated in FIG. 7B connected thereto. The signals indicated in this drawing are part of the overall analog bus network 14 which includes other signals shown in the other drawings as being associated with the connector labeled "P2."

With reference to FIGS. 4 and 8A-8G, the preferred embodiment of the direct dial interface circuit 18 will be described.

The direct dial interface circuit 18 provides a complete communications link between the digital bus 16 and any 2-wire voice frequency data grade circuit (e.g., POTS line). The circuit 18 meets all of the specifications of a CIMBUS slave board. The circuit 18 interfaces directly to any POTS line via an on-board 2-wire/4-wire hybrid circuit; it detects dial tone, ring and various other POTS line signals; it encodes both dual tone multiple frequency and dial pulse dialing signals; it decodes dual tone multiple frequency signals; it emulates speech with a variable vocabulary; it interfaces to the analog bus network 14 to monitor and transmit signals on circuits under test; and it interfaces directly to the CIMBUS.

The circuit 18 allows the user or operator at the test site 2 to communicate with the apparatus 10 via a single 2-wire voice frequency data grade telephone circuit. Instructions can be sent to the apparatus 10 via a dual tone multiple frequency keypad and test results or current unit status can be received from the apparatus 10 in the form of synthesized speech.

Figure 4:
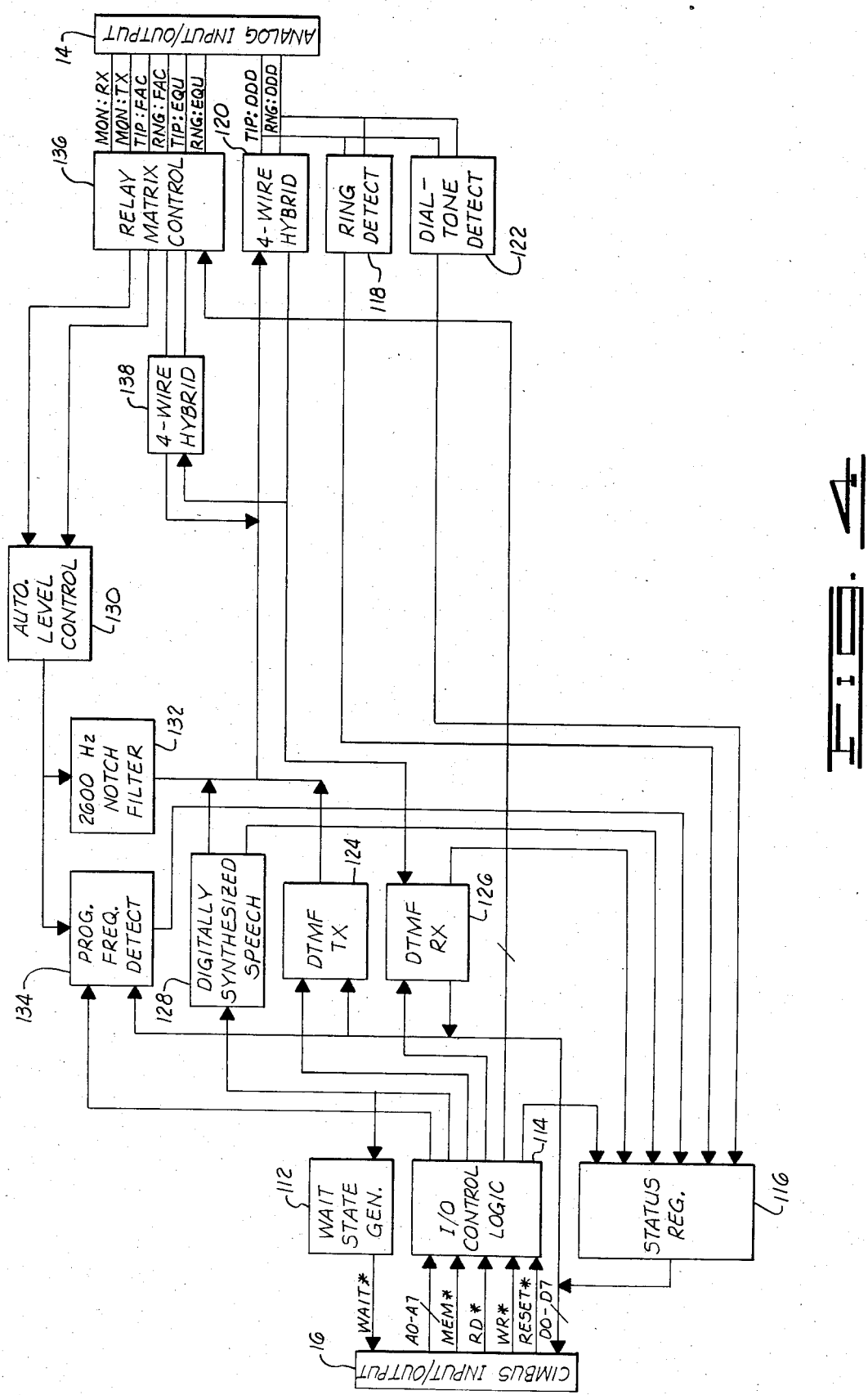
FIG. 4 is a block diagram of a direct dial interface portion of the apparatus of the preferred embodiment.

FIG. 4 shows that the direct dial interface circuit 18 includes a number of functional portions by which the aforementioned features are obtained. These portions include a wait state generator 112, an input/output control logic register 114, a status register or buffer 116, a ring signal detect circuit 118, a 2-wire/4-wire hybrid circuit 120 interfacing with a 2-wire voice frequency data grade circuit over which the apparatus 10 receives master control signals and transmits information to the remotely located operator, a dial tone detector circuit 122, a dual tone multiple frequency encoder or transmitter circuit 124, a dual tone multiple frequency decoder or receiver circuit 126, a digitally synthesized speech circuit 128, an automatic level control circuit 130 for the monitored circuits accessed through the network interface matrix boards 20, a 2600-hertz notch filter high impedance monitor circuit 132, a programmable frequency detector circuit 134, a relay matrix control circuit 136 and another 2-wire/4-wire hybrid circuit 138 interfacing signals from the relay matrix control circuit 136 with the primary receive and transmit lines. Each of these circuits will be more particularly described with reference to the specific embodiments thereof shown in FIGS. 8A-8G. Initially, however, the general digital bus network 16 interfacing will be described with reference to FIGS. 8A and 8B.

Figure 8B:
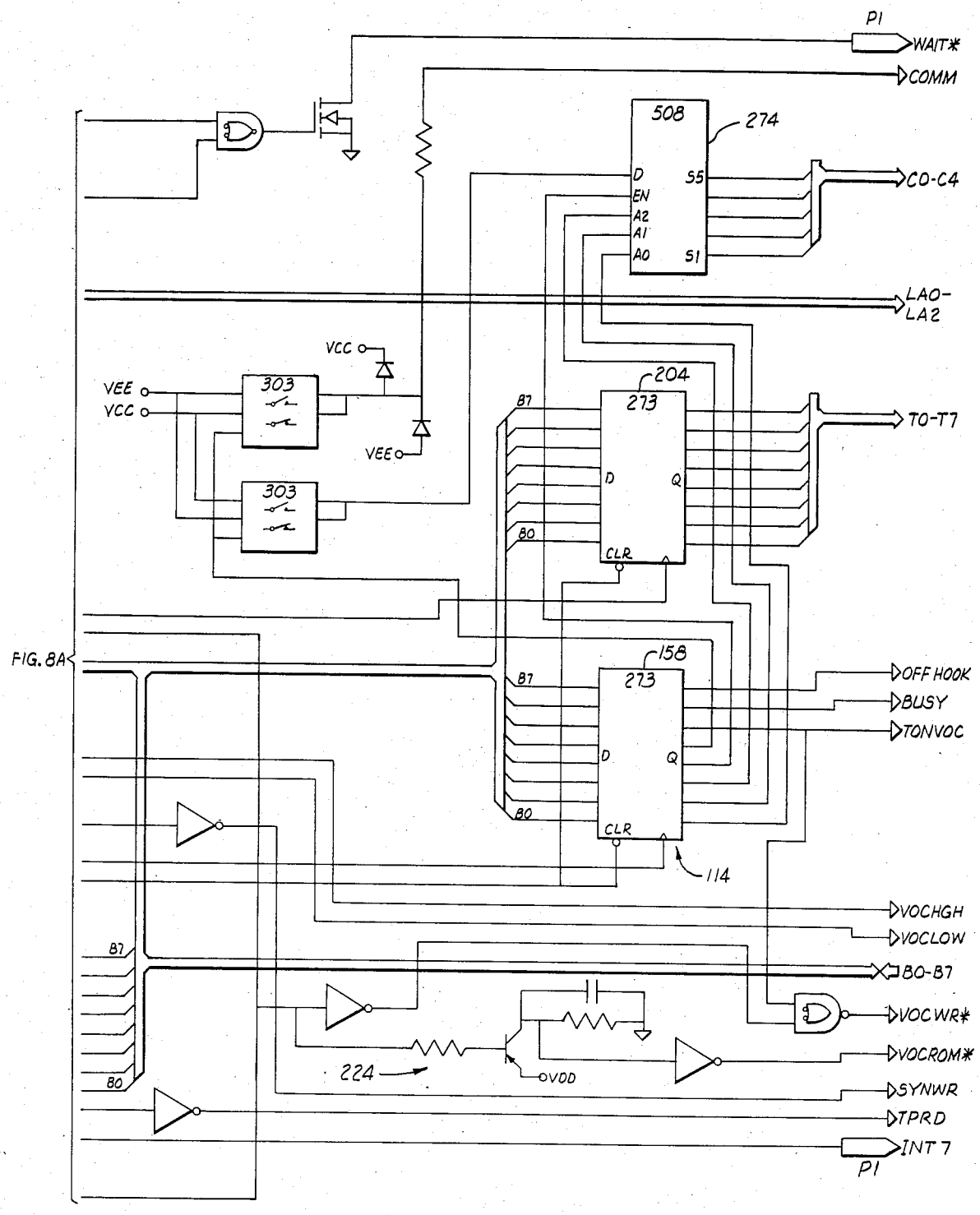

The direct dial interface circuit 18 is mapped into the CIMBUS addressing scheme. The data lines D0-D7 are buffered to and from the circuit 18 by means of an octal transceiver 140 shown in FIG. 8A. The transceiver direction is controlled by the RD* signal, and the enable is controlled by a base input/output port address match. The RD* and WR* signals gate various onboard input/output port select. The address lines A0-A7 and the memory select signal, MEM*, drive the input/output port decoder directly. The circuit 18 also utilizes the CLK line, the WAIT* line and the INT7 line of the CIMBUS as shown in FIGS. 8A and 8B.

In its addressing, the circuit 18 utilizes a base port address which is decoded by a 4-bit comparator 142. This decodes address lines A4-A7 and MEM*. A signal representing a suitable match of the base port address, the WR signal and the A3* signal are logically combined through a NAND gate 144 to produce a write enable to the programmable frequency detector 134. The signal indicating a match of the base port address, the WR signal and the A3* signal are logically combined through a NAND gate 146 to enable a 2-to-4 line demultiplexer 148. The address inputs of the demultiplexer 148 are driven by the A0 and A1 address signals.

The signal representing the base port address match, the RD signal and the A3* signal are logically combined through a NAND gate 150 to enable another 2-to-4 line demultiplexer 152. The address inputs of the demultiplexer 152 are likewise driven by the A0 and A1 address lines.

The data bus buffer provided by the octal transceiver 140 is enabled by a suitable port address match.

The INT7 signal of the CIMBUS used in the circuit 18 goes to a logic high level when a ring signal has been detected on the POTS line to which the apparatus 10 is connected.

The wait state generator 112 includes two D-type flip-flops 154, 156 (FIG. 8A) combined to form a 2-bit shift register. The shift register is clocked by every rising edge transition of the CIMBUS CLK line. The output of the shift register will put the CIMBUS WAIT* line low for one system clock cycle.

The control register 114 includes an octal latch 158 (FIG. 8B) which selects and enables many of the functions of the circuit 18. The following table describes the function of each bit of this register:

| Data Bit | Definition |
| --- | --- |
| 0-2 | Relay Address - these bits determine which relay is currently selected. |
| 3 | Relay Enable - this bit enables a relay select demultiplexer. |
| 4 | Set/Reset* Relay - this bit determines the state of the currently selected relay. |
| 5 | Tone and Voice - this bit is a master enable/disable for the DTMF encoder and voice synthesizer. |
| 6 | Busy LED - this bit determines the state of a busy-indicating display device. |
| 7 | Off-hook Relay - this determines whether the off-hook relay is open (off-hook) or closed (on-hook). |

The status register 116 includes an octal buffer 160 (FIG. 8A) which monitors the following functions:

| Data Bit | Definition |
| --- | --- |
| 0 | Voice Interrupt Request - indicates the voice synthesizer is ready for the next data byte. |
| 1 | Valid Tone Pair - indicates the DTMF Decoder has received a Valid Tone Pair. |
| 2 | Ring Detector - indicates a "ring" is being detected on the POTS line. |
| 3 | Voice Busy - indicates the voice synthesizer is enunciating. |
| 4 | Any Key Down - indicates both a ROW* input and COLUMN* input have been pulled low on the DTMF encoder. |
| 5 | Dial Tone Detect - indicates a dial tone is being detected on the POTS line. |
| 6 | Single Frequency: Receive/Transmit - indicates that the frequency selectable tone detector has detected the frequency for which it had been set. |
| 7 | Dial Pulse/DTMF* - indicates the state of the dial pulse/DTMF switch. |

The ring detector circuit 118 includes an opto-isolator 162 (FIG. 8D) having a Darlington output which drives a transistor 164 in response to a suitable input received through a bridge 166 connected to the tip and ring lines through a capacitor 168 and a resistor 170. The tip and ring are current-limited by the resistor 170 and are AC-coupled by the capacitor 168. When a ring occurs, it is full-wave rectified by the bridge 166. The output of the bridge 166 is connected across the internal light-emitting diode of the opto-isolator 162. When a signal having a voltage greater than a predetermined value appears across the tip and ring, the internal light-emitting diode of the opto-isolator 162 is biased on, thereby causing the Darlington output to go low. The low output is connected to the base of the transistor 164, which acts as an inverting current buffer. The collector of the transistor 164 is connected as bit 2 of the status register or buffer 160. A high logic level indicates a "ring" is in progress.

To emulate off-hook and on-hook situations, there is associated with the ring detector circuit a ring equivalent circuit and a 26-milliamp "off-hook" constant current source. The ring equivalent circuit is formed by a resistor 172, capacitors 174, 176 and one side of a transformer 178 shown in FIG. 8D. The constant current source is generally identified by the reference numeral 180. When the off-hook signal is received by the circuit 180, a constant current of 26-milliamps is generated to present an off-hook state to the POTS line. The bridge contained within the circuit 180 insures the proper polarity regardless of the orientation of the tip and ring lines.

The 2-wire/4-wire hybrid circuit 120 enables the circuit 18 to transmit and receive voice signals, dual tone multiple frequency signals and monitor signals over a single pair of wires (TIP:DDD and RNG:DDD), such as a POTS line, connected with the telephone set 8. The circuit 120 includes a transmit operational amplifier 182 and a receive operational amplifier 184 and their support circuitry shown in FIG. 8D. when using only two wires to handle both transmit and receive functions, a signal being transmitted from the circuit 18 will also feed back into the receiver of the circuit 18 overdriving incoming transmissions. The common-mode rejection characteristic of the receive operational amplifier 184 has been utilized to prevent this from happening.

The input of the transmit operational amplifier 182 is connected to a summing junction into which the outputs of low and high impedance monitors (subsequently described), the voice synthesizer 128, and the dual tone multiple frequency transmitter 124 are AC-coupled. A resistor 186 provides feedback between the output of the operational amplifier 182 and the inverting input to which the summing junction is connected. The output of the transmit operational amplifier 182 is connected to a terminating resistor 188 and AC-coupled through a capacitor 190 to a winding of the transformer 178, which in the preferred embodiment is a 600-ohm line matching transformer.

The receiver operational amplifier 184 receives incoming transmissions on its non-inverting input from the transformer 178 through the junction of the capacitor 190 and a resistor 192. The resistor 188 and a resistor 194 are virtually grounded although they are connected to the output of the operational amplifier 184 because of the low output impedance characteristic of this operational amplifier. The output of the operational amplifier 184 is AC-coupled to the dual tone multiple frequency receiver 126 (FIG. 8C) and to the dial tone detect circuit 122 (FIG. 8D), and it also is provided as the DDD:RX signal shown in FIG. 8D.

The dial tone detect circuit 122 performs the task of recognizing the signal containing both 350-hertz and 440-hertz tones. The circuit includes two tone decoders, one of which is identified by the reference numeral 196 and the other of which is identified by the reference numeral 198 shown in FIG. 8D. When the circuit 18 goes "off-hook" the incoming signal is directed to both decoders. The output of each of the decoders will go low when a tone matching its frequency is detected. The outputs of the decoders are logically combined through a NOR gate 200 shown in FIG. 8A and provided as a bit of the status buffer 116. A high logic level in this status bit indicates a dial tone is present.

The dual tone multiple frequency encoder/transmitter circuit 124 includes a Model 5089 dual tone multiple frequency generator 202 (FIG. 8C) and an external data latch 204 (FIG. 8B). When data are latched into the latch 204, signals are provided on the ROW* and COLUMN* inputs of the frequency generator 202. The appropriate bit of the status register 116 goes low when both a ROW* and COLUMN* input are pulled low, thereby signifying the depression of a single key of a 16-key DTMF keypad. That is, the data byte written through the latch 204 to the inputs of the generator 202 represent two closed contacts on such a keypad. Each ROW* and COLUMN* input controls a specific frequency and, when pulled low, causes the generator 202 to generate that frequency.

The generator 202 is configured to output either single or dual tone signals. Either ROW* or COLUMN* oscillator can be independently disabled by pulling more than one bit low within its control nibble (the lower four bits provided on the B0–B3 data lines control the COLUMN* inputs, and the upper four bits on lines B4–B7 control the ROW* inputs). Single tones are generated by setting the bit in the desired nibble low while setting two or more bits low in the remaining nibble thus enabling only one oscillator.

The circuit 18 is also capable of dial pulse generation. To accomplish this a switch 206 shown in FIG. 8F is set to select either dial pulse or dual tone multiple frequency operation. The state of the switch 206 controls bit 7 of the status register 160 wherein a high logic level indicates dial pulse operation and a low logic level represents DTMF operation.

Figure 8C:
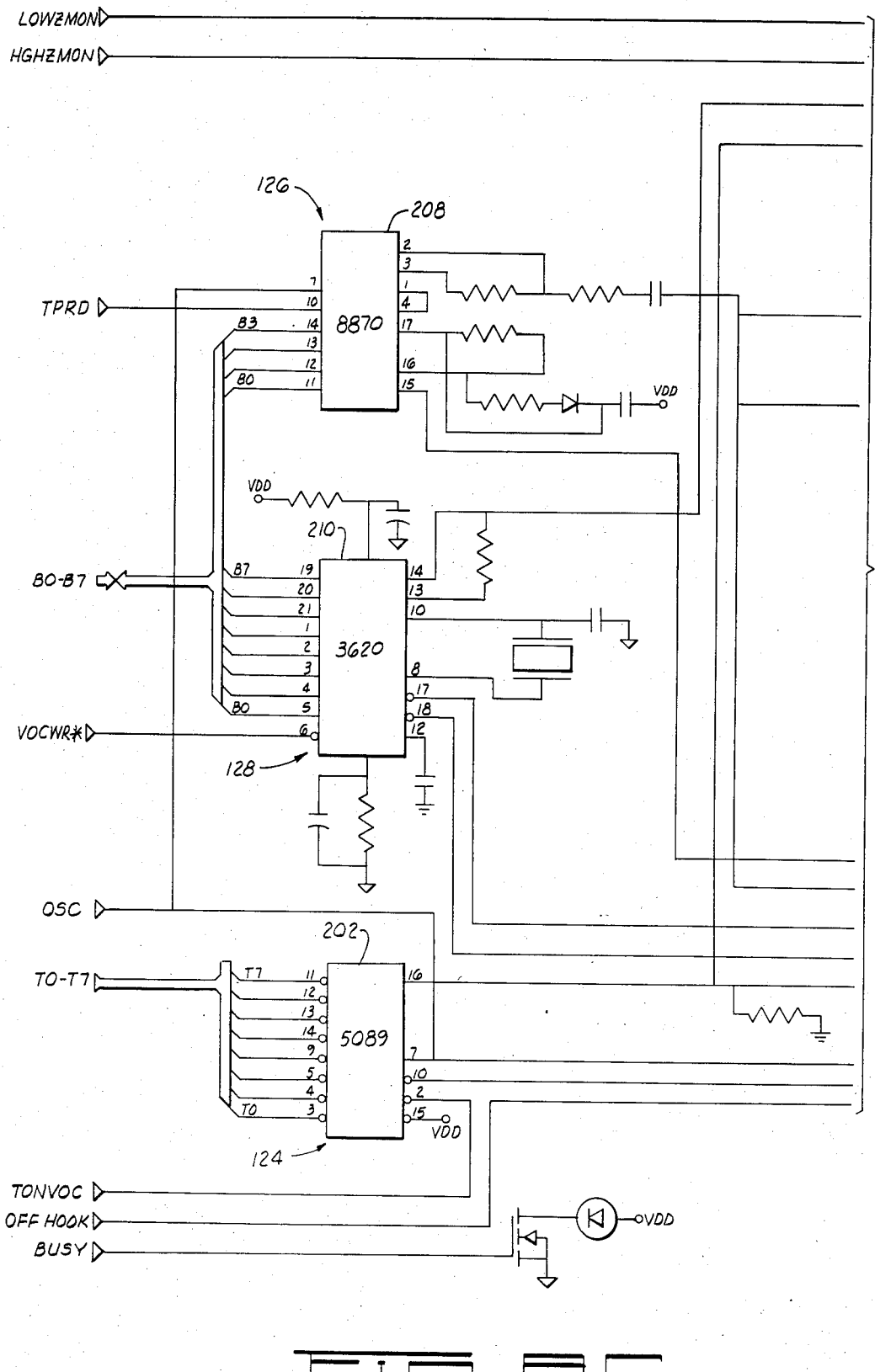

The dual tone multiple frequency receiver circuit 126 includes a Model 8870 DTMF receiver 208 (FIG. 8C). The receiver 208 decodes a dual tone multiple frequency input and outputs a 4-bit representation of the DTMF input on bus lines B0–B3 for transferal to the processor 26 and subsequent control thereof. The appropriate bit of the status register 116 is latched high whenever a valid tone pair is detected. This bit is cleared to a low logic level state by reading the receiver 208.

The digitally synthesized speech circuit 128 includes a Model S3620 voice synthesizer 210 (FIG. 8C) which enables the circuit 18 to verbally communicate with the operator at the remote site 2 over a POTS line or the public switched telephone network exemplifying a suitable embodiment of the communications link 6. Signals by which audible speech can be generated are output from the synthesizer 210 when the appropriate linear predictive coding (LPC) data are written to the inputs of the synthesizer 210. The LPC speech data are stored in two read only memories 212, 214 shown in FIG. 8G. The preferred embodiment of the memory within the circuit 18 will support either 16K bytes of speech data in two Model 27C64 read only memories or 64K bytes of speech data in two Model 27C256 read only memories.

The read only memories 212, 214 are addressed via four 4-bit loadable counters 216, 218, 220, 222 shown in FIG. 8G. The counters 216, 218 control the lower eight address bits, and the counters 220, 222 control the upper eight address bits. To read the data from the read only memories 212, 214, a read is effected by causing the VOCROM* signal (see FIGS. 8A and 8B) to go low. At this time, the LPC speech data byte corresponding to the current address on the voice read only memory address counters will be available on the data bus of the circuit 18. If bit 5 of the control register 114 is set high, the same read will simultaneously cause the VOCWR* line (FIG. 8B) to toggle from a low to a high state, thereby latching and enunciating the addressed byte. A delay circuit 224 shown in FIG. 8B is used in generating the VOCROM* signal to insure that the read only memories will remain enabled a sufficient time after the VOCWR* signal has gone high to satisfy the set-up time requirements on the synthesizer 210. A suitable time, such as approximately 19 milliseconds, after a data byte has been written to the synthesizer 210, the voice interrupt request bit of the status register 160 is latched high indicating the next data byte in the word may be written. Writing the next data byte clears this bit until the next predetermined time period has passed. Failure to respond to a voice interrupt request VREQ signal within a predetermined amount of time, such as 200 microseconds, will cause the generator 210 to go into a power-down mode. The voice busy bit of the status register goes low when the generator 210 is not enunciating and has gone into a power-down mode. When the VOCROM* line goes high after the delay provided by the circuit 224, the read only memory data outputs are disabled and the address counters 216, 218, 220, 222 are incremented.

The direct dial interface circuit 18 is capable of accessing certain lines on the analog bus network 14 for monitoring purposes. This is accomplished with the relay matrix control circuit 136 through which the facility tip and ring signals, the equipment tip and ring signals, and the monitor transmit and receive signals are received. Additionally, the circuit 18 can place a dedicated 26-milliamp constant current load (separate from, but constructed the same as, the previously mentioned circuit within the ring detector circuit 118) across the tip and ring of the facility and/or equipment busses.

Figure 8E:
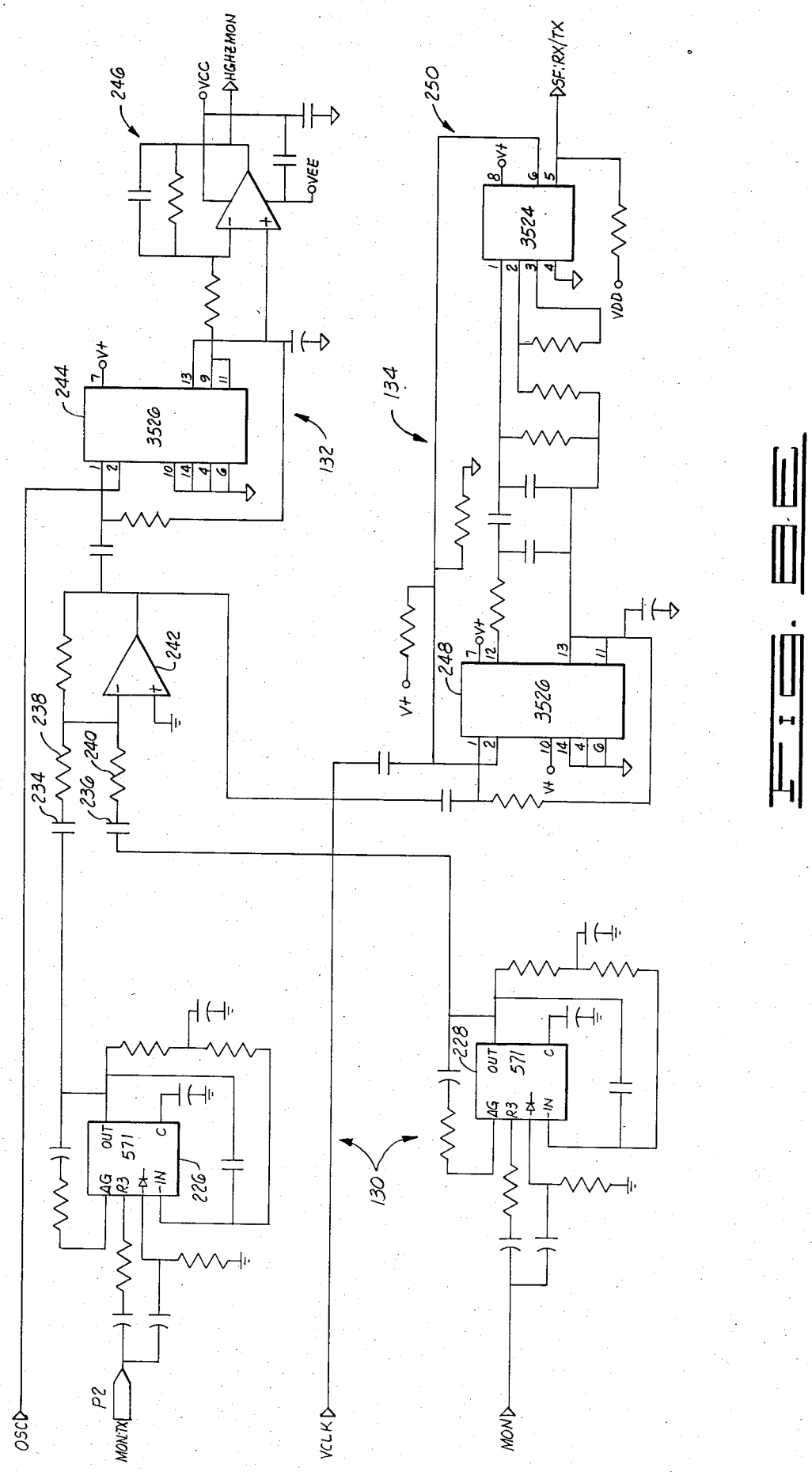

In providing a high impedance monitor, the circuit 18 includes the automatic level control circuit 130 including automatic level control devices 226, 228 shown in FIG. 8E. The device 226 receives the MON:TX signal from the analog bus network 14, and the device 228 receives the MON:RX signal when it is switched thereto through a relay 230 shown in FIG. 8F. The relay 230 can be controlled to switch the device 228 to a high input impedance differential operational amplifier 232 (FIG. 8F) which can be AC-coupled across the tip and ring of the facility/equipment bus within the circuit 18.

The outputs of the automatic level control devices 226, 228 are AC-coupled through capacitors 234, 236 and summed through resistors 238, 240. These summed signals are connected to the inverting input of an operational amplifier 242, the output of which is AC-coupled to the 2600-hertz notch filter 132 and the frequency selectable tone detector 134.

The notch filter 132 shown in FIG. 8E includes a 2600-hertz band-stop filter device 244, the center frequency of which is established by the clock signal it receives from a phase locked loop circuit forming part of the frequency detector circuit 134 subsequently described. The output of the device 244 is filtered through a low-pass filter 246 and passed on to the summing junction connected to the transmitter operational amplifier 182 shown in FIG. 8D. This output provides a high impedance monitor signal which is to be transmitted to the remote site 2.

The frequency selectable tone detector shown as a programmable frequency detector 134 in FIG. 4 includes a single-frequency tunable band-pass filter 248 shown in FIG. 8E. The input of the filter 248 is connected to the aforementioned summed signals from the output of the operational amplifier 242. The output of the filter 248 is connected to the input of a tunable digital frequency detector 250 which in turn provides an output used as the single-frequency, receive/transmit bit of the status buffer 116. A high logic level of this bit indicates the selected frequency is present and a low logic level indicates the selected frequency is not present.

The center frequency of the filter and the detector is determined by the frequency at which each device is clocked. When both devices receive the same clocked signal, their center frequencies are identical. In the preferred embodiment both devices are clocked by a VCLK signal from a voltage controlled oscillator 252 shown in FIG. 8F. The voltage controlled oscillator 252 is controlled by a phase locked loop device 254. The phase locked loop device 254 provides a scaled reference oscillator which is compared with the scaled output of the voltage controlled oscillator 252. The phase locked loop 254 provides a control voltage for the voltage controlled oscillator 252. An OSC signal is provided from the device 254 to the filter 244.

The voltage controlled oscillator 252 can be jumpered to receive one of two control voltages. Both are derived from the phase locked loop 254. The first control voltage is from the 3-state output of the digital phase detector through a simple low-pass filter. The second is the differential of the reference oscillator phase and the VCO feedback phase from a differential opamp. This circuit is identified in FIG. 8F by the reference numeral 256.

The relay matrix control 136 is used for accessing the analog bus network 14 and applying the high and low impedance monitor signals. The low impedance monitor function provided through the relay matrix control 136 allows the circuit 18 to transmit and receive signals on the equipment/facility busses through an AC-coupled 600-ohm line matching transformer 258. Associated with the transformer 258 is the other 2-wire/4-wire hybrid circuit 138 which is shown in FIG. 8F as including operational amplifiers 260, 262 and their support circuitry configured to utilize phase cancellation to minimize the amount of feedback from transmitted signals into the receive section.

The relay matrix control circuit 136 includes five relays 230, 266, 268, 270, 272. Each relay contains two or four interdependent single pole double throw latching switches. The state of the switches is controlled by a pair of polarized coils, referred to as set and reset coils. The coils of each relay are connected in series in a negative-to-negative connection. The positive side of all the set coils are tied to a COMM line. In this configuration, the state of the latched switches in a particular relay is changed by placing a voltage of the proper polarity across the selected coil.

Control of the relays is effected through operation of a 1-to-8 line analog demultiplexer 274 and the associated switch connected between the data input and the COMM line shown in FIG. 8B. The three select lines of the demultiplexer 274 are controlled by bits 0-2 of the control register 114. The enable input of the demultiplexer 274 is controlled by the relay enable bit from the control register. The switch is controlled by bit 4 of the latch 158. Appropriate control of relays 268, 270, 272 connects the terminals thereof shown in FIG. 8F to the relays 230, 266 for subsequent connection therethrough to the elements 232, 258.

Figure 5:
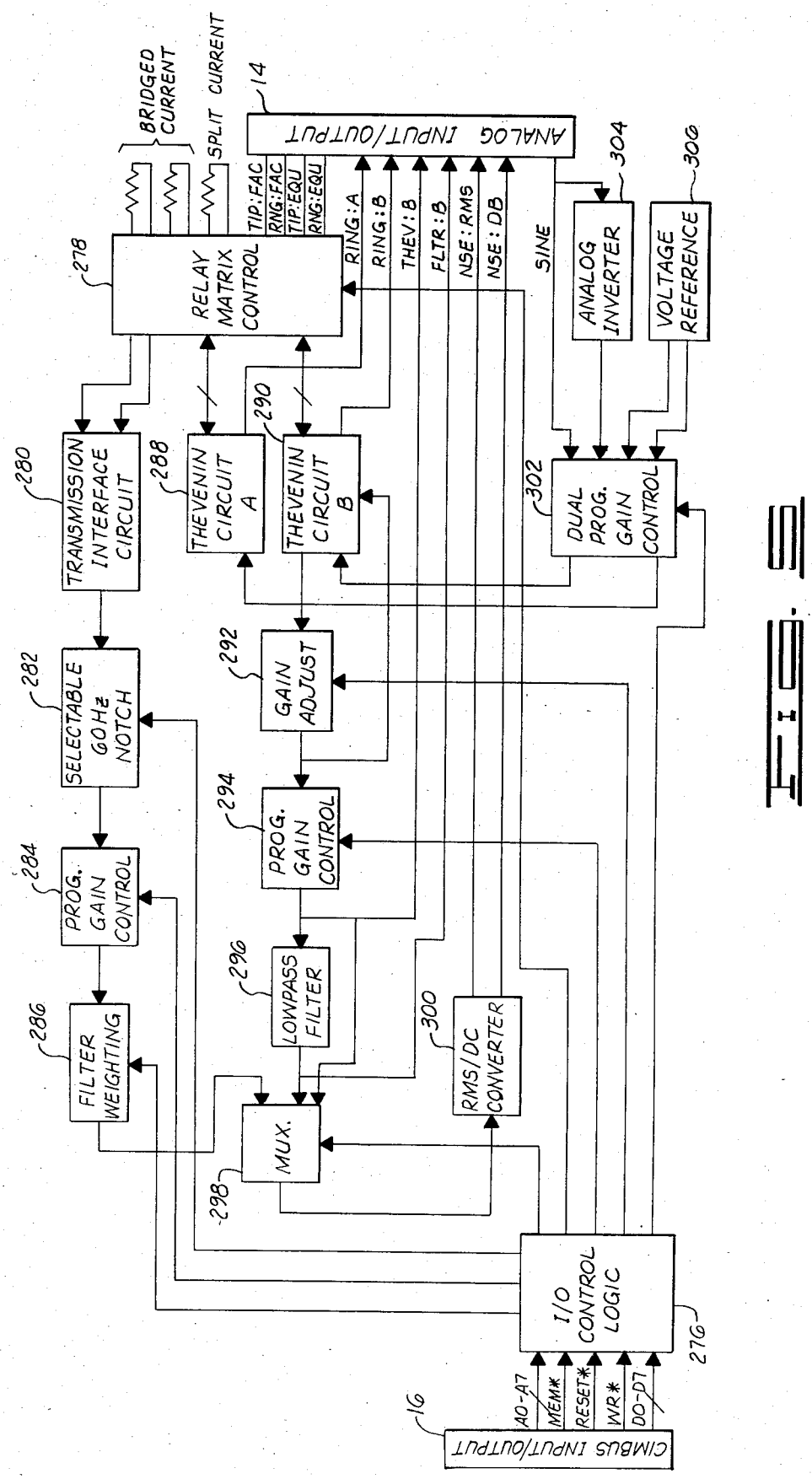
FIG. 5 is a block diagram an analog signal processor portion of the apparatus of the preferred embodiment.
Figure 5:
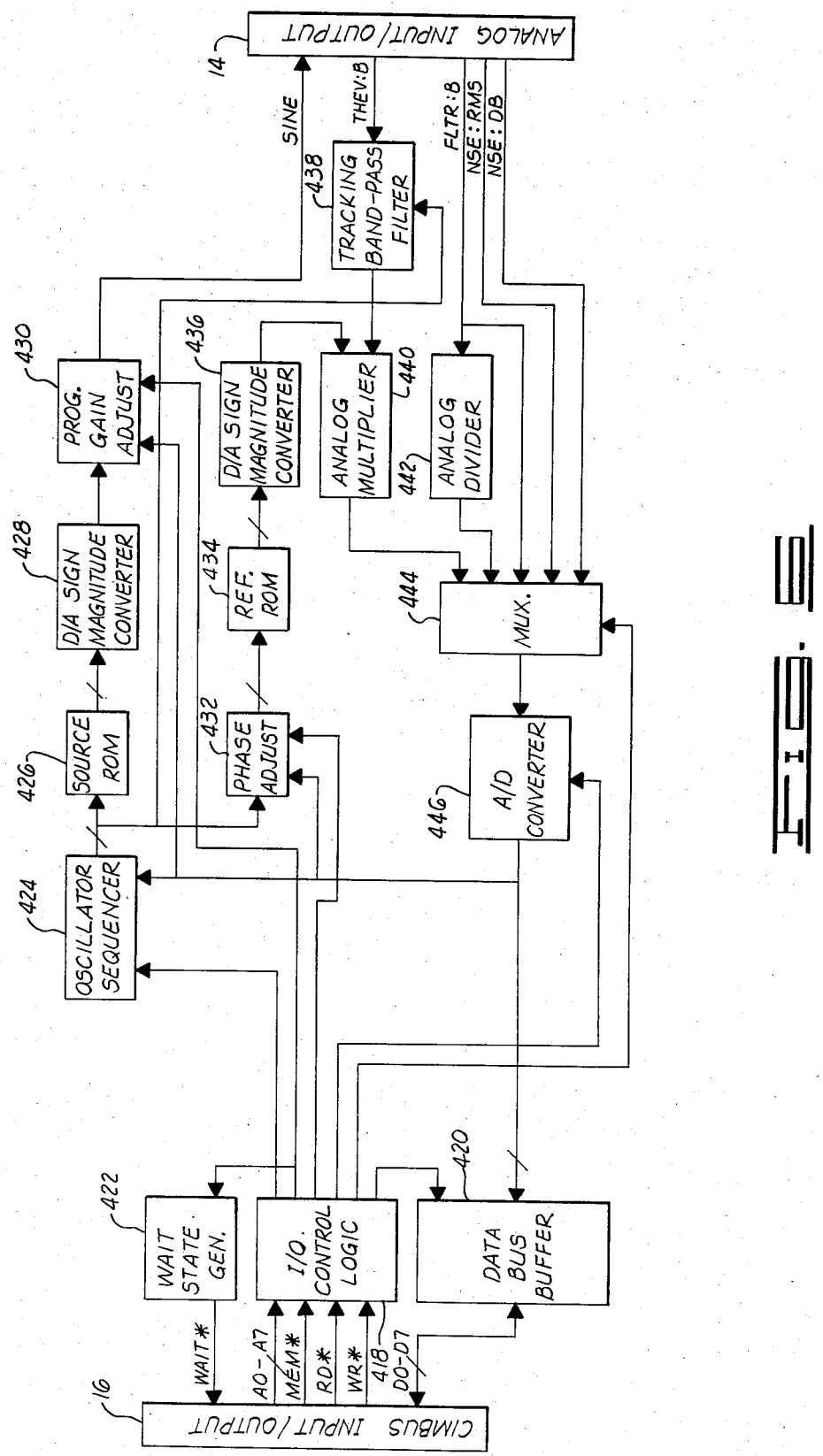

With reference to FIGS. 5 and 9A-9F, the preferred embodiment of the analog signal processor 22 will be described. FIG. 5 shows that the analog signal processor broadly includes input/output control logic means 276 which receives control signals over the CIMBUS (digital bus 16) to select and control the various other functional portions of the analog signal processor as indicated by the control lines emanating from the input/output control logic circuit 276 shown in FIG. 5. The analog signal processor also communicates with the analog bus 14 to receive connections with the selected circuit through the facility and equipment tip and ring lines. A precision sine wave is also received over the analog bus. Ring generation lines A and B are connected with the analog signal processor, and measurement signals labeled THEV:B, FLTR:B, NSE:RMS and NSE:DB are provided to the analog bus.

To properly connect and condition the selected tip and ring circuit for testing, the analog signal processor includes a relay matrix control 278. From the relay matrix control 278, the selected circuit can be tested through a noise metallic testing circuit or a Thevenin circuit. The noise metallic circuit includes a transmission interface circuit 280, a selectable 60-hertz notch filter 282, a programmable gain control circuit 284 and a filter weighting circuit 286. The Thevenin circuit includes a Thevenin circuit A 288 and a Thevenin circuit B 290. Testing of the Thevenin circuit occurs only through the circuit B 290 which is connected to a gain adjustment circuit 292 which is connected to a programmable gain control circuit 294. The output of the programmable gain control circuit 294 is the THEV:B signal which is provided directly to the analog bus 14 and also to a low pass filter 296. The output of the low pass filter 296 is the FLTR:B signal which is provided directly to the analog bus. Both the THEV:B and the FLTR:B signals are also provided to an analog multiplexer 298 which also receives the output from the filter weighting circuit 286. The signal selected through the multiplexer 298 is provided to an RMS/DC converter 300 which provides the NSE:RMS and NSE:DB signals.

Providing control signals to the Thevenin circuits 288, 290 is a dual programmable gain control circuit 302 which receives inputs directly from the sine wave provided over the analog bus and from an analog inverter 304 which inverts the sine wave; DC signals are received from a voltage reference 306.

The aforementioned elements of the analog signal processor will be more particularly described with reference to the preferred embodiment shown in FIGS. 9A-9F. Generally, however, the analog signal processor provides circuit routing and conditioning between the network interface matrix 20 and the analog signal measurement circuit 24. Once the analog signal processor is connected to a matrix 20-selected telephone circuit via the analog bus network 14, the circuit can be configured within the circuit 24 into one of two basic states: bridged or split/terminated. This routing occurs through the relay matrix control 278. Once the selected circuit has been configured into one of these two basic states, it can then be conditioned for either noise metallic measurements or Thevenin measurements, with the Thevenin measurements either being a Thevenin voltage or a Thevenin current measurement. These measurements can be conditioned by various low pass, notch and weighting filters prior to being passed through the analog bus network 14 to the analog signal measurement circuit 24 for analysis. The noise metallic conditioning occurs through the elements 280, 282, 284, 286 and the Thevenin conditioning occurs through the elements 288, 290, 292, 294, 296, 302, 304, 306. The selected measurement is then passed through the analog multiplexer 298 for further conditioning by the RMS/DC converter 300.

Figure 9G:
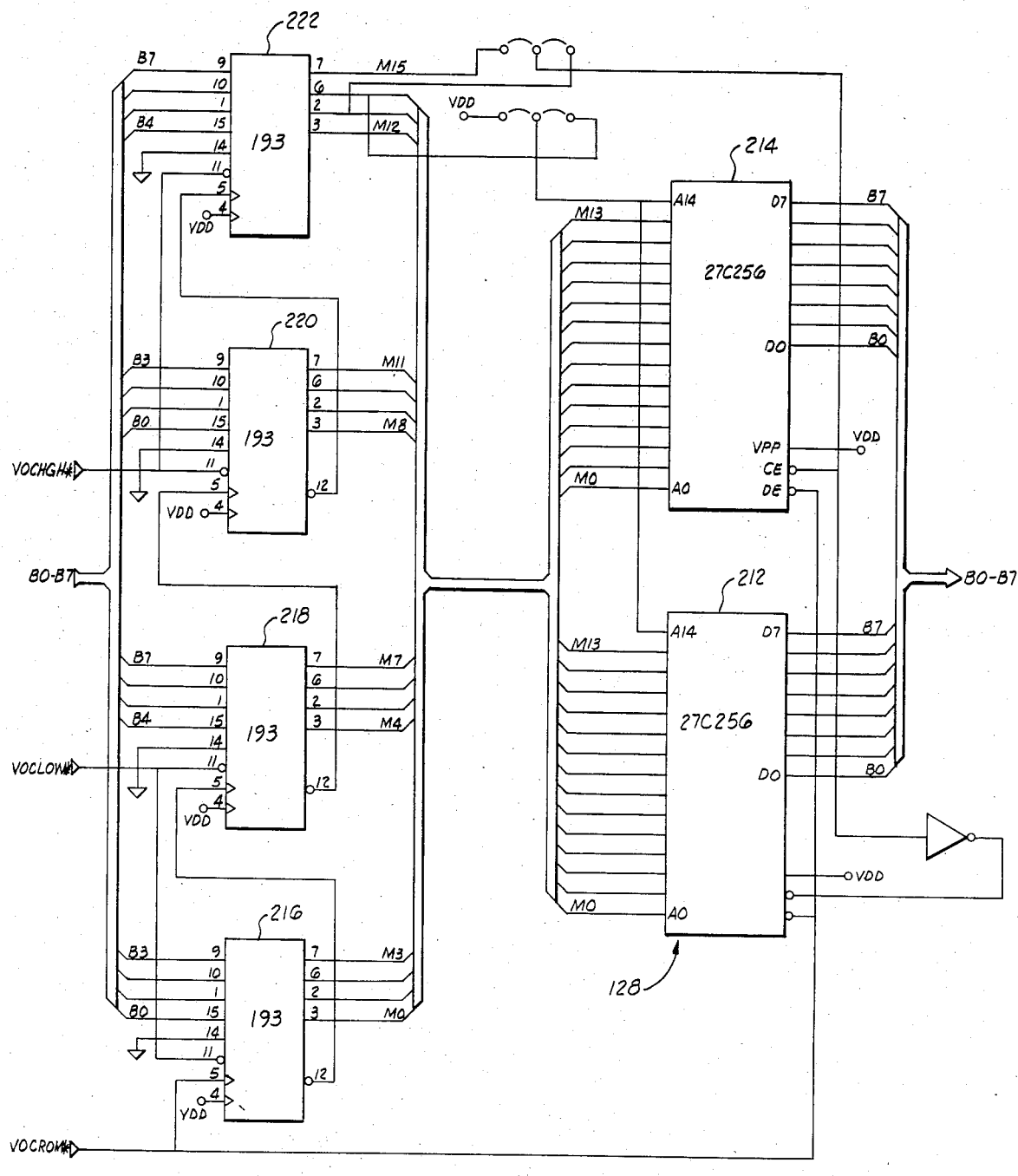
FIGS. 9A-9F are schematic circuit diagrams of a specific embodiment of the analog signal processor portion.

The aforementioned circuits of the analog signal processor are controlled by the microprocessor within the central processing unit 26 over the digital bus network 16. FIGS. 5 and 9A show that the specific digital bus signals used in the preferred embodiment by the processor 26 include the address lines A0-A7, the data lines D0-D7, the memory select signal (MEM*), the write signal (WR*) and the reset signal (RESET*). These signals are received by the interface circuits of the analog signal processor as shown in FIG. 9A to allow the analog signal processor 22 to serve as a CIMBUS slave device. Quad address buffers 308 receive address information from address lines A0-A3 and distribute it to an address decoding logic circuit 310. Address lines A4-A7 are decoded directly by a base decoder circuit 312. The data lines D0-D7 are received by an octal buffer 314. The memory select, write and reset signals are utilized as also shown in FIG. 9A. As indicated throughout FIGS. 9A-9F, these interface circuits provide many of the control signals for controlling the remaining functional elements of the analog signal processor 22.

The routing function of the analog signal processor is accomplished by the relay matrix control 278. The relay matrix control circuit 278 receives a single split circuit from the network interface matrix via the analog bus network 14. The plit circuit enters the analog signal processor 22 as the facility tip, facility ring, equipment tip and equipment ring lines labeled in FIG. 9F. These lines are connected to a relay 316 shown in FIG. 9F. The relay 316 can route the circuit to either a relay 318 or a relay 320. The relay 318 leaves the circuit split and terminates either the facility or the equipment side. The relay 320 bridges the circuit and places a precision one ohm, one-half watt resistor in series with each leg for loop current measurements. A resistor 322 is used with the tip line and a resistor 324 is used with the ring line.

Both of the relays 318, 320 are connected to a relay 326. The relay 326 selects whether measurements are taken across the tip and ring line for voltage measurements (via the relay 318) or across the series resistors for current measurements (via the relay 320). The relay 326 routes the selected configuration to a relay 328 which either passes the tip and ring lines directly through or reverses them. The relay 328 routes the configured tip and ring lines to a relay 330 which in turn routes the circuit to be conditioned for either noise metallic measurements or Thevenin measurements. In particular, the relay 330 routes the circuit to either a relay 332 or a relay 334. The relay 332 selects whether tone will be sent to the circuit or noise metallic measurements will be taken. The connections between the relay 330 and the relay 332 are AC-coupled by capacitors 336, 338. The relay 334 selects between Thevenin voltage and current measurements. When Thevenin measurements are selected, relays 340, 342, 344, 346 provide ground, start and loop current (off-hook) configurations for the circuit under test. The relay 342 ties the ring line to the relay 344 through a resistor 348. The relay 344 ties the other side of the resistor 348 to either the tip line or to digital ground. The relay 340 ties the tip line to digital ground, and the relay 346 connects digital ground to the central office ground.

The aforementioned relays shown in FIG. 9F achieve the described functions in response to control signals from the relay control portion of the relay matrix control 278. This portion is shown in FIG. 9A. This portion includes a relay control latch which decodes one of sixteen relay addresses and thereby selects the corresponding relay. The relay control latch includes an octal latch 350 into which data are written from the data buffer 314. The relay control latch also includes two 1-to-8 line analog demultiplexers 352, 354 and a voltage polarity switch 356. Each demultiplexer controls a respective bank of eight relays. Of the total sixteen relays controlled by the relay control latch, twelve form part of the relay matrix control 278. The remaining four relays will be described hereinbelow with reference to other portions of the analog signal processor 22.

When a relay is selected through the control lines of the demultiplexers 352, 354, the polarity of the voltage applied across the coils of the selected relay is determined by the state of bit 6 of the octal latch 350 which controls the state of the voltage polarity switch 356. In the preferred embodiment, when the bit 6 is high, the switch 356 places a +15 V on the COMM line and a 31 15 V on the positive side of the reset coil in the selected relay. This latches the contacts of the selected relay in the set position. When the bit 6 is low, the switch 356 places −15 V on the COMM line and +15 V on the positive side of the reset coil in the selected relay. This latches the contacts of the selected relay in the reset position. An RC network has been incorporated on each relay between each select line from the demultiplexers and the COMM line to provide coil discharge protection for the demultiplexers.

Through the operation of the relay control latch and the relays 316, 318, 320, 326, 328, 330, 332, 334, 340, 342, 344, 346, the selected circuit is conditioned for either having the noise metallic measurements or the Thevenin measurements made. Each of these measurement techniques requires specific line conditioning which is achieved through the function of the remaining portions of the analog signal processor 22.

For noise metallic measurements, the circuitry is used to determine the amount of noise present on a normally terminated (600 ohm) line. The tip and ring lines are AC-coupled through the capacitors 336, 338 prior to being routed through the relay 332 to the noise metallic front end. By appropriate actuation of the relay 332, these lines are connected across the primary of a transformer 358 and a 600-ohm terminating resistor 360 shown in FIG. 9C. One side of the secondary of the transformer 358 is connected to ground, and the other side of the secondary is connected for selectable routing through the 60-hertz notch filter 282 or directly to the programmable gain control circuit 284. The transformer 358 and the resistor 360 define the preferred embodiment of the transmission interface circuit 280 shown in FIG. 5.

The preferred embodiment of the 60-hertz notch filter 282 is shown in FIG. 9C. If the filter 282 is to be used, it is selected through a relay 362 which is controlled by the NOTCH signal from the demultiplexer 352. If the filter 282 is not selected, the line from the secondary of the transformer 358 is connected through the relay 362 to the programmable gain control circuit 284 having a preferred embodiment also shown in FIG. 9C. The connection from the relay 362 to the gain control circuit 284 is made through a relay 364 which is controlled by the MEA/TONE signal from the demultiplexer 352. The gain control circuit 284 permits one of four discrete levels of gain to be selected for the measurements to be performed. This is achieved through a dual 4-to-1 analog multiplexer having latching select and enable inputs. This multiplexer is identified in FIG. 9C by the reference numeral 366. The output from the multiplexer 366 passes through an operational amplifier 368 functioning as a low-pass filter. The circuit under test is routed through four different scaling resistors 370, 372, 374, 376 to the four inputs of the multiplexer 366. The output of the multiplexed and scaled circuit is connected to the inverting input of the operational amplifier 368. The output of the operational amplifier 368 is connected to the remaining four inputs of the other half of the multiplexer 366. This configuration insures that the internal multiplexer resistance placed on the input leg is compensated by the relatively equal resistance placed on the feedback leg, thereby cancelling any unwanted effect on the circuit gain.

The output of the operational amplifier 368 is provided to one input of the multiplexer 298 and also to a filter circuit 378 which provides outputs to the multiplexer 298 and to a weighting filter multiplexer 380 (FIG. 9B). The weighting filter multiplexer 380 allows the selection of one of three circuit weightings (program, C-message and C-message with 1010 notch) plus an analog ground reference. The weighting filter multiplexer 380 includes a dual 4-to-1 analog multiplexer 382 and an operational amplifier circuit 384. The three weighting filters and the analog ground reference are connected to the four inputs of one-half of the multiplexer 382 as shown in FIG. 9B. The output of the multiplexed filters is connected to the operational amplifier circuit 384. The output of the operational amplifier circuit 384 is connected to the four inputs of the other half of the multiplexer 382, the output of which is also connected to the operational amplifier circuit 384. The operational amplifier circuit 384 forms a low-pass filter. This configuration insures that the internal multiplexer resistance placed on the input leg is compensated by the relatively equal resistance placed on the feedback leg, thereby cancelling any unwanted effect on the filter response. The output of the operational amplifier circuit 384 is also connected to one input of the AC signal multiplexer 298.

The Thevenin measurement circuitry performs three functions. First, it can be used to obtain voltage and current information about the line under test. It can also apply forcing functions to the line under test. The forcing functions can be either an AC or DC stimulus which can be used to determine the capacitance or resistance of the line. The same forcing functions can be applied as test tones to be utilized by test equipment at the far end of the line under test. The test tones can also be used for ring generation in conjunction with the ring and standard circuit 30.

The Thevenin measurement circuit includes five functional areas: a dual independent attenuatable AC/DC signal source, a current buffered measurement operational amplifier circuit, a current buffered guard operational amplifier circuit, a 3-way selectable precision feedback resistor, and a variable gain differential instrumentation amplifier. Part of the dual independent attenuatable AC/DC signal source and the current buffered guard operational amplifier circuit define the Thevenin circuit A 288 and a portion of the dual independent attenuatable AC/DC signal source and the current buffered measurement operational amplifier circuit define the Thevening circuit B 290 shown in FIG. 5. The 3-way selectable precision feedback resistor circuit defines the gain adjustment circuit 292, and the variable gain differential instrumentation amplifier defines the preferred embodiment of the programmable gain control circuit 294. Also forming part of the Thevenin measurement circuitry is the low pass filter 296. The preferred embodiments of these elements are shown in FIGS. 9D and 9E.

The dual independent AC/DC signal source includes a voltage reference select circuit and a digital-to-analog converter. Channel A of the digital-to-analog converter drives the current buffered guard operational amplifier circuit and channel B drives the current buffered measurement operational amplifier circuit. The Thevenin reference select circuit includes a reference select latch or multiplexer 388 (FIG. 9D) which provides routing of AC and DC voltage references to both halves of a dual digital-to-analog converter 386 (FIG. 9D). The latch 388 establishes one of four combinations of reference inputs. The AC reference is a variable frequency sine wave received over the analog bus network 14. An inverted AC reference is obtained through the analog inverter circuit 304 having a preferred embodiment shown in FIG. 9D as including an operational amplifier 390. The DC reference is generated within the analog signal processor 22 by the voltage reference circuit 306 having a specific embodiment as shown in FIG. 9D.

The dual digital-to-analog converter 386 provides an attenuatable AC or DC test signal to the Thevenin measurement circuitry. Channel A of the converter 386 controls the guard signal, and channel B controls the measurement signal.

Figure 9D:
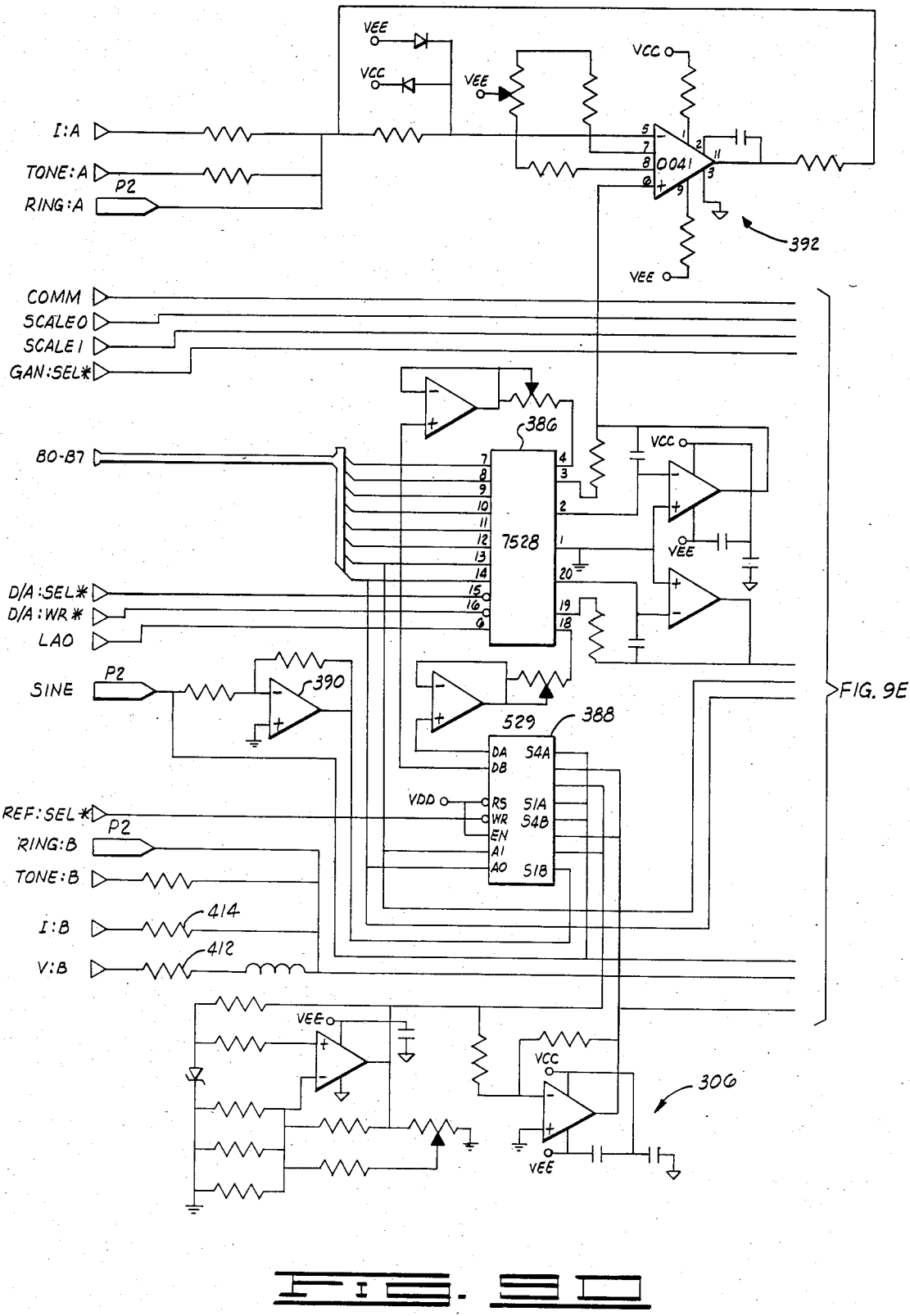
Figure 9E:
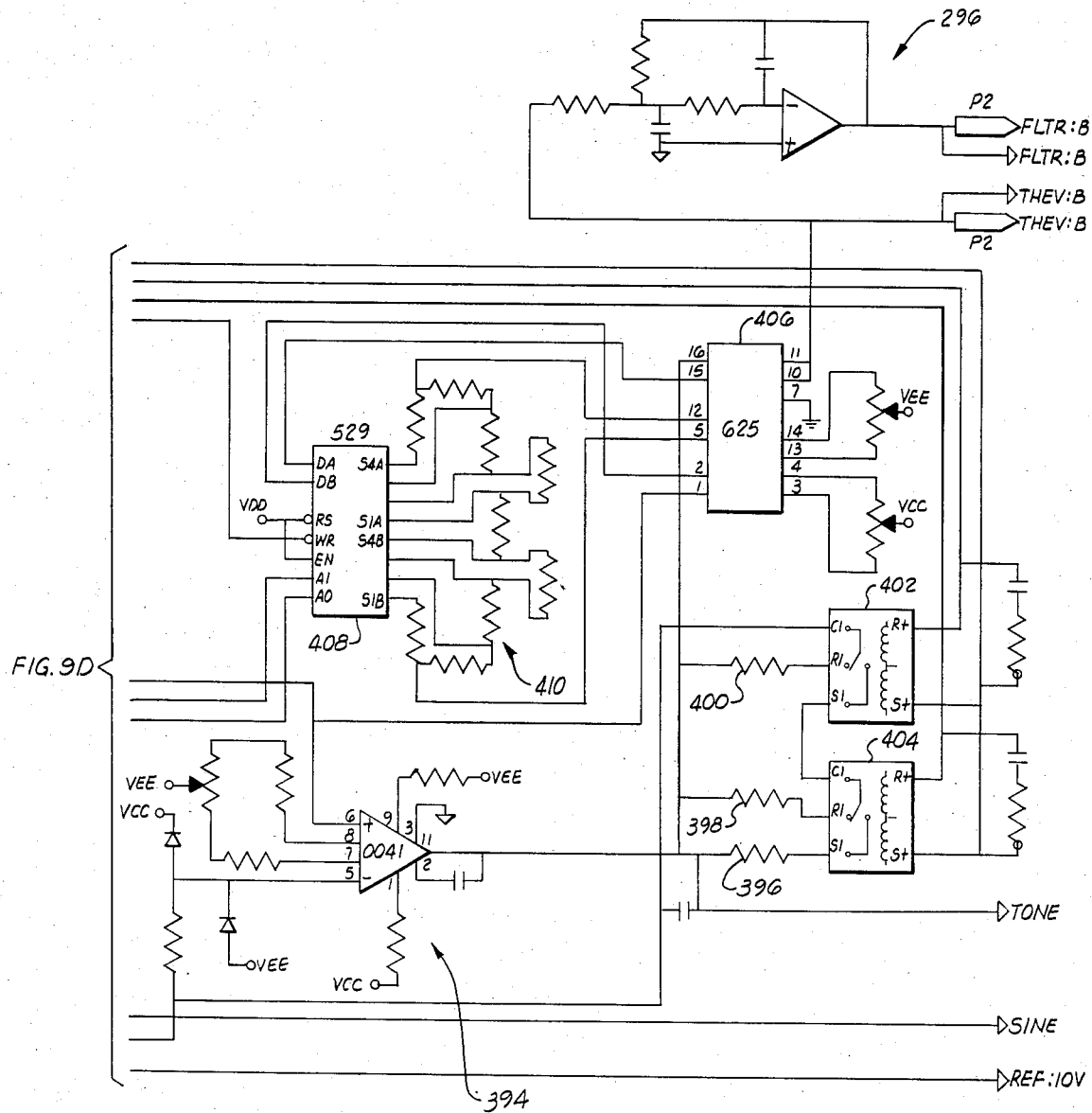

The current buffered guard operational amplifier circuit is identified in FIG. 9D by the reference numeral 392. It is used to provide a stimulus to an adjacent leg of the line under test, which stimulus is identical to the one provided through the current buffered measurement operational amplifier circuit generally identified by the reference numeral 394 in FIG. 9E. By providing and identical stimulus through the guard circuitry 392, parallel current paths which would bias the measurement results are eliminated.

The current buffered measurement operational amplifier circuit 394 is used to perform all Thevenin measurements. Voltage and current measurements are performed by applying them as a source. Capacitance, resistance and test tone generation are performed by utilizing the high current capability of the circuit 394 to drive the line under test with either an AC or DC reference stimulus.

The 3-way selectable precision feedback resistor used to define the gain adjustment circuit 292 has the preferred embodiment shown in FIG. 9E as including three resistors 396, 398, 400 which provide scaling of the gain of the operational amplifier circuit 394 through substitution of one of the resistors 396, 398, 400. Substitution is made by appropriate control of relays 402, 404 which are controlled by the SCALE0 and SCALE1 signals, respectively, from the demultiplexer 352.

The variable gain differential instrumentation amplifier defines the programmable gain control circuit 294 and is shown in FIG. 9E. This circuit includes a precision operational amplifier 406 which performs a current-to-voltage conversion by which the Thevenin measurements are accomplished. To avoid saturating the differential amplifier 406 or to boost the sensed voltage for greater accuracy, it is often necessary to scale the voltage. This is accomplished with a multiplexer 408 having four configurations of feedback resistors 410 connected to the inputs thereof. One of the four configurations is selected by appropriate control of the multiplexer 408.

The output of the differential amplifier 406 represents the THEV:B signal. This signal is also connected to the low pass filter 296 in the specific embodiment shown in FIG. 9E for providing the FLTR:B signal.

The Thevenin voltage and current measurements are accomplished by applying one side of the circuit pair under test (labeled in the drawings V:B for voltage or I:B for current) as the source to the inverting input of the measurement operational amplifier circuit 394 (FIG. 9E). The remaining side of the pair is grounded to system ground by appropriate operation of the relay 340 (FIG. 9F). The non-inverting input of the operational amplifier circuit 394 is grounded by the AC/DC signal source through the converter 386. This configures the operational amplifier circuit 394 as an inverting operational amplifier with three discrete ranges of gain provided by the 3-way selectable precision feedback resistors selected from the resistors 396, 398, 400. The non-inverting input of the differential amplifier 406 is also grounded and the inverting input is driven by the output of the operational amplifier circuit 394.

When measuring voltage, the line under test is routed through a one-megaohm, one-half watt resistor 412 (FIG. 9D). When measuring current, the line under test is routed through a 10-ohm resistor 414 (FIG. 9D). A readable voltage drop is measured across either the resistor 322 or the resistor 324 when measuring bridged current or across the resistor 348 (FIG. 9F) when measuring loop current. The unknown voltage or current on the circuit under test can then be obtained by applying standard operational amplifier equations in conjunction with the known gains and resistances used.

In addition to conducting Thevenin voltage and current measurements, Thevenin capacitance and resistance measurements can be obtained with the present invention. A single-pair telephone line can best be characterized as a triangle wherein the vertices represent tip, ring and shield (a conductive sheath encompassing the pair and connected to the central office ground) and the sides of the triangle represent the combined capacitance and resistance presented between each vertex. In a good pair, the capacitance varies in accordance with the length of the line, the gauge of the wire and the type of insulation; the resistance is virtually infinite. Attempting to measure the capacitance or resistance between any two vertices without the influence of the parallel path created by the remaining vertex is impossible using standard two-wire methods. The following measurement technique remedies this problem.

With the present invention, the Thevenin capacitance and resistance measurements assume a dry line (i.e., no voltage present). The measurement is accomplished by applying one side of the circuit pair under test (line I:B) to the inverting input of the measurement operational amplifier circuit 394. An AC or DC stimulus (AC for capacitance, DC for resistance) from the converter 386 is applied to the non-inverting input of the operational amplifier circuit 394. In this configuration the line under test is the unknown impedance with all other parameters being known. The same procedure and stimulus are simultaneously applied (as a line labeled I:A) to the remaining half of the pair connected to the guard operational amplifier circuit 392. This creates a potential difference of zero across the pair, thereby preventing any current from passing through the parallel path. Capacitance is determined by comparing the phase and magnitude of the AC reference signal with the measured AC signal. Resistance is determined by comparing the magnitude of the DC reference signal with the measured DC signal.

Test tones are sent in a similar manner with the exception that they are AC coupled through the capacitors 336, 338 and the relay 332. Identical AC signal sources are used for simplex; complementary ones are used for duplex.

The signals generated through these Thevenin tests are provided to the multiplexer 298 as the aforementioned THEV:B and FLTR:B signals. Also provided to the multiplexer are the signals from the noise metallic circuit. The noise metallic measurements are provided through the low pass filter provided by the operational amplifier 368 (FIG. 9C) receiving the signal from the measurement gain multiplexer 366. All noise measurements can be optionally routed through the 60-hertz notch filter 282 using the relay 362 and one of several weighting filters through the weighting filter circuitry including the elements 378, 380 (FIG. 9AB). The preferred embodiment of the multiplexer 298 is shown in FIG. 9B. This preferred embodiment allows selection of one of six different AC signals plus two analog ground references and routes the selected line to the RMS/DC converter 300. The multiplexer circuit 298 includes an 8-to-1 analog multiplexer 416. The output of the multiplexer 416 is connected to the RMS/DC converter circuit 300 having a preferred embodiment as also shown in FIG. 9B. The converter 300 provides both RMS and DB equivalents of its input. These two signals are provided to the analog bus network 14.

With reference to FIGS. 6 and 10A-10F, the preferred embodiment of the analog signal measurement circuit 24 will be described. In general, this circuit generates a precision AC forcing function for use by the analog signal processor 22, and it generates an on-board adjustable AC reference for measurement purposes. The analog signal measurement circuit also extracts analog measurement information from the circuit under test as selected by the network interface matrix and the analog signal processor. The analog signal measurement circuit also performs analog-to-digital conversions for digital analysis by the central processing unit 26.

More particularly, the analog signal measurement circuit provides circuit analysis and precision sine wave generation capabilities to the present invention. The analog signal measurement circuit receives the THEV:B, the FLTR:B, the NSE:RMS, and the NSE:DB signals over the analog bus network 14 from the analog signal processor. The THEV:B and FLTR:B signals are converted into Thevenin AC and Thevenin DC signals for multiplexing, along with the NSE:RMS and NSE:DB signals, through an analog signal multiplexer to an analog-to-digital converter. The output of the converter is provided over the digital bus network 16 to the central processing unit for use in computing the test result to be enunciated to the remote site 2.

As shown in FIG. 5, the preferred embodiment of the analog signal measurement circuit includes an input-/output control logic circuit 418, a data bus buffer circuit 420 and a wait state generation circuit 422. Each of these circuits interfaces with the digital bus network 16. The precision AC and the adjustable AC signals are provided within a numerically controlled oscillator portion of the analog signal measurement circuit. The numerically controlled oscillator portion includes an oscillator sequencer 424 used to generate both the AC forcing function provided to the analog signal processor and to generate the on-board adjustable AC reference. The AC forcing function is provided by a source read only memory circuit 426, a digital-to-analog sine magnitude converter circuit 428 and a programmable gain adjust circuit 430. The adjustable AC reference used within the analog signal measurement circuit is provided by a phase adjustment circuit 432, a reference read only memory circuit 434 and a digital-to-analog magnitude converter circuit 436.

The THEV:B signal received from the analog signal processor over the analog bus network 14 is filtered through a tracking band-pass filter circuit 438, the output of which is provided, along with the output from the converter 436, to an analog multiplier circuit 440. The FLTR:B signal provided from the analog signal processor over the analog bus network 14 is input to an analog divider circuit 442 and to an input of an analog signal multiplexer 444 having other inputs receiving signals from the analog multiplier 440, the FLTR:B signal, the NSE:RMS signal and the NSE:DB signal. The output of the multiplexer 444 is provided to an analog-to-digital converter 446 which converts the measurement information into digital format for use by the central processing unit 26 as provided through the data bus buffer 420 and over the digital bus network 16.

Figure 10A:
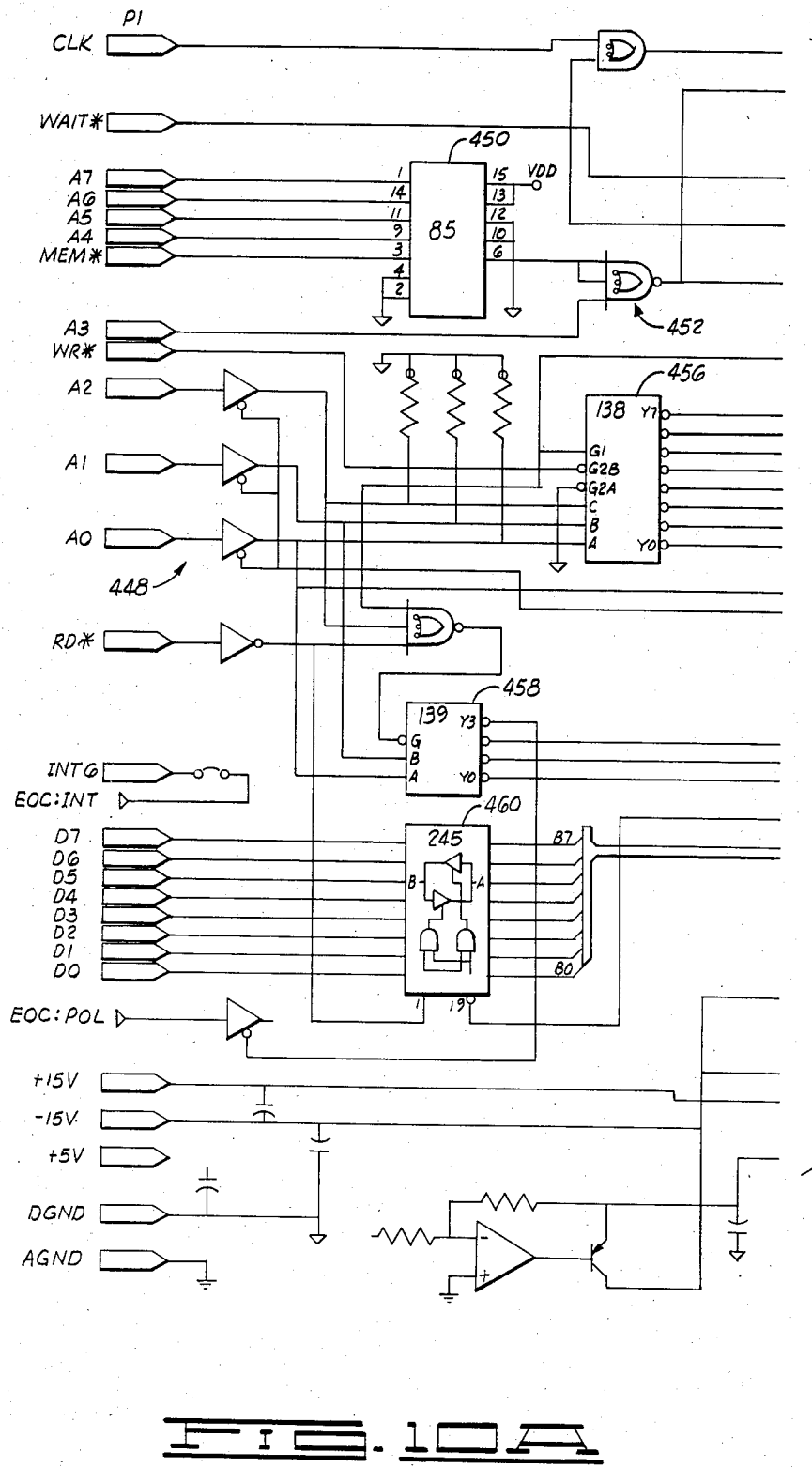
Figure 10B:
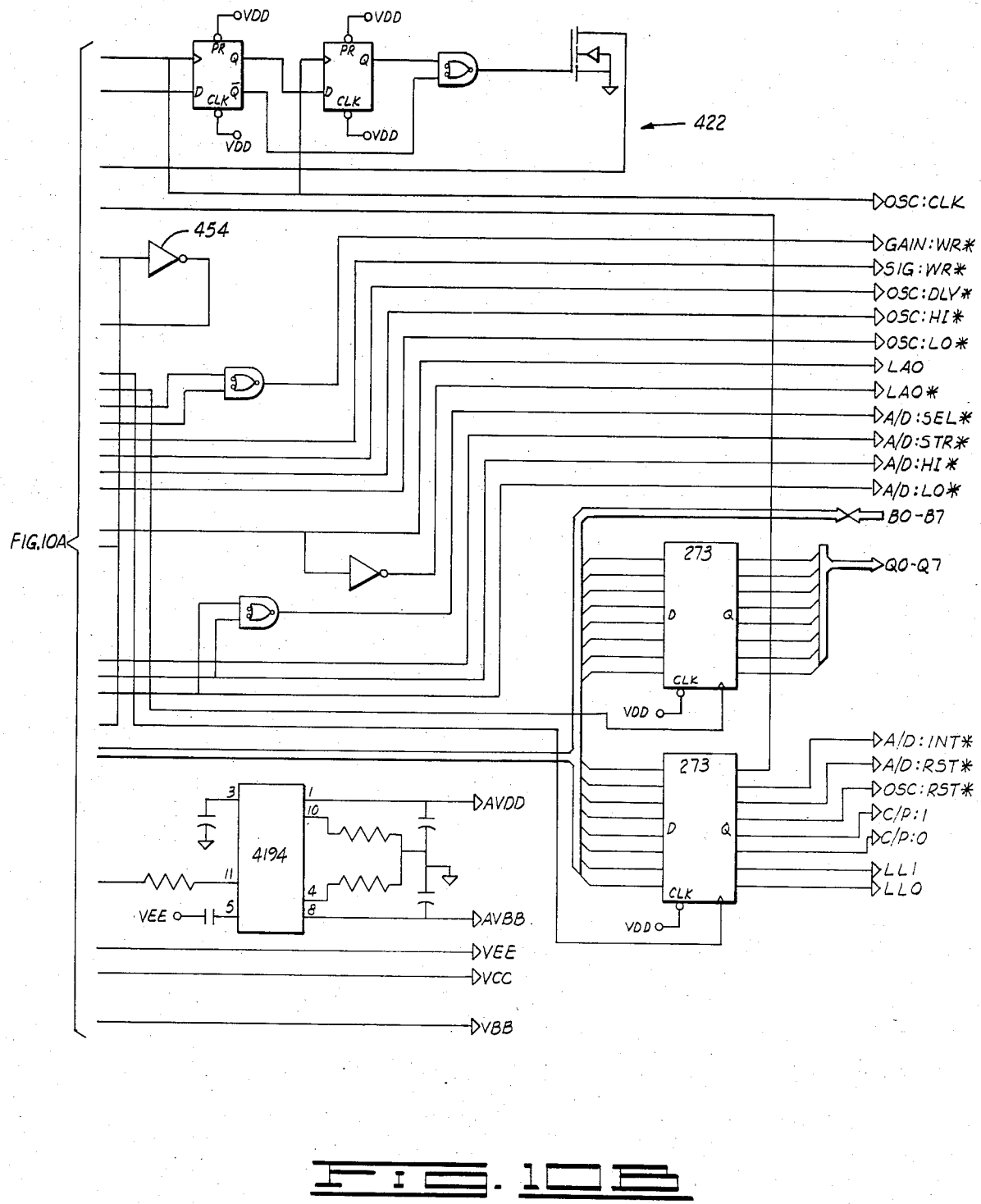

Referring to FIGS. 10A-10F, the preferred embodiments of these functional portions of the analog signal measurement circuit will be described. The input/output control logic circuit 418 includes address buffers 448 (FIG. 10A) receiving the A0-A2 address signals. The clock (CLK), memory select (MEM*), write (WR*) and read (RD*) signals are also received from the digital bus network 16. The base input/output select decoding is achieved by logic circuits 450, 452, 454 (FIGS. 10A and 10B). A demultiplexer 456 decodes eight write only ports and a demultiplexer 458 decodes four read only ports, which ports are identified by the labeling shown in the drawings (FIGS. 10A and 10B).

The data bus buffer 420 is shown in FIG. 10A as including a bi-directional buffer 460.

The preferred embodiment of the wait state generation circuit 422 is shown in FIGS. 10A and 10B. The output of this circuitry is provided to the wait (WAIT*) line of the digital bus network 16.

A numerically controlled oscillator circuit generates two digitally implemented, frequency adjustable, precision sine waves. The first sine wave is the source of a forcing function used by the analog signal processor when driving a line for capacitance measurements and test tone generation. This source can produce both sine and cosine functions. The second sine wave generated is used within the analog signal measurement circuit as a reference for the Thevenin AC measurement analog multiplier 440. The numerically controlled oscillator includes the oscillator sequencer 424 which is used to control the generation of both sine waves. The sequencer includes counter/adder circuitry having programmable counters 462, 464, 466, 468, 470, 472 (FIG. 10C). Clocking of these counters is by the system clock received over the digital bus network 16. This signal clocks latches 474, 476, 478 shown in FIG. 10C.

The upper ten bits from the counters sequentially address the source read only memory 426. The lower 16 bits act as an adder with an adjustable constant. The constant is controlled by a frequency control latch including latches 480, 482 (FIG. 10C). The upper ten bits are also provided to phase adjust counters/adders 484, 486, 488 (FIG. 10D) defining part of the phase adjustment circuit 432.

The frequency of the numerically controlled oscillator is determined by the rate at which the source read only memory 426 is sequentially addressed. The upper ten bits of the counters are incremented every time the 16-bit adder rolls over. The rate at which the adder rolls over is determined by the value of the constant added to the adder each time it is clocked by the CIMBUS system clock. This value is determined through the frequency control latch having the elements 480, 482. A smaller constant entered into this latch will cause the adder to roll over relatively slowly. Thus, the larger the constant, the more quickly the adder will roll over.

As previously mentioned, the upper ten bits from the oscillator sequencer 424 control the source read only memory 426. The preferred embodiment of this read only memory 426 is shown in FIG. 10D. The read only memory 426 is the source for the forcing functions and test tones provided to the analog signal processor. The output of the read only memory 426 is latched into a latch 490 in response to the system clock signal. The output of the latch 490 is provided to the digital-to-analog sign magnitude converter circuit 428.

Figure 10E:
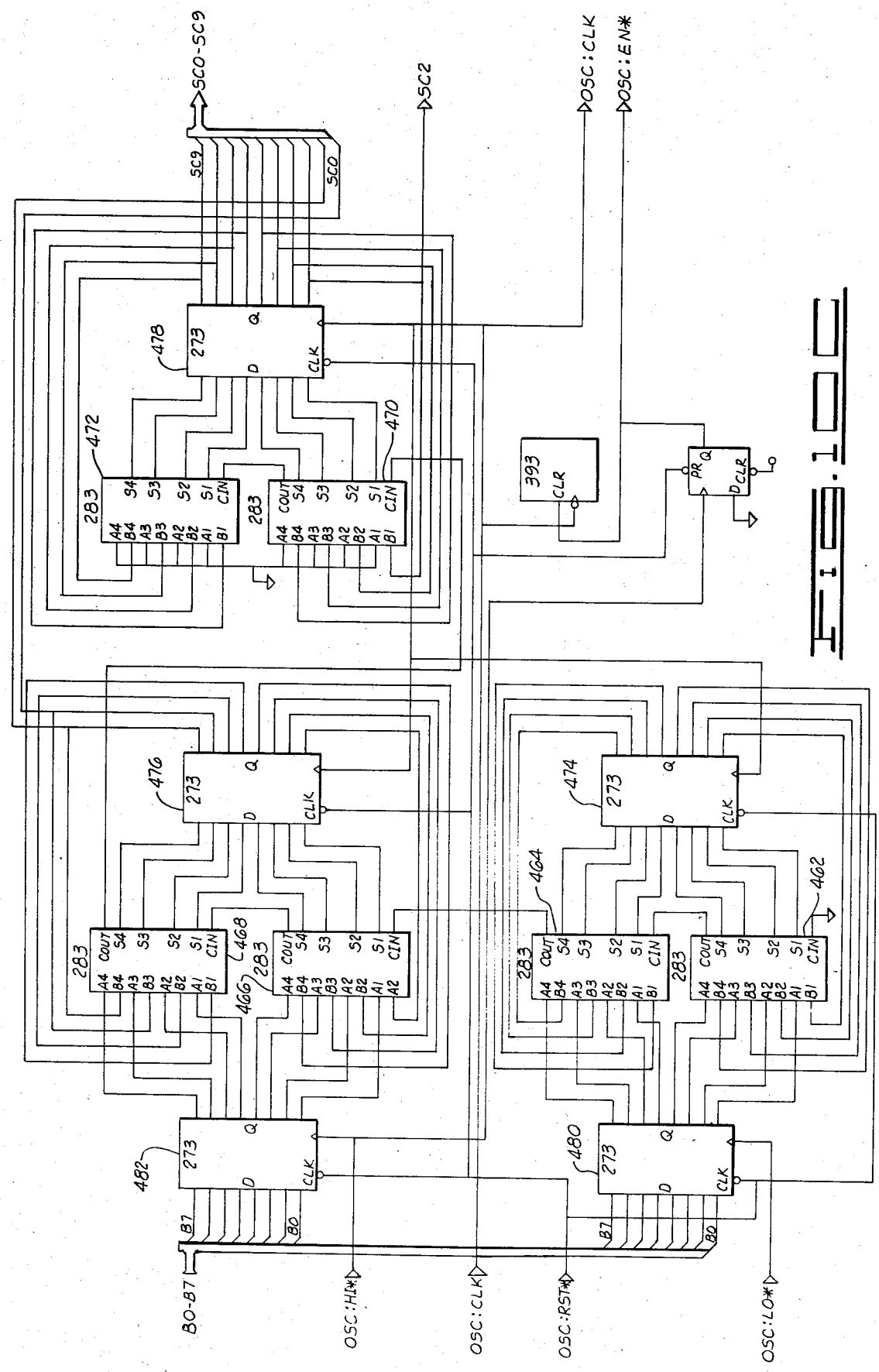
Figure 11A:
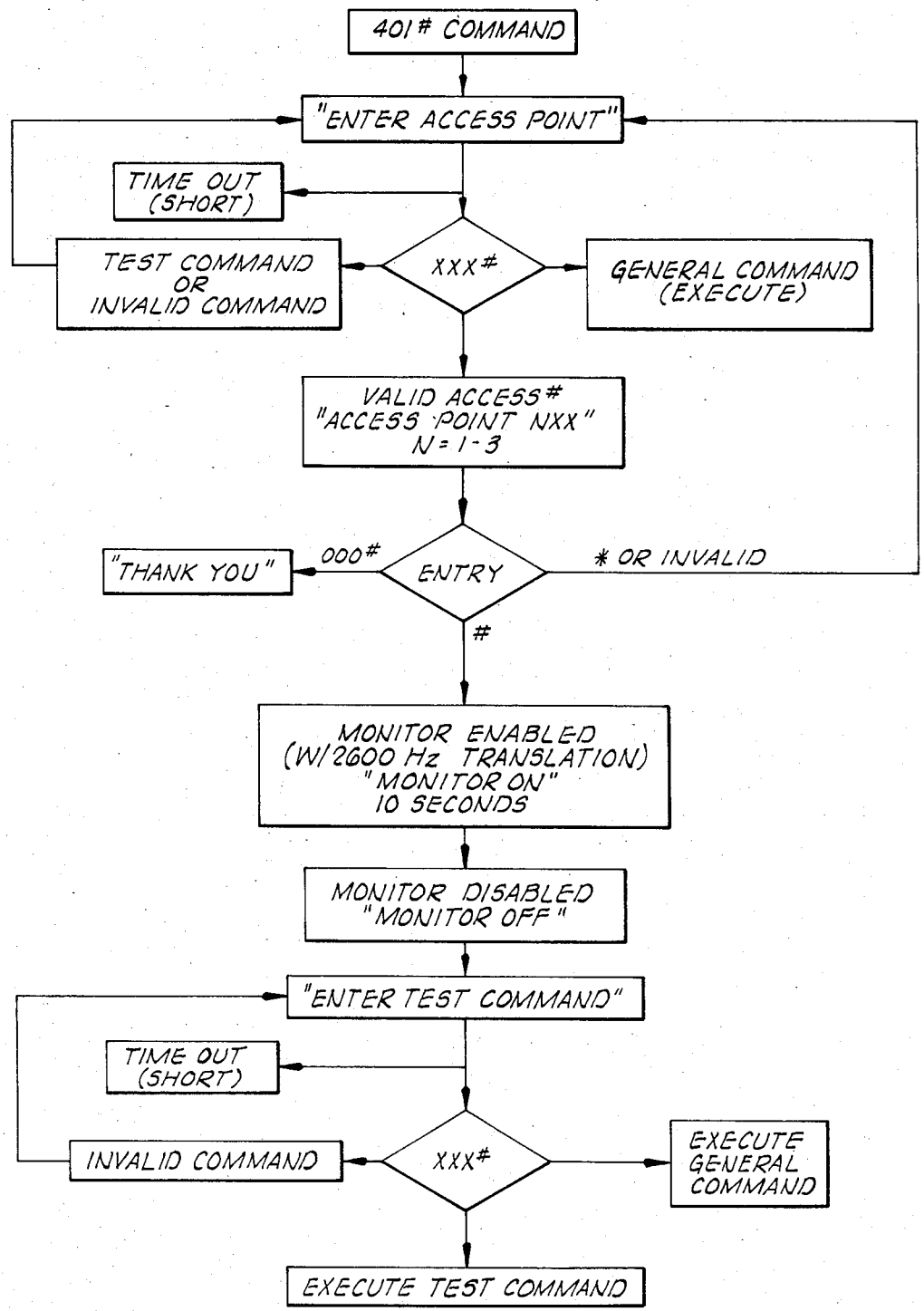
FIGS. 11A-11AA are flow charts for commands for controlling the apparatus of the preferred embodiment.
Figure 11B:
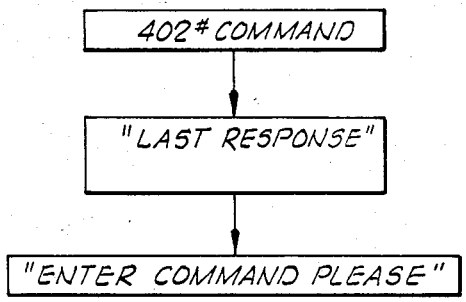
Figure 11C:
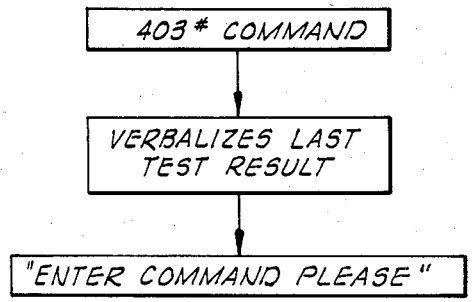
Figure 11D:
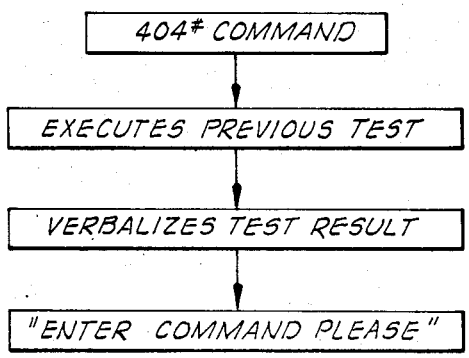
Figure 11E:
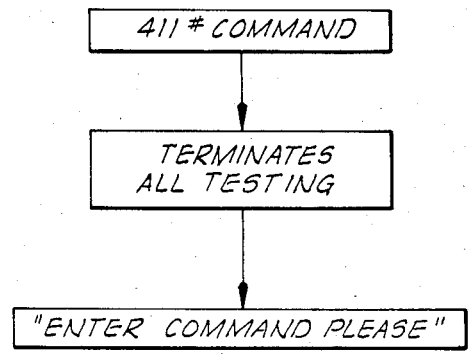
Figure 11F:
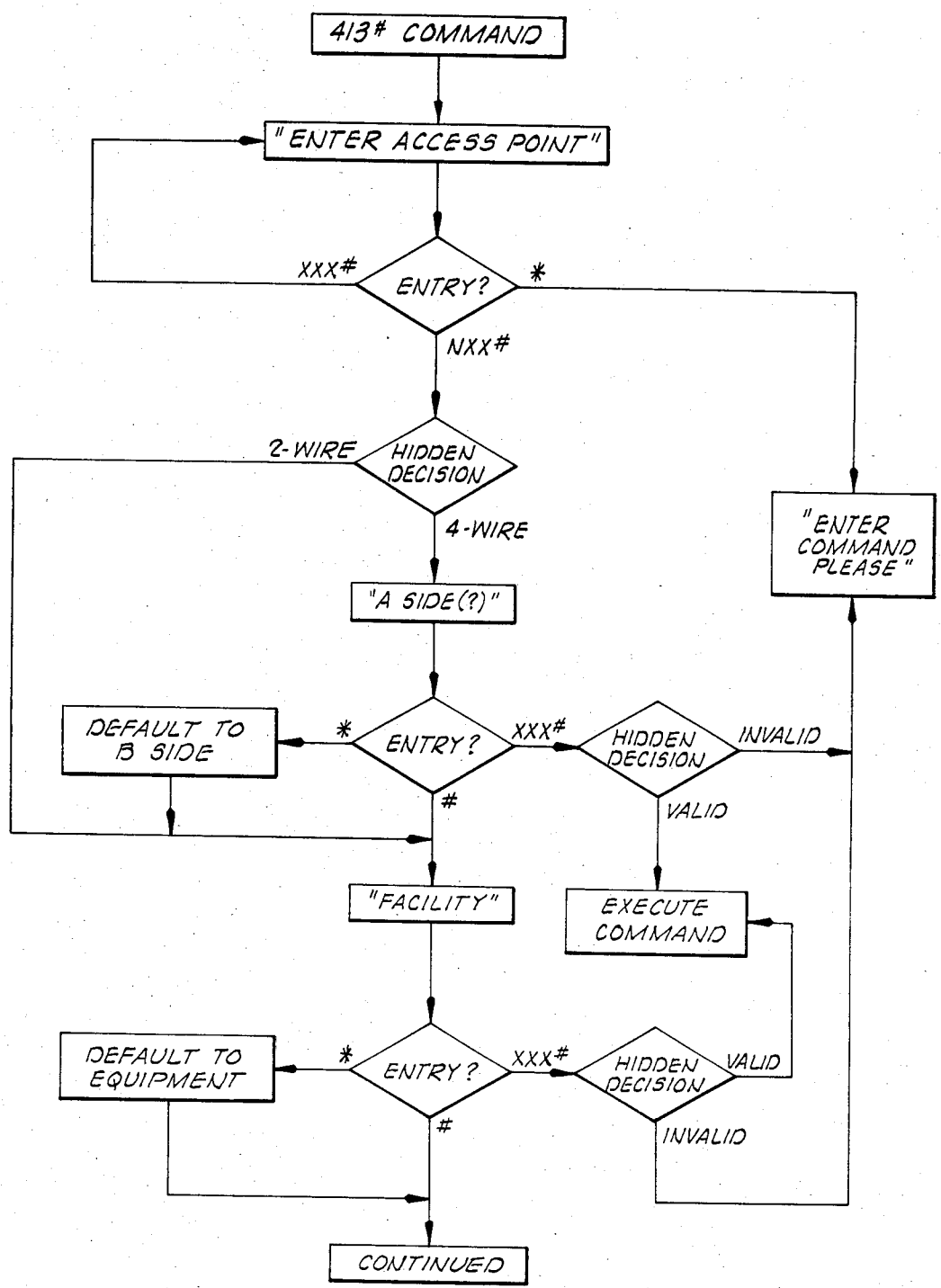
Figure 11F:
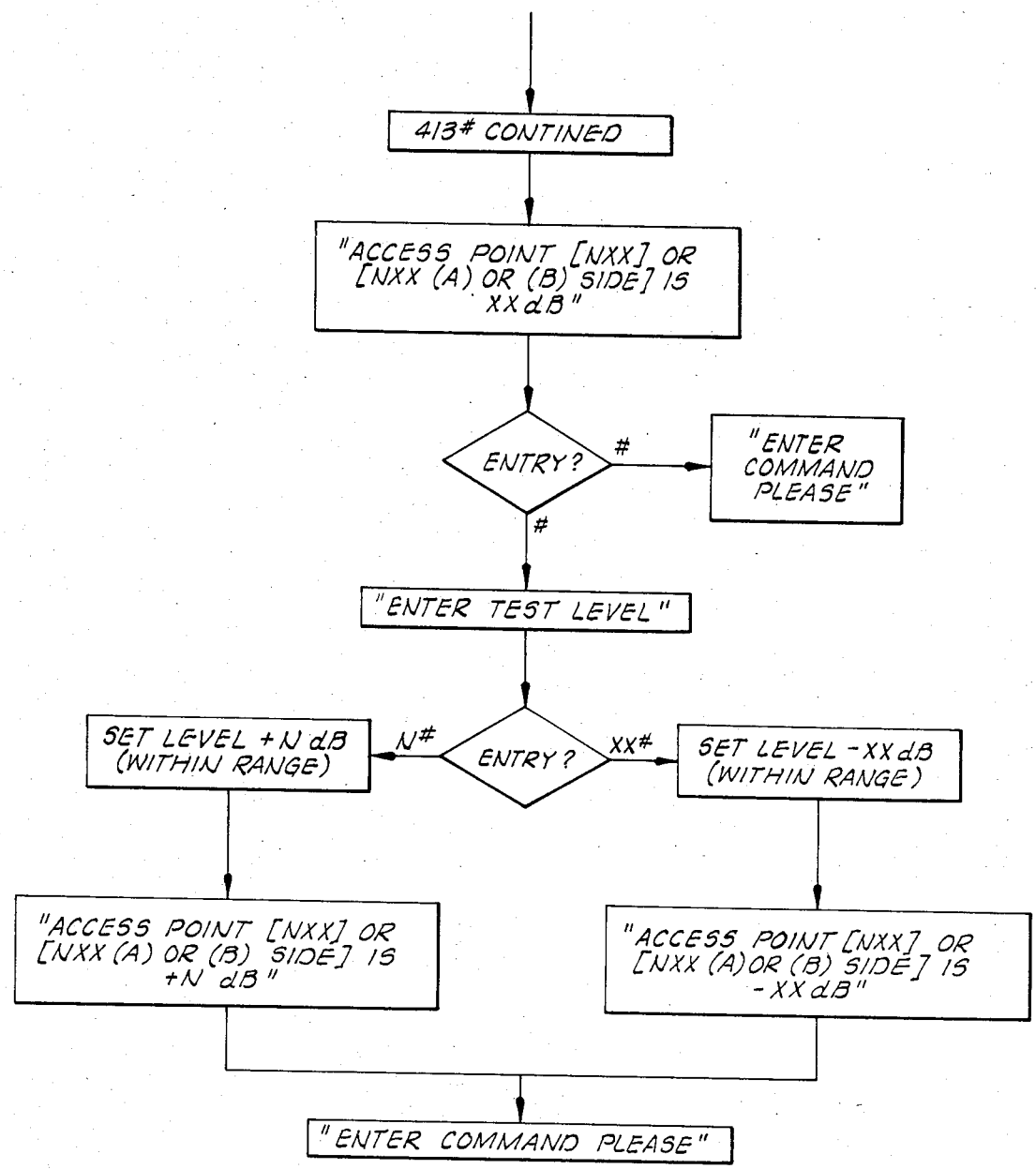
Figure 11G:
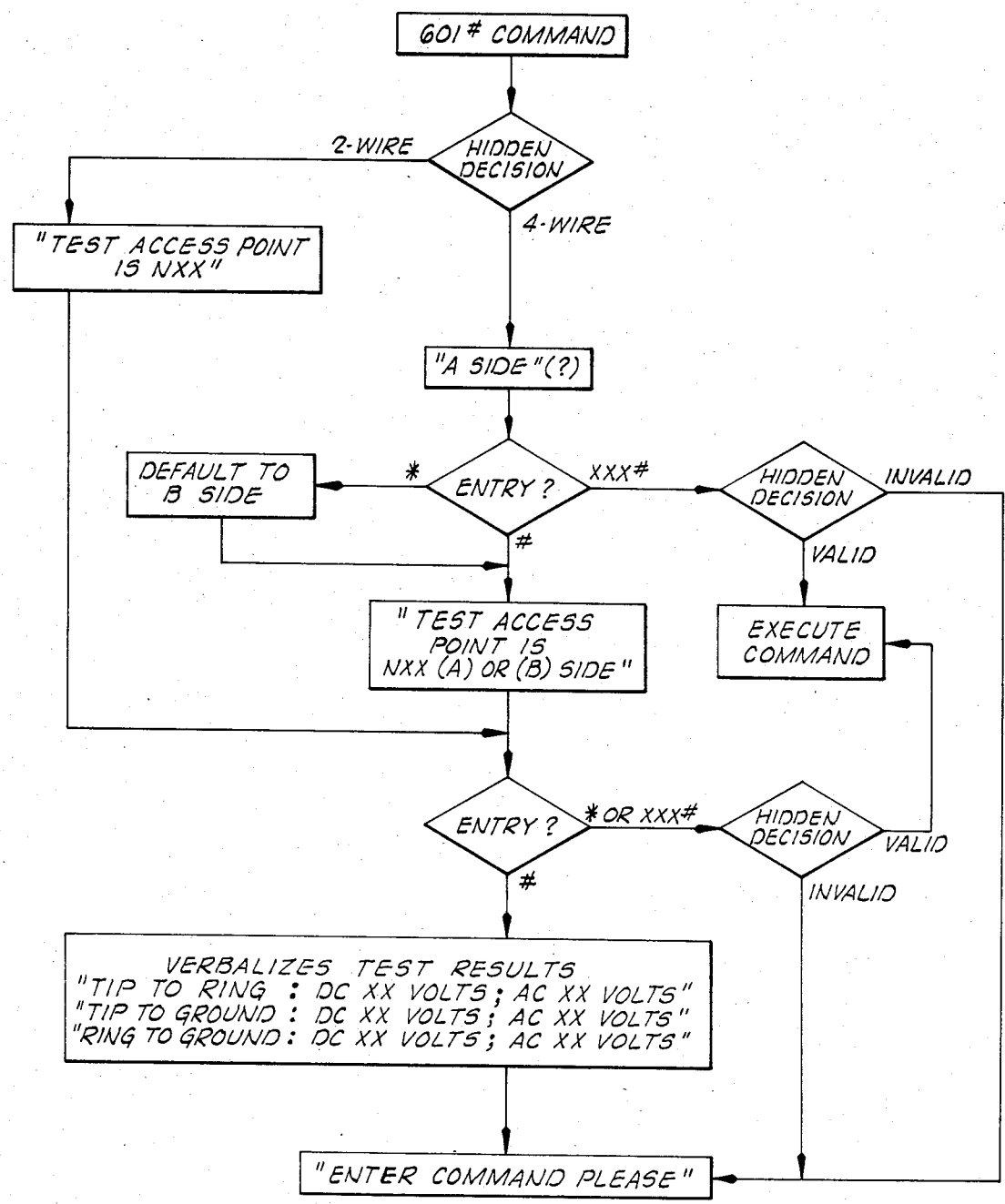
Figure 11H:
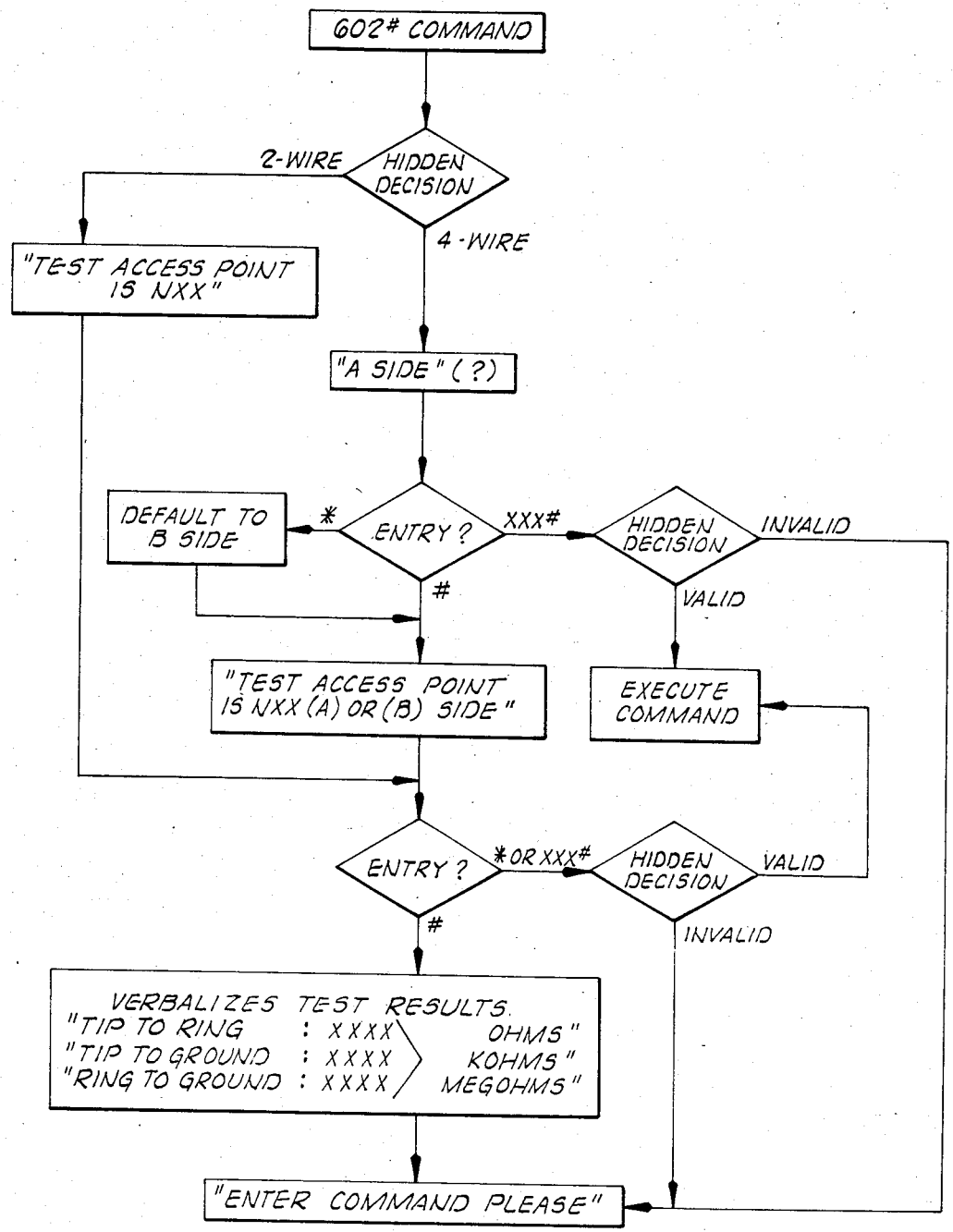
Figure 11I:
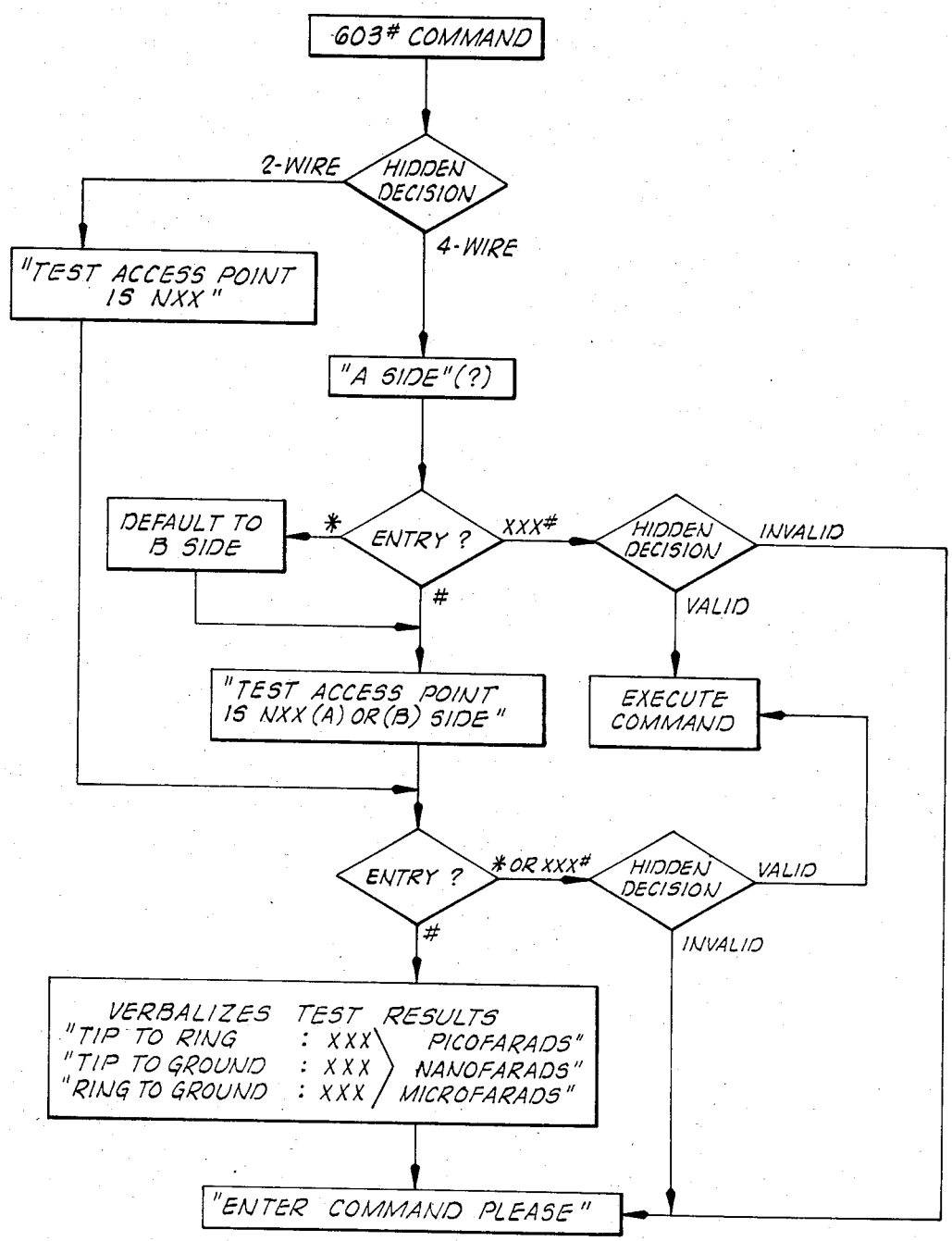
Figure 11J:
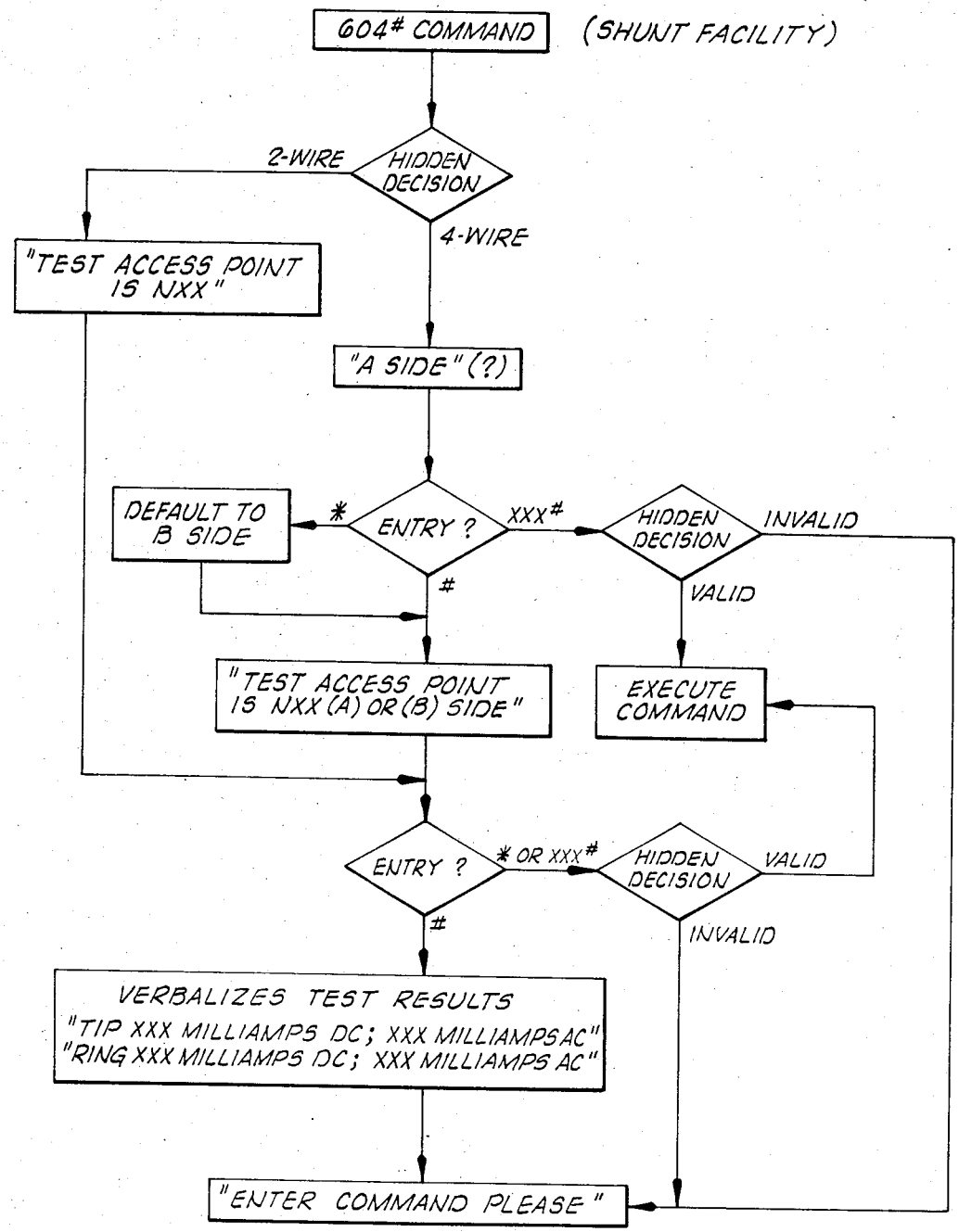
Figure 11K:
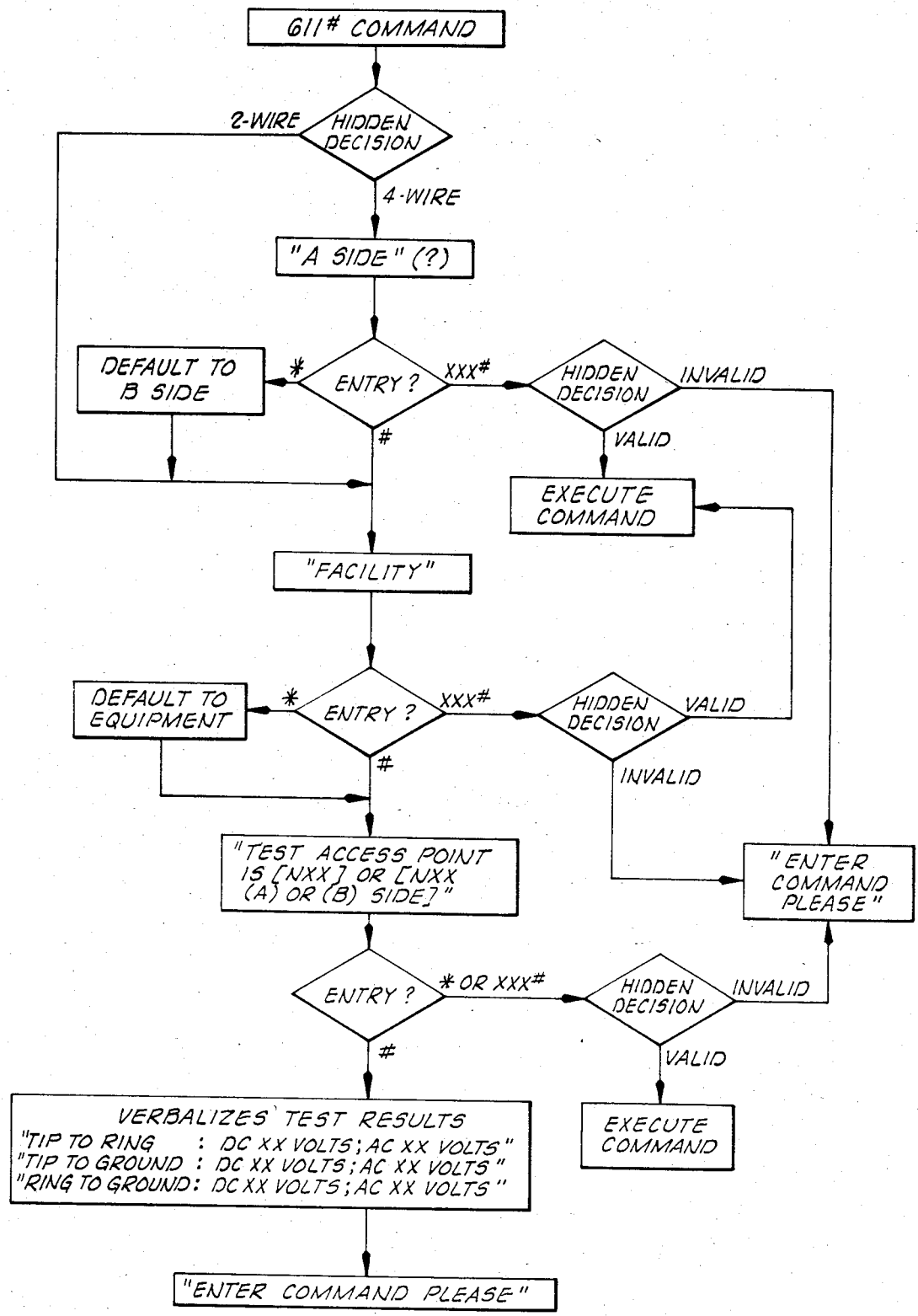
Figure 11I:
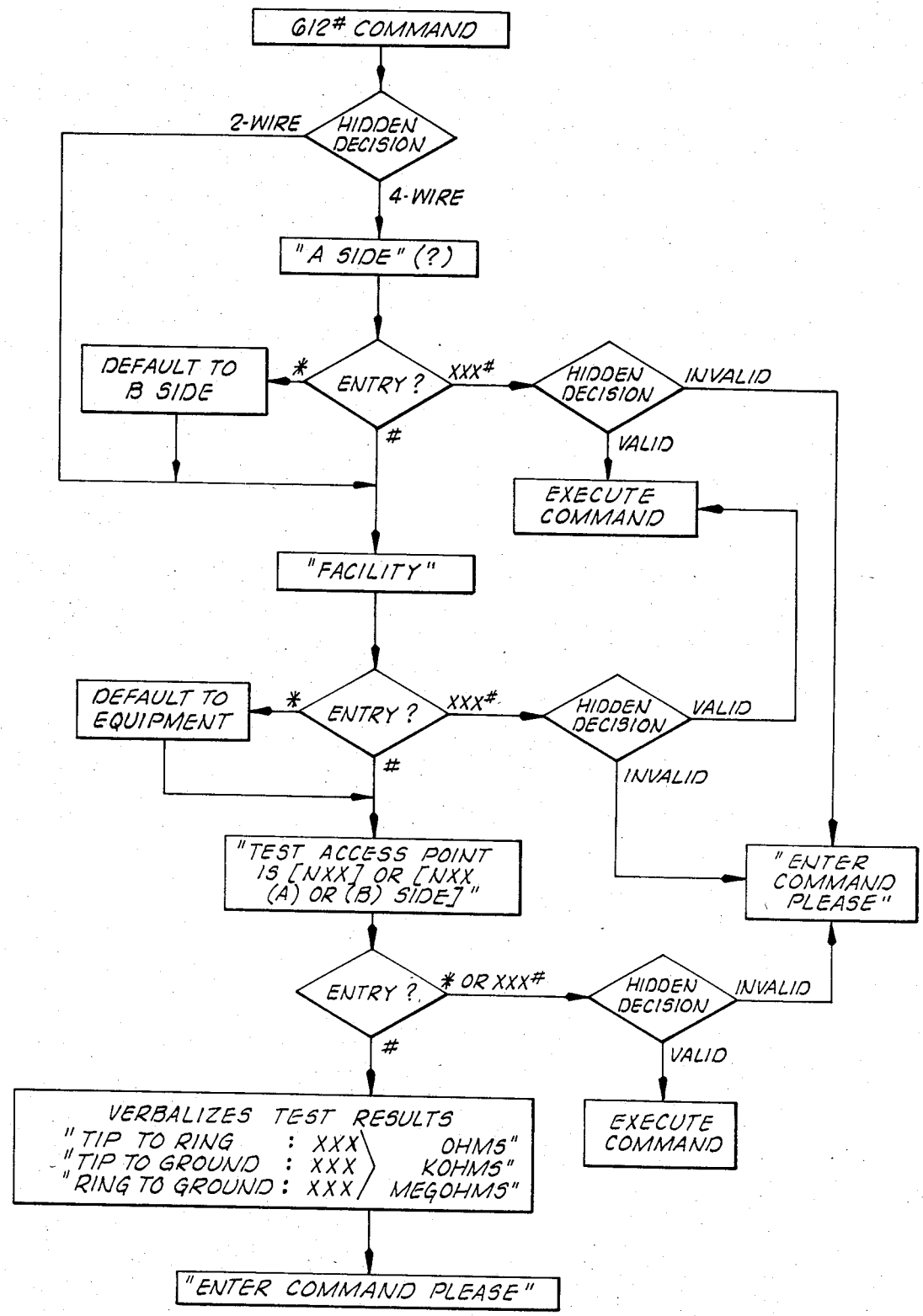
Figure 11M:
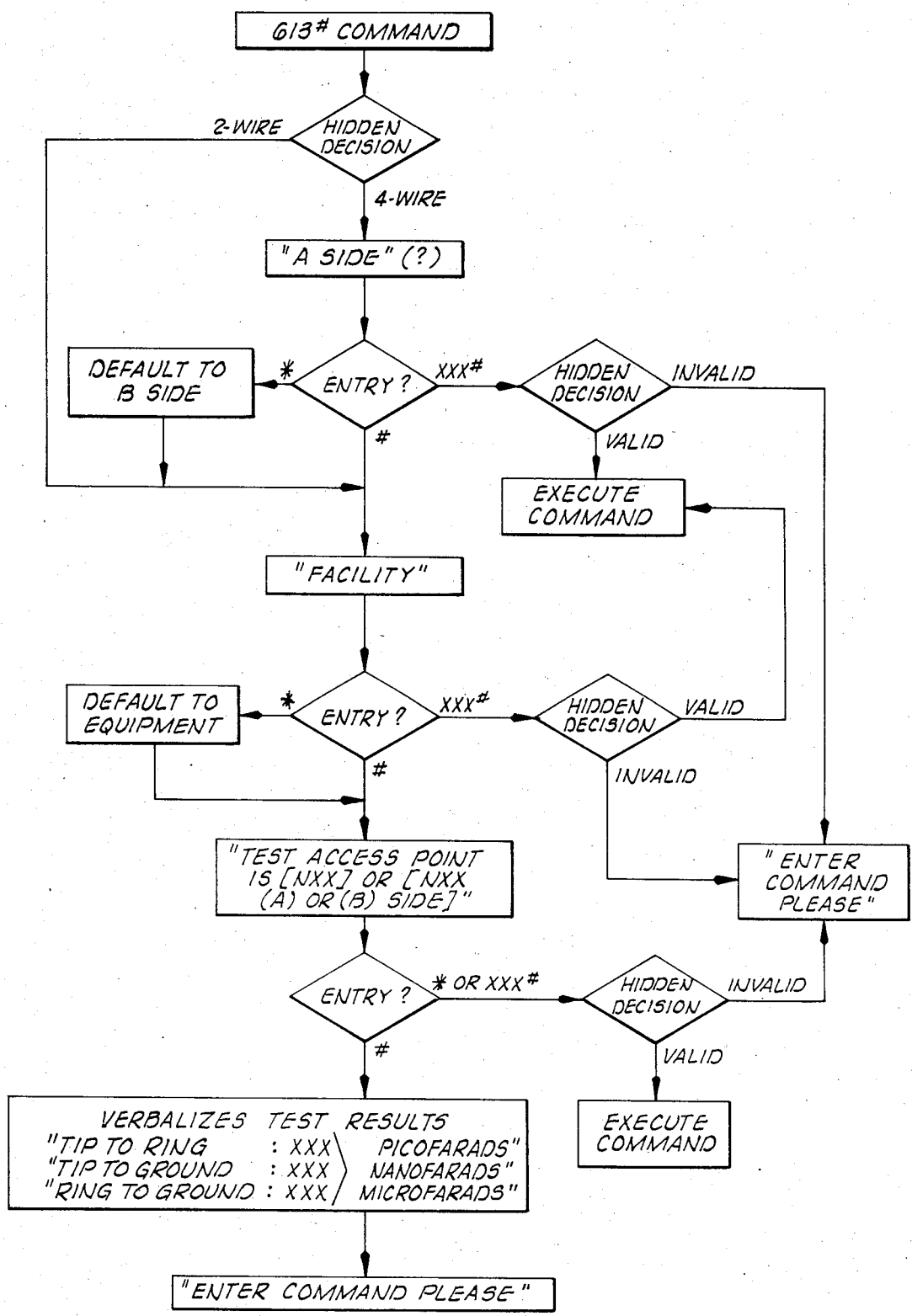
Figure 11N:
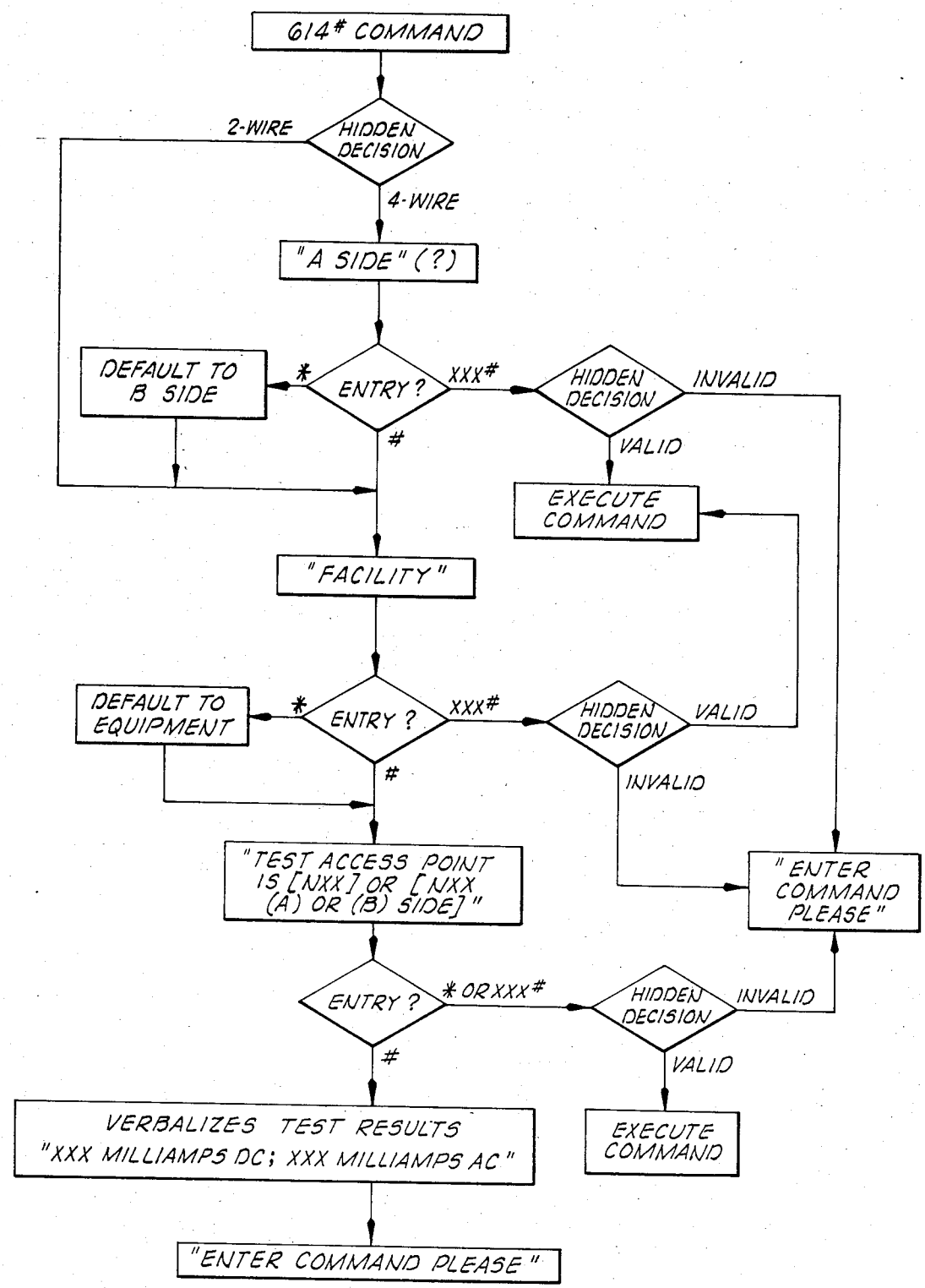
Figure 11:
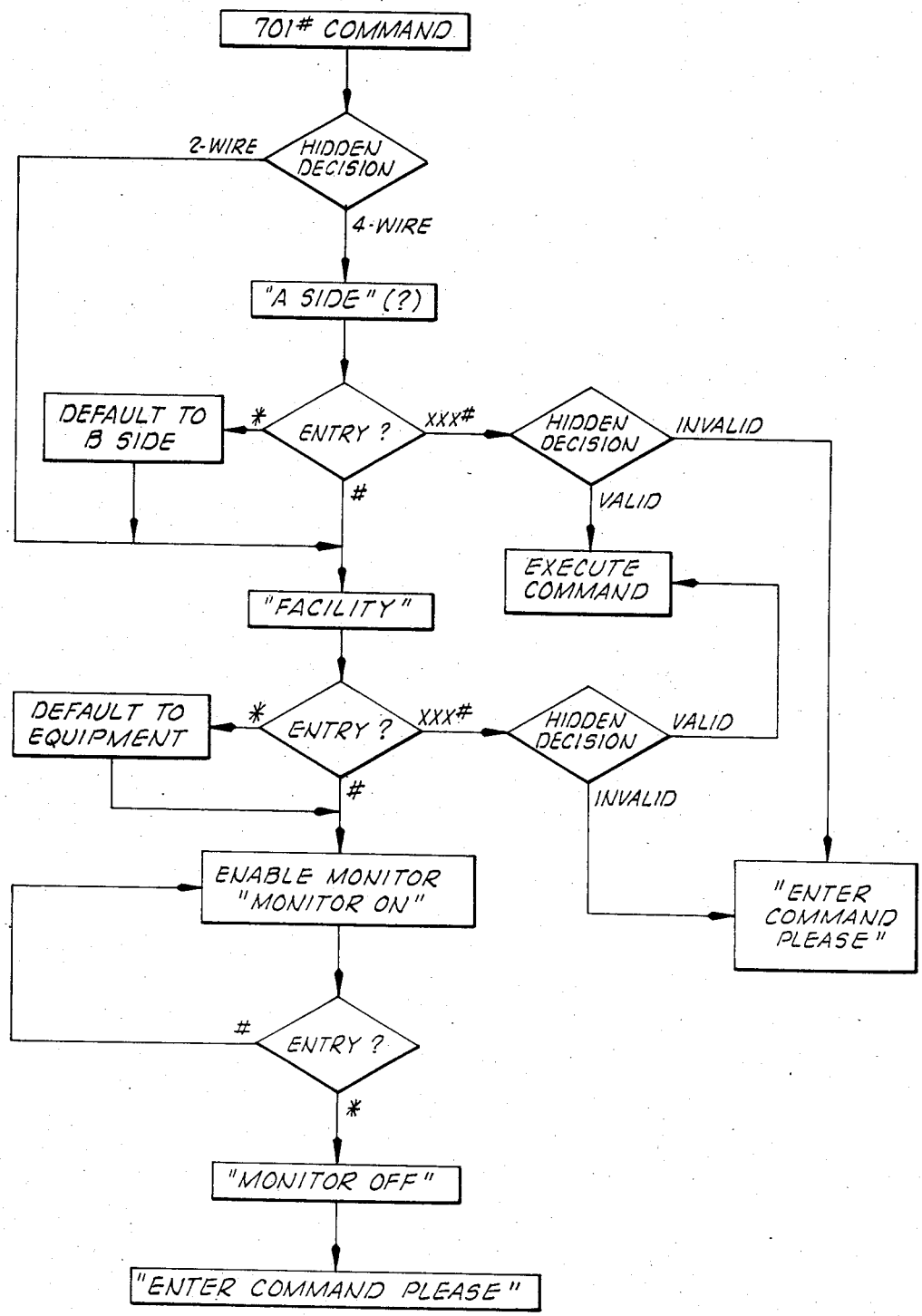
Figure 11P:
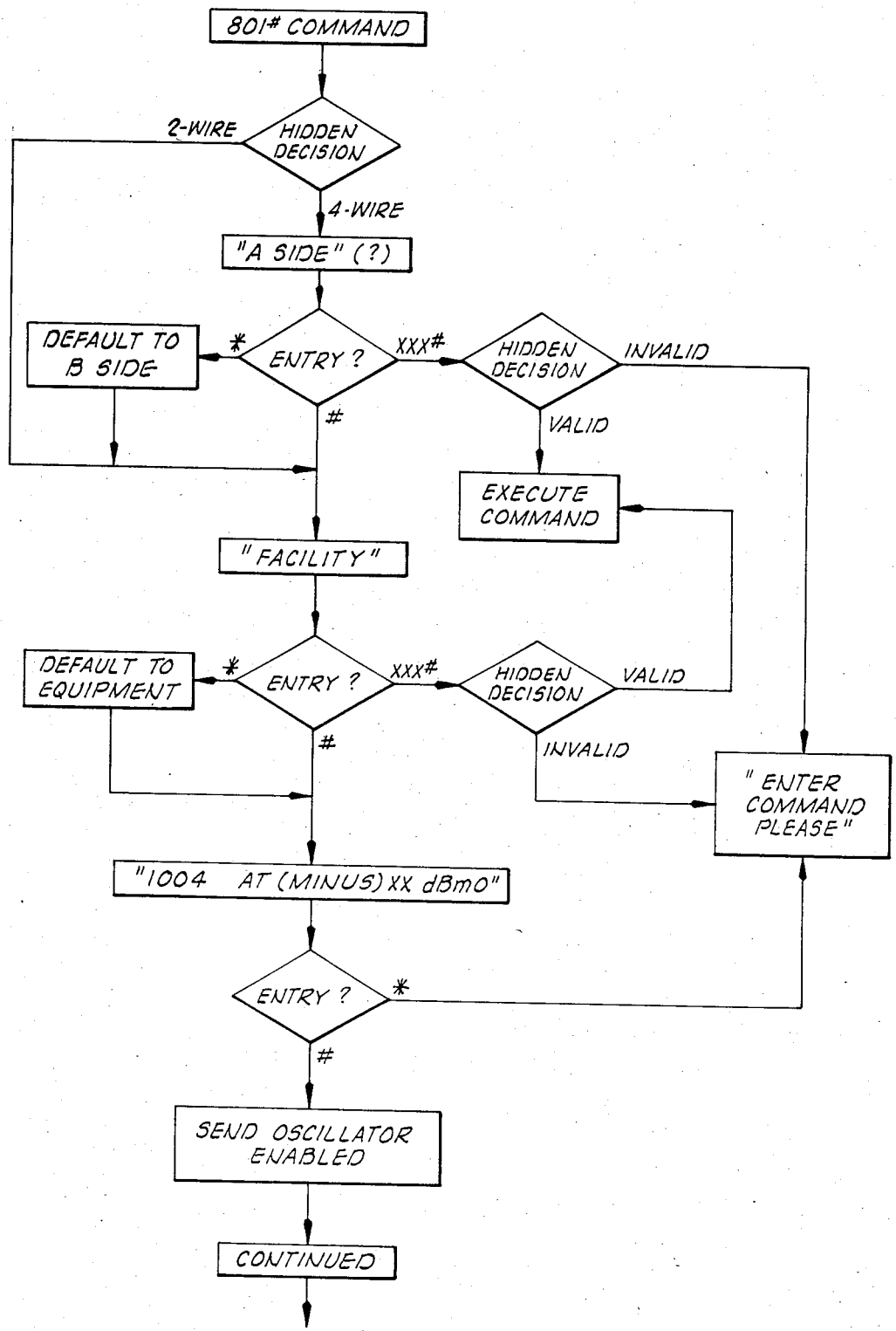
Figure 11P:
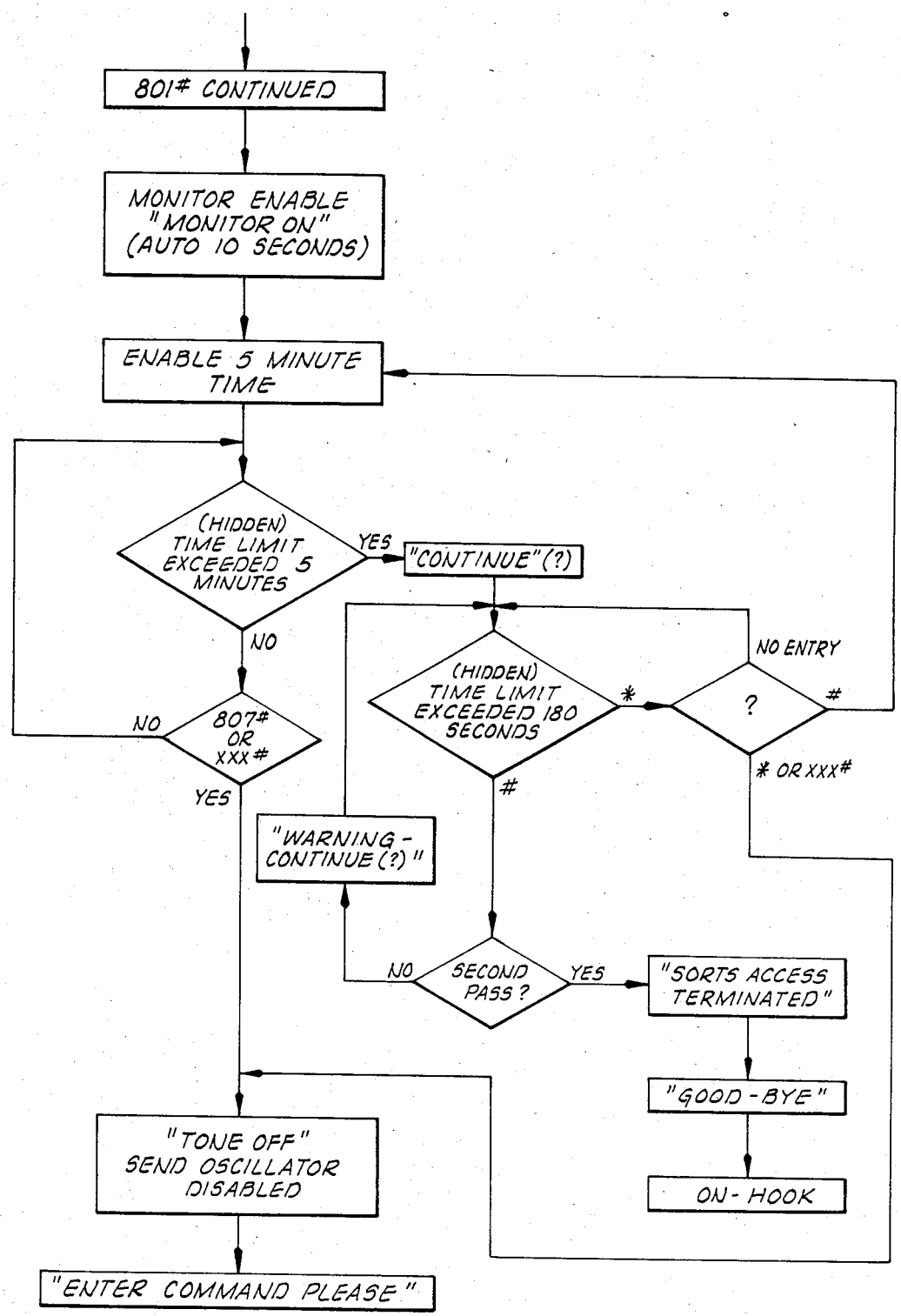
Figure 11R:
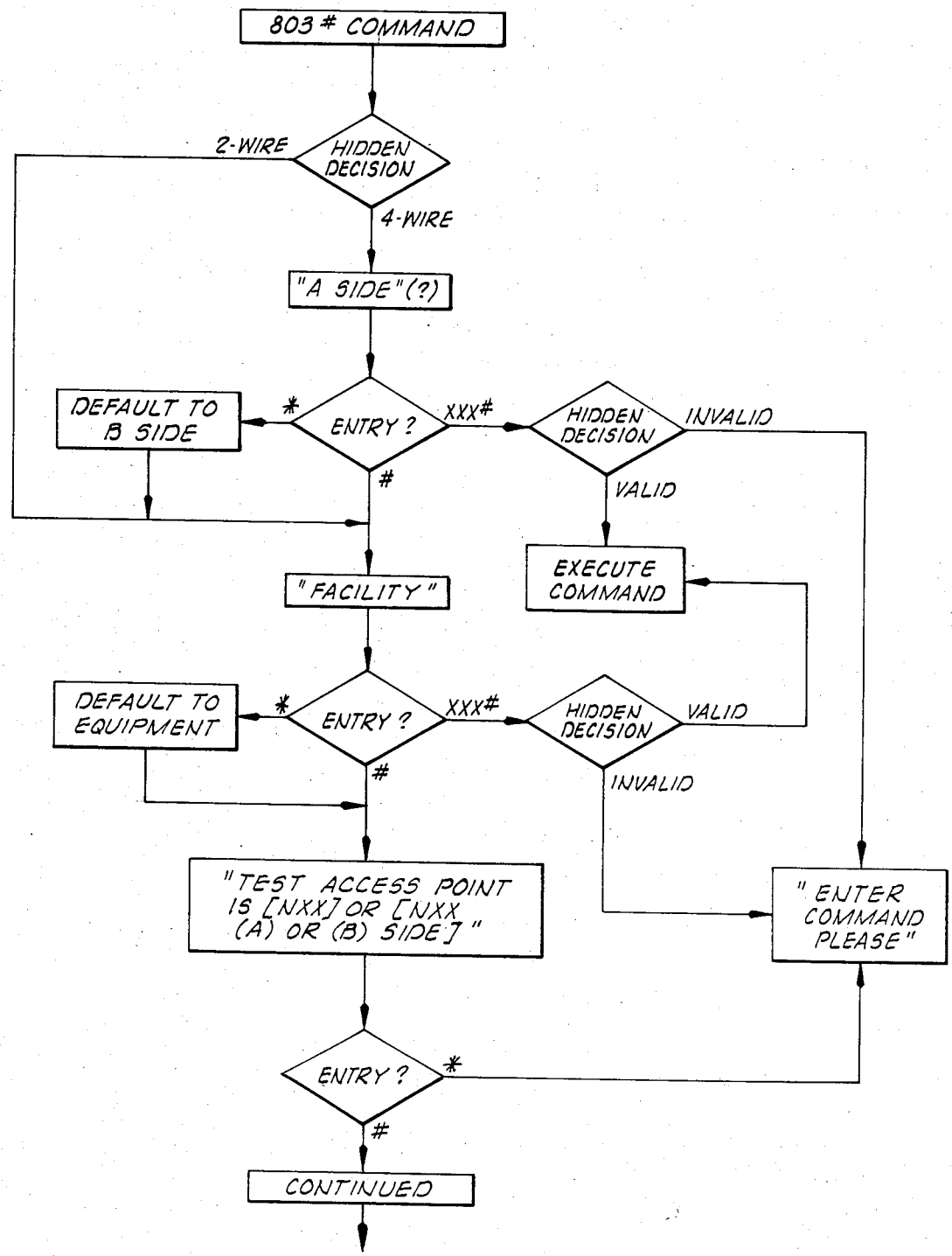
Figure 11R:
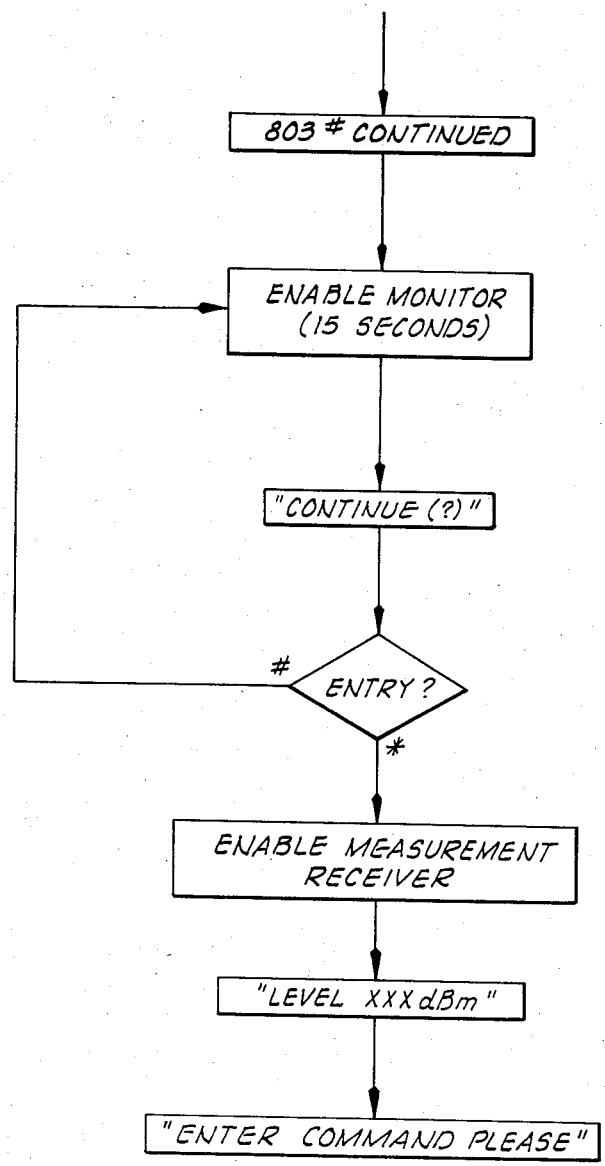
Figure 11S:
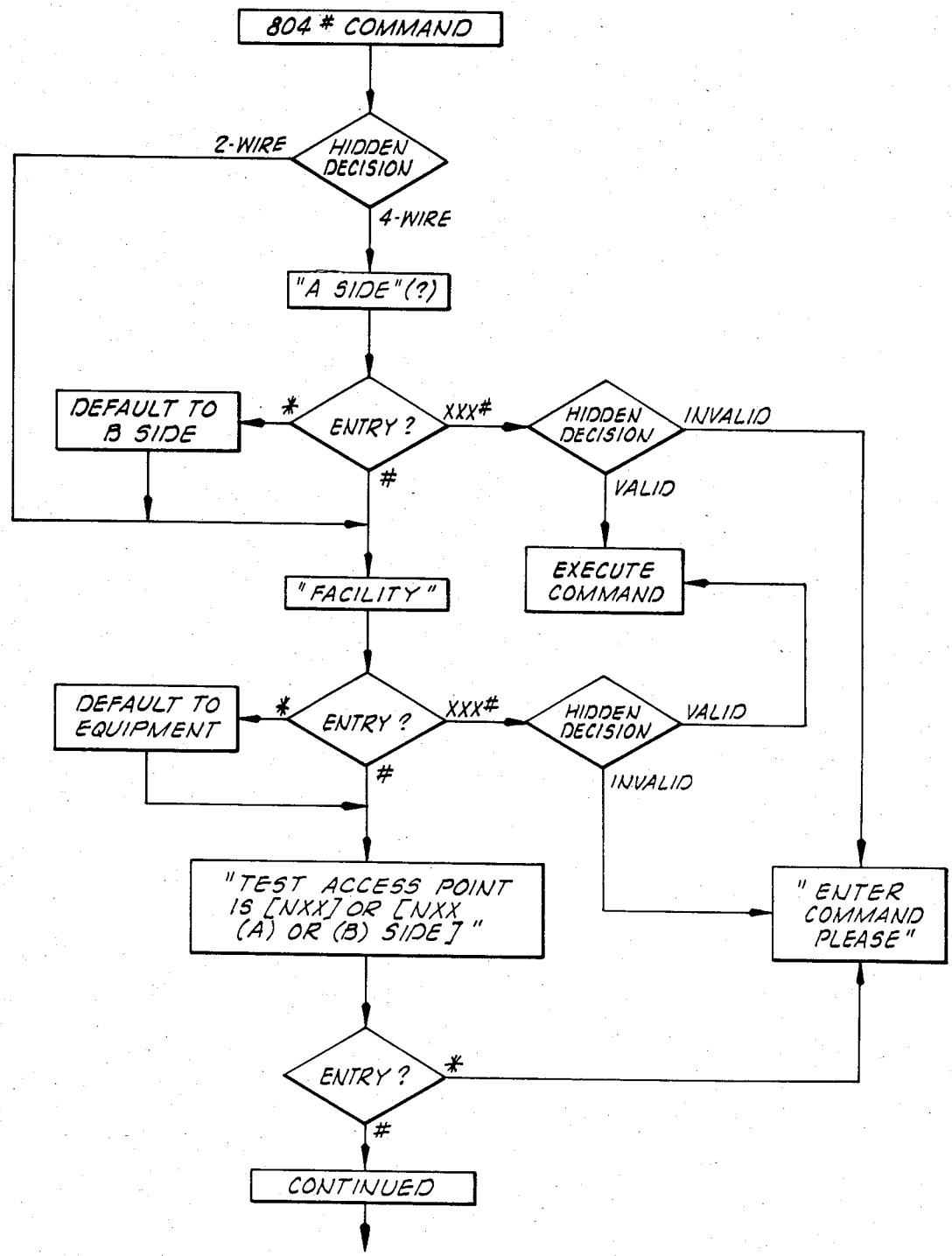
Figure 115:
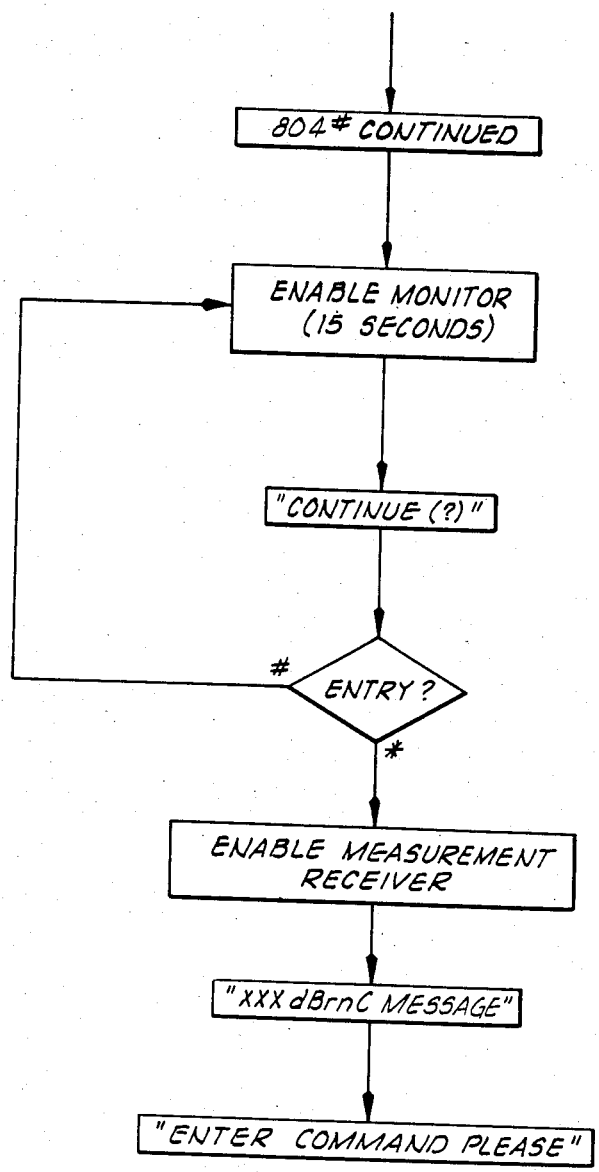
Figure 11T:
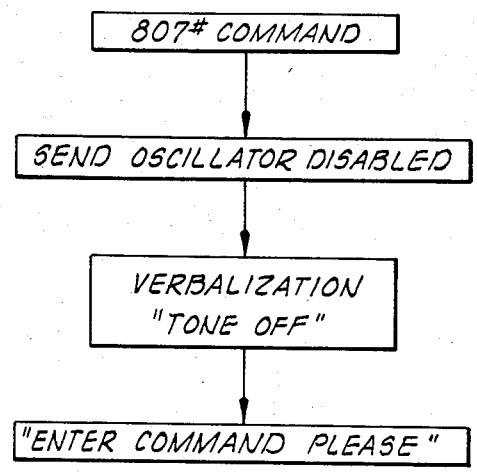
Figure 11U:
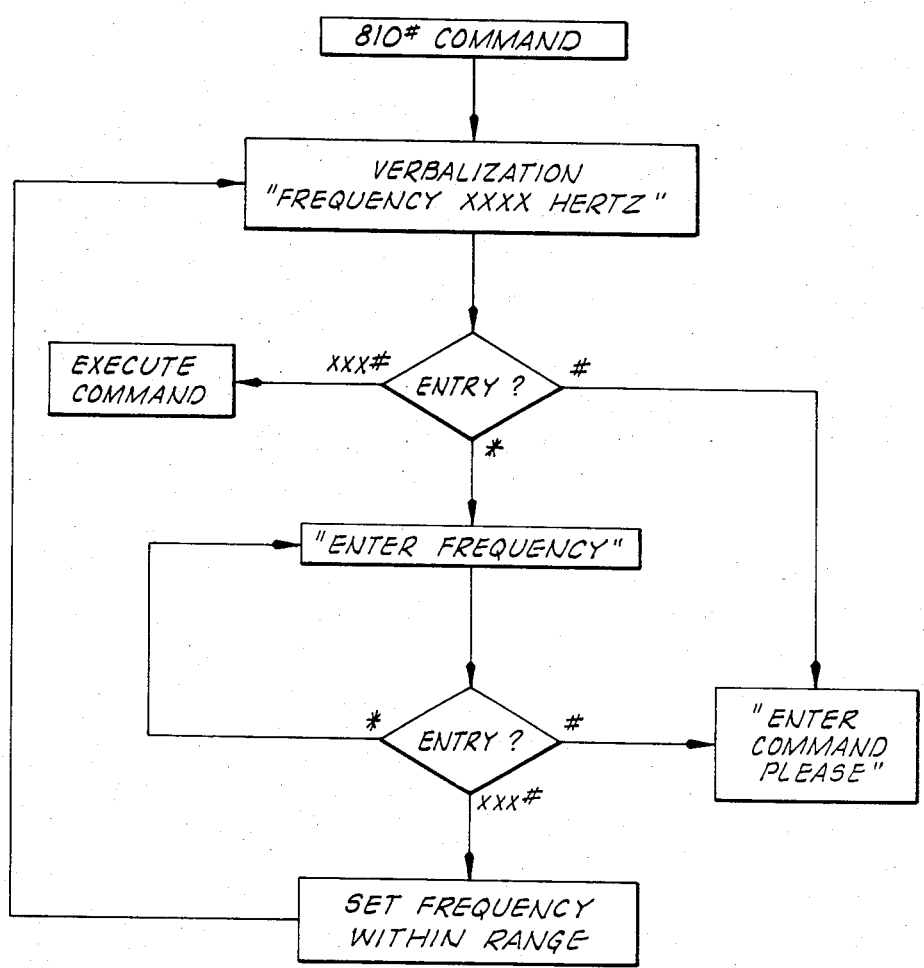
Figure 11V:
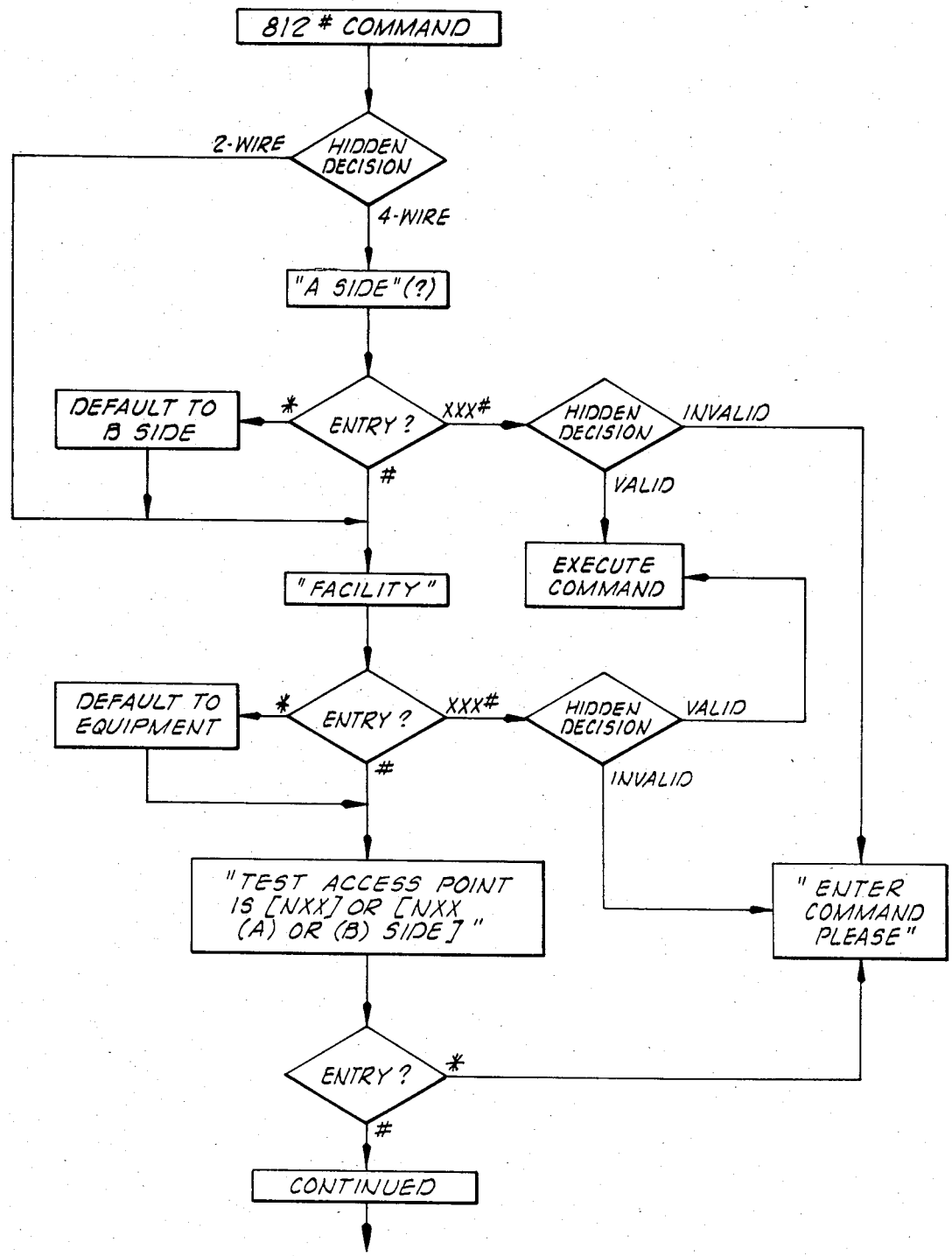
Figure 11V:
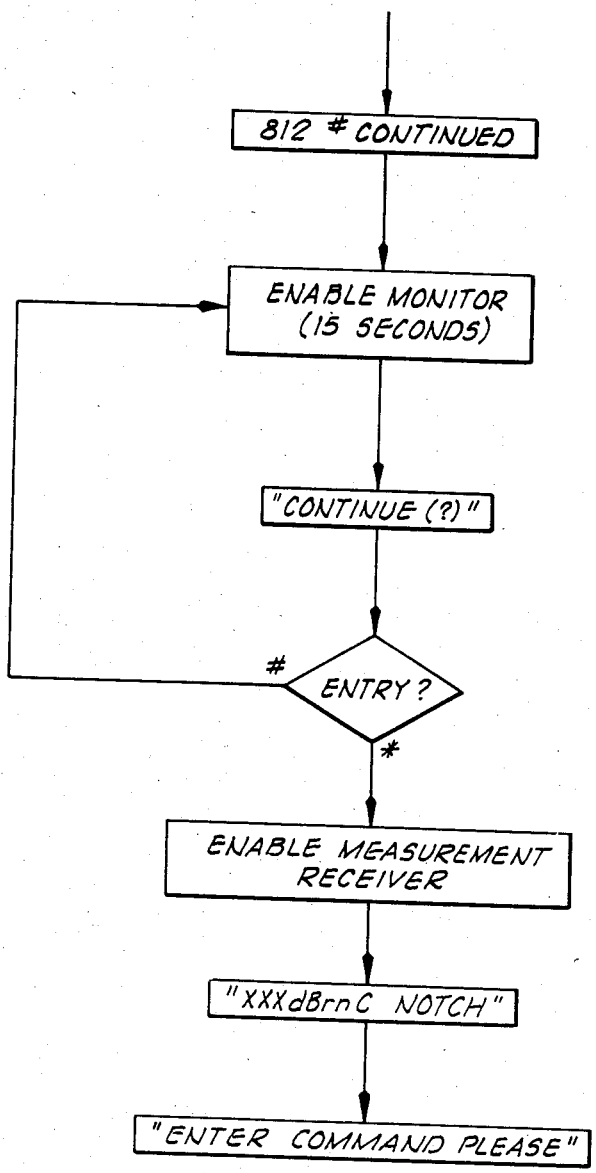
Figure 11W:
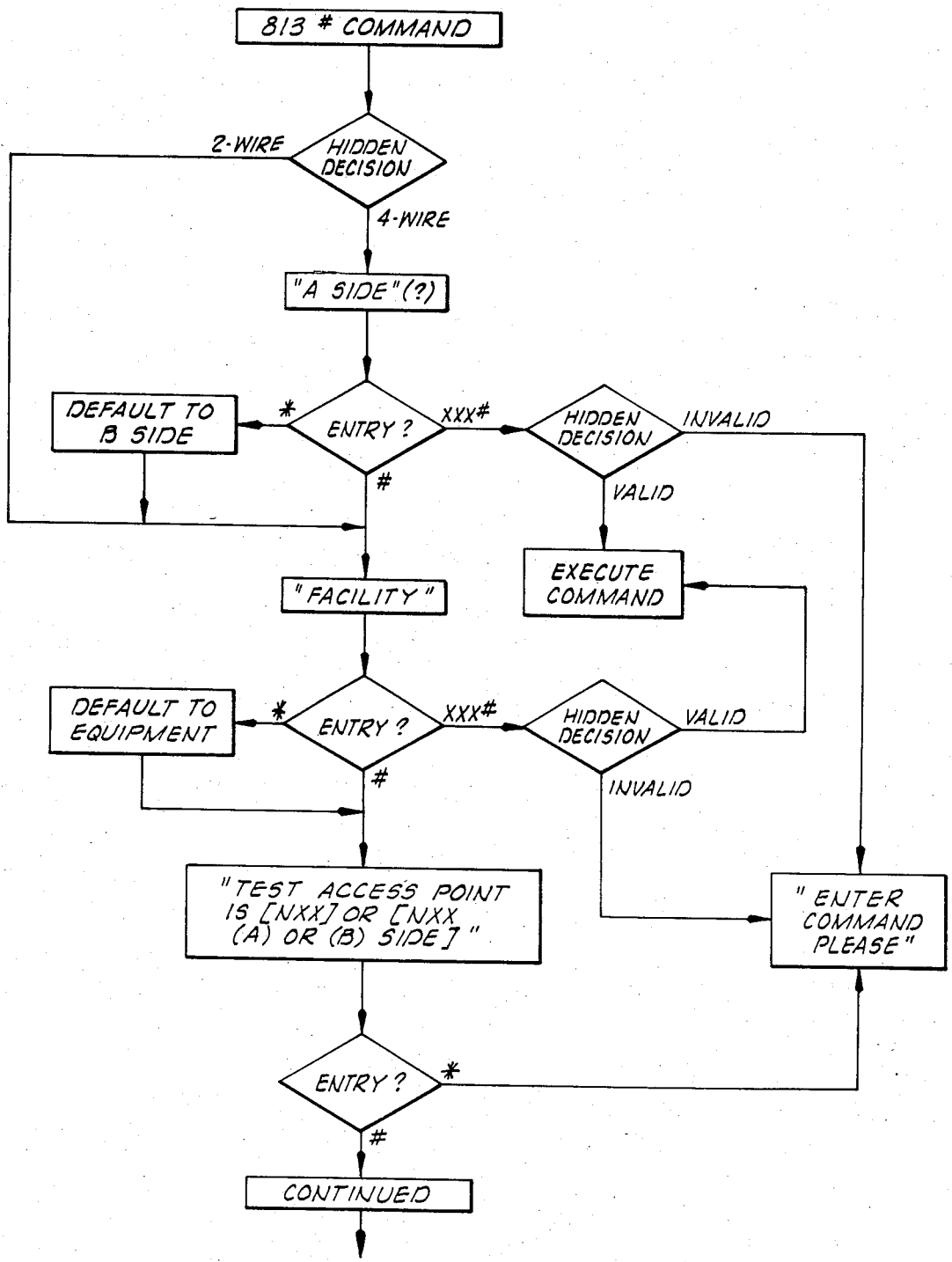
Figure 11W:
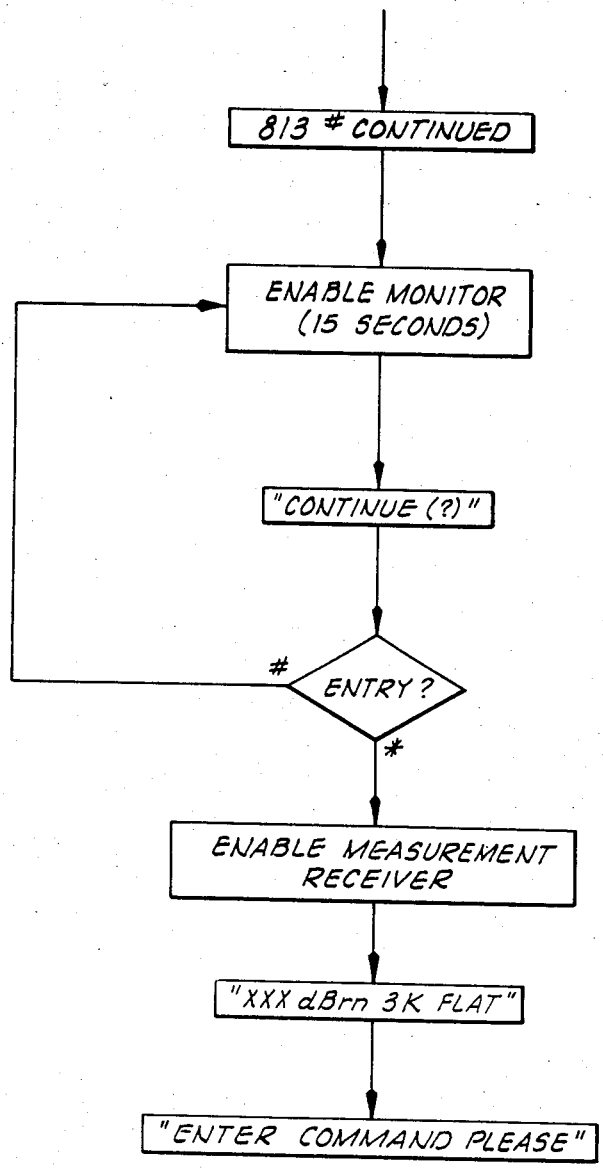
Figure 11X:
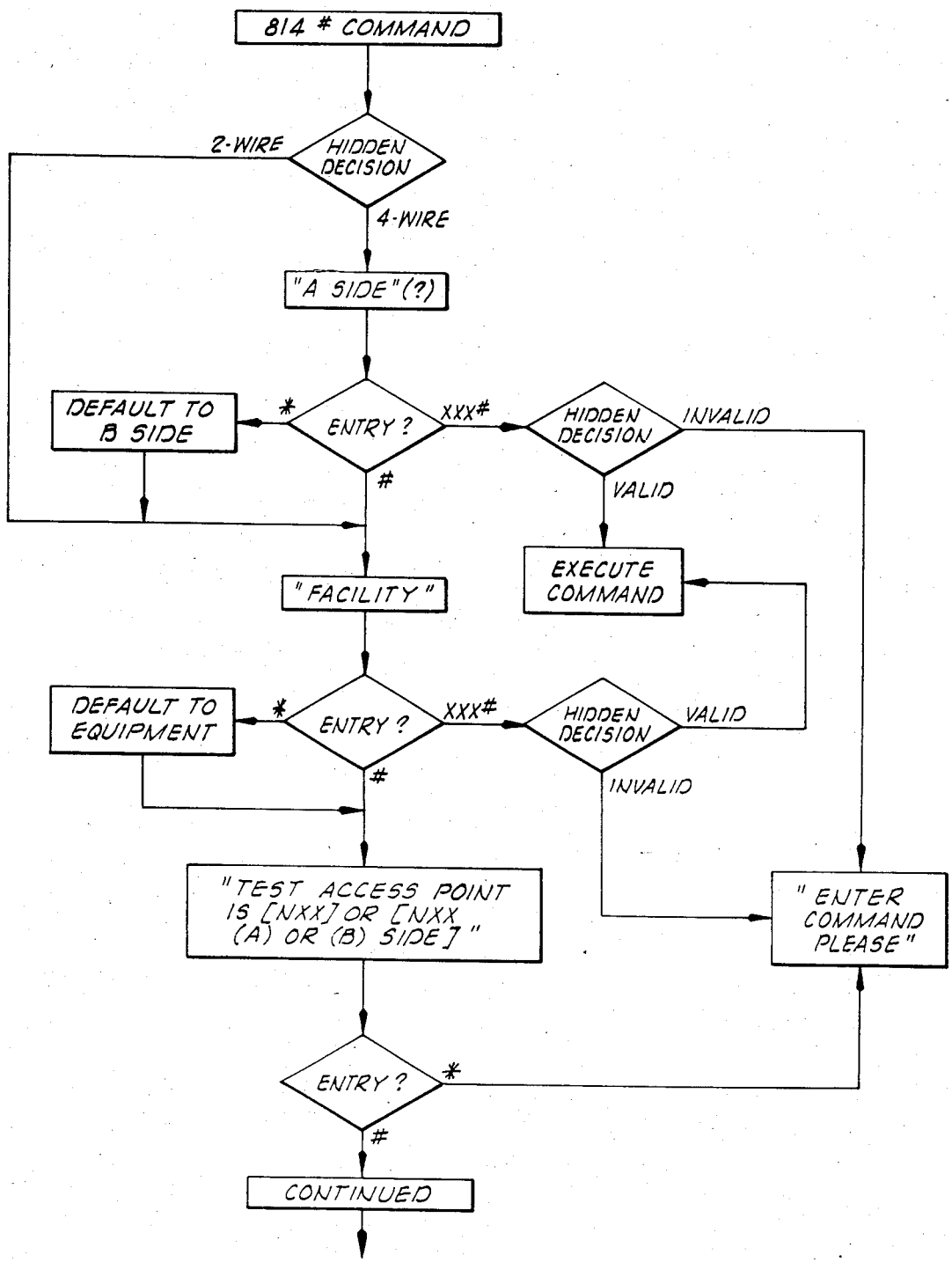
Figure 11X:
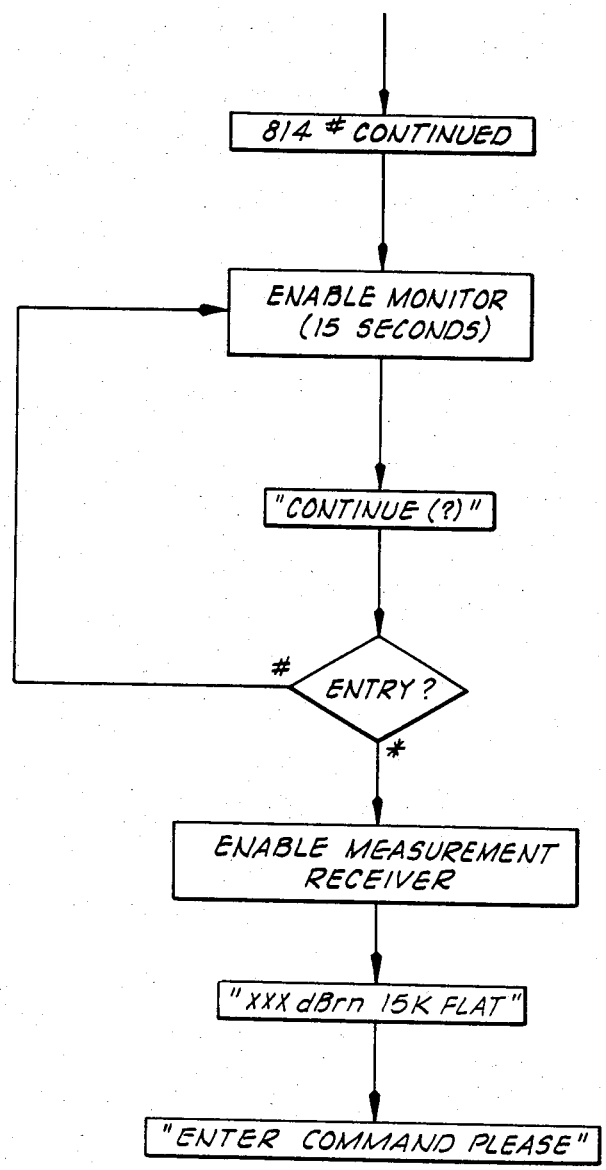
Figure 11Y:
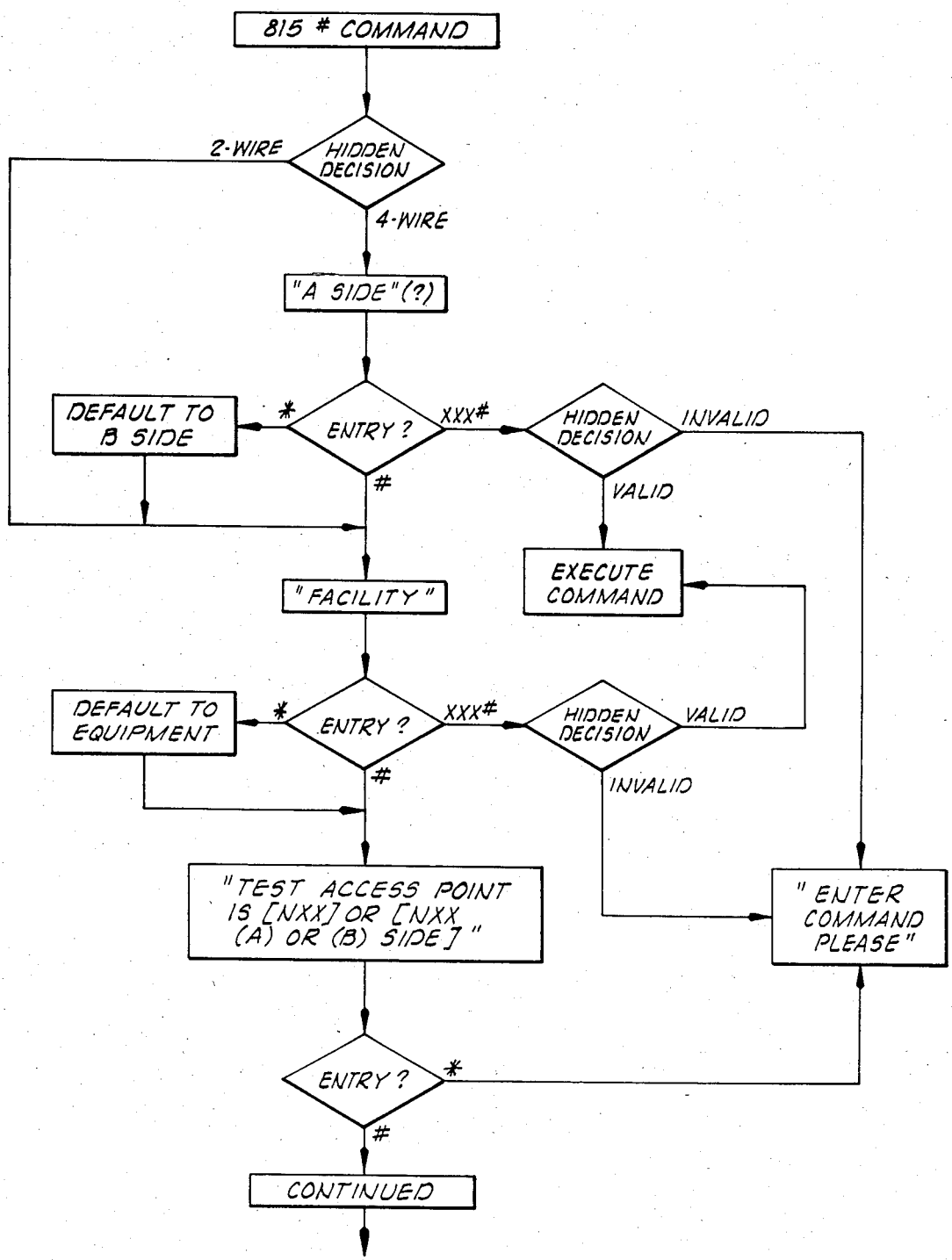
Figure 11Y:
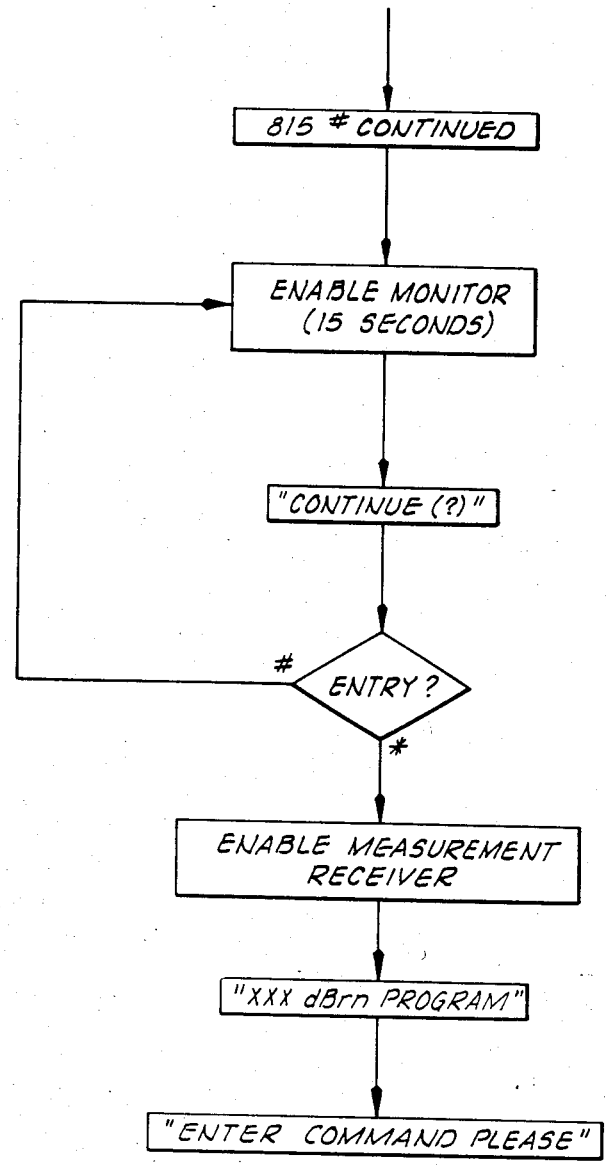
Figure 11Z:
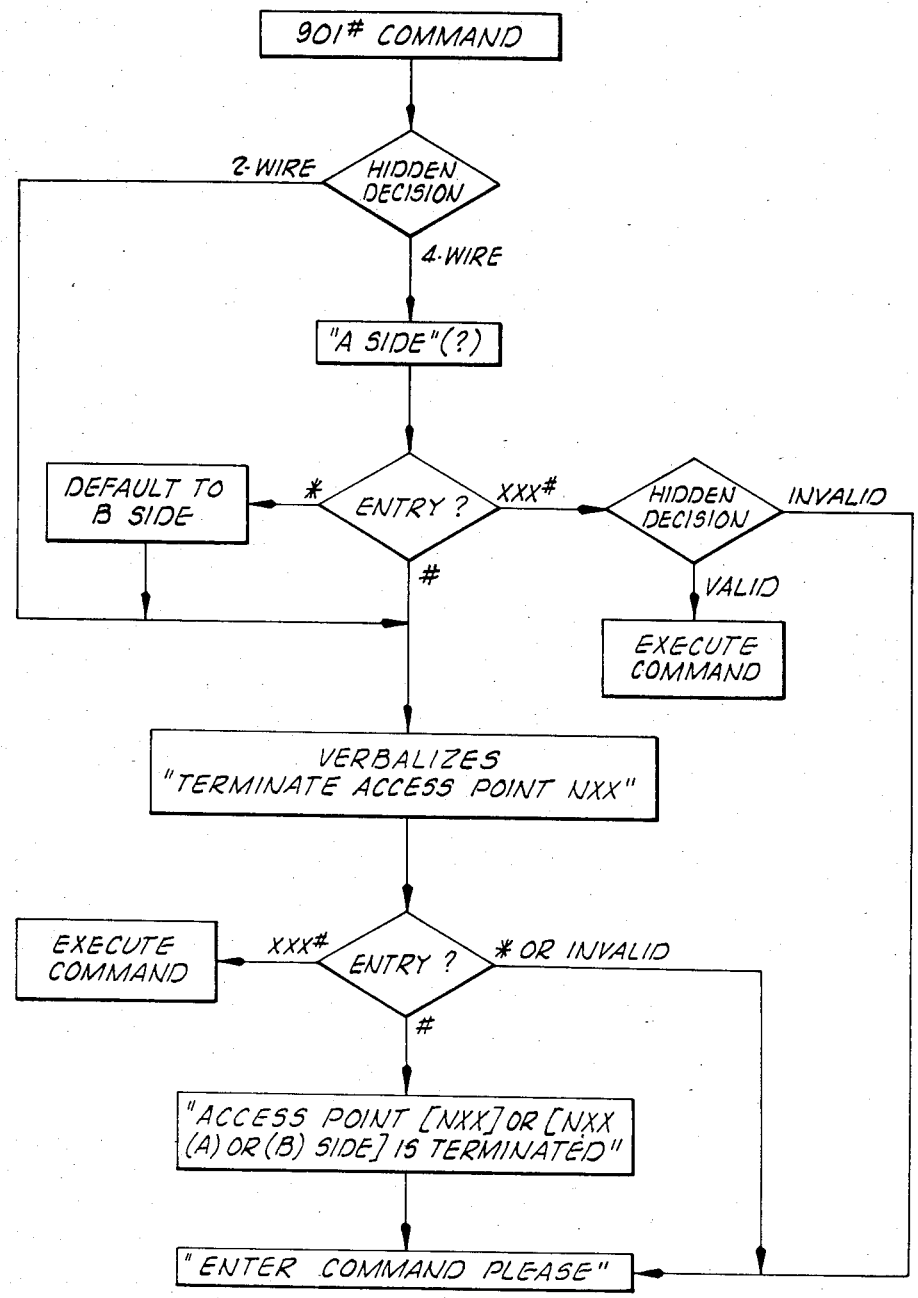
Figure 11A:
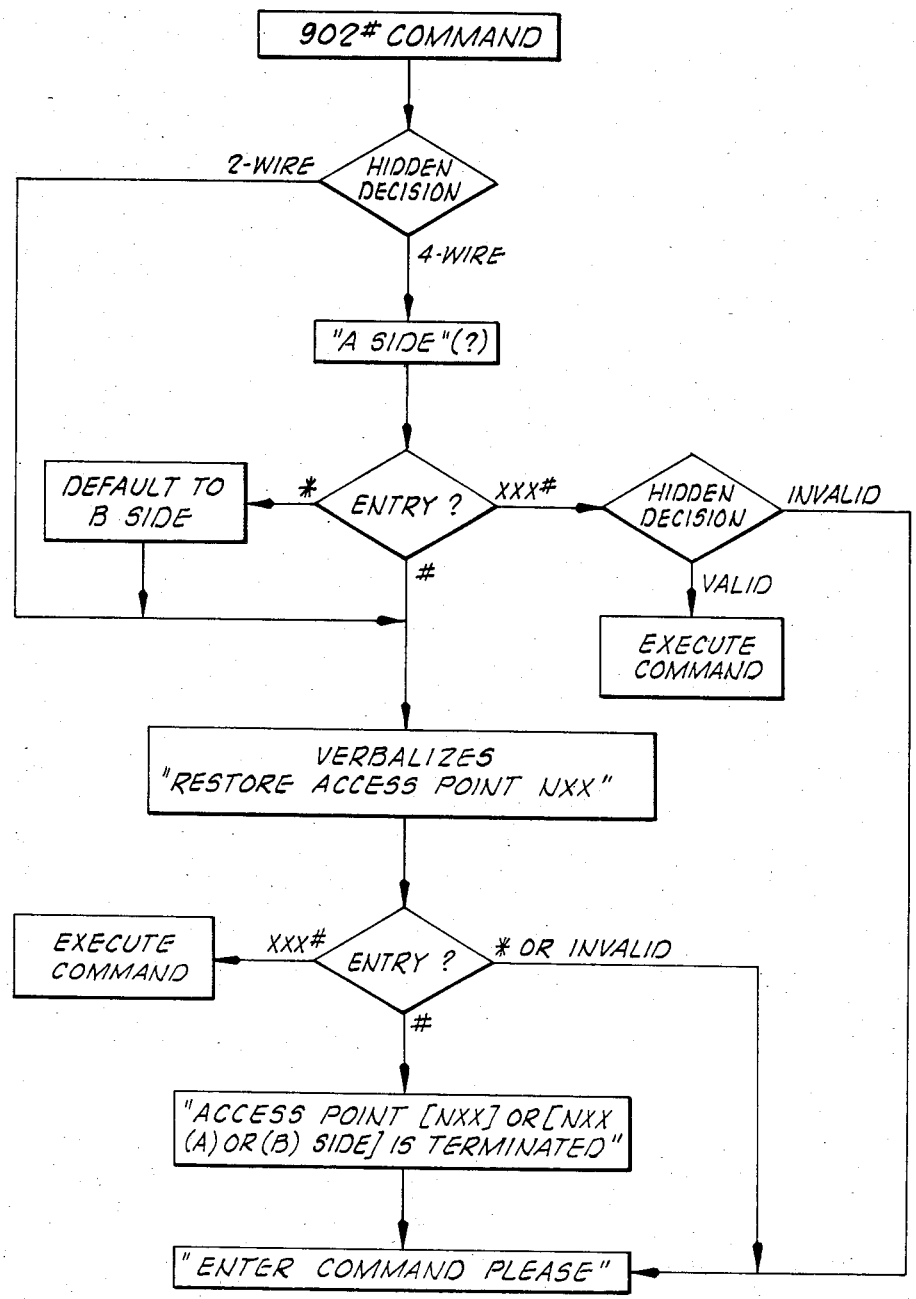

The preferred embodiment of the circuit 428 is shown in FIG. 10D. The phase is controlled by the circuitry generally indicated by the reference numeral 492, and the output from this section is filtered by a low pass filter 494. The output of the low pass filter 494 is attenuatable by the programmable gain adjustment circuit 430 having a preferred embodiment as shown in FIG. 10E. In the preferred embodiment, the gain adjustment circuit 430 allows the output to be attenuatable in 0.1 dB steps before being sent to the analog signal processor over the analog bus network 14.

The oscillator sequencer 424 also controls the operation of the portion of the analog signal measurement circuit which generates the AC reference signal. The generation of the AC reference signal is also controllable through a reference phase control latch 496 (FIG. 10D) receiving inputs over the data bus for providing +/−45° of phase adjustment to compensate for induced phase errors. The latch 496 forms another part of the phase adjustment circuit 432 which has been previously described as including the phase adjustment counters/adders 484, 486, 488. The outputs from the phase adjustment counters/adders 484, 486, 488 are provided to the address inputs of the reference read only memory 434 having the preferred embodiment shown in FIG. 10D. The output of the read only memory 434 is latched into a latch 498 by the system clock. The output of the latch 498 is converted by the digital-to-analog sign magnitude converter circuit 436 having a digital-to-analog converter portion as shown in FIG. 10D and identified by the reference numeral 500. The signal through this portion is provided to a phase control portion 502 and then to a low pass filter portion 504 as shown in FIG. 10E. The output from the low pass filter portion 504 is connected to an input of the analog multiplier 440 having the preferred embodiment shown in FIG. 10E.

The signal processing portion of the analog measurement circuit, by which signals received over the analog bus network 14 from the analog signal processor are conditioned for use by the central processing unit 26, includes the tracking band-pass filter circuit 438. The preferred embodiment of this circuit is shown in FIG. 10E as including a low pass filter section 506 and a band-pass filter section 508, the output from which is connected through a capacitor 510 to an input of the analog multiplier 440. Through this circuitry, the relative DC equivalent of the capacitance of the line under test is produced. This is referred to as the Thevenin AC measurement. The output from the analog multiplier 440 is low pass filtered through a circuit 512 to provide the ultimate THEV:AC signal that is connected to an input of the multiplexer 444.

The FLTR:B signal from the analog signal processor is converted into a Thevenin DC measurement by means of the analog divider 442, the preferred embodiment of which is shown in FIG. 10E. The purpose of the element 442 is to multiply the FLTR:B voltage by the reference voltage which is generated by the circuitry shown in FIG. 10D and labeled with the reference numeral 514. The THEV:DC signal from the analog divider 442 is provided to another input of the multiplexer 444.

The preferred embodiment of the multiplexer 444 is shown in FIG. 10F. The output from the multiplexer 444 is shown in the same drawing as being provided to the input of the analog-to-digital converter 446. Once a signal has been selected through the multiplexer 444 and converted by the converter 446, the thus digitized output is provided to the central processing unit 26 over the digital bus network 16 through the data bus buffer 420 of the analog signal measurement circuit.

Next, the operation of the preferred embodiment will be described.

Functionally there are four basic operating modes with the preferred embodiment of the present invention: (1) circuit testing; (2) terminate and leave operation; (3) diagnostics and self-testing; and (4) feature programming.

Circuit testing includes transmission measurements, such as two-way loss and noise, multimeter measurements, and loop fault testing.

The terminate and leave operation includes terminating an assigned circuit into a 600-ohm termination.

The diagnostics testing is internal to the apparatus 10 and includes the capability of determining that the measuring circuits and control circuits are capable of making valid measurements and performing all the desired functions. This testing is not a feature of the present invention as claimed; therefore, it will not be further described.

The feature programming mode includes the remote programming of authorized user telephone numbers in connection with dial-back security, a test level point data base and a unit identify option which will verbalize the telephone number assigned to the unit when it is installed.

The following specific features are included within the preferred embodiment of the present invention:
1. industry standard transmission tests
    a. transmission level measurement
    b. noise measurement (longitudinal)
    c. C-notched noise measurement
    d. C-message noise measurement
    e. 3 KHz flat measurement
    f. program (weighted) measurement
2. basic multimeter functions
    a. AC volts
    b. DC volts
    c. resistance
    d. current
    e. capacitance
3. miscellaneous functions
    a. high impedance monitor and talk capability
    b. quest termination (compromise impedance)
    c. self-test (measuring circuits)
    d. loop-back with fixed insertion loss
    e. split function (equipment from facility)
    f. ringing and supervision of 2-wire loops
4. special features
    a. dial-back security (user programmable and optional)
    b. evolutionary data base (automatic)
    c. remote programmable data base capability
    d. access matrix removable without circuit interruption
    e. unit identity option (user programmable)
    f. local access arrangement for long-term testing
    g. remote terminate and leave functions Other features contemplated include: ringer (subset) counting capability, spectrum analyzer, impulse noise measurement, phase jitter and envelope delay distortion measurement, smart box adapter, RS 232 port, internal modem, and protocol converter (internal) to support X.25.

By way of an example, a specific use of the apparatus will be given. The scenario for this description is that of an operator, or tester, located in a typical control location at the remote site 2, which location is equipped with the SARTS system operated from a 52A test position known to the art. The tester is attempting to isolate a reported trouble, and he or she has been unable to find any transmission impairment between intermediate offices equipped with SMAS access points. The tester is looking towards a small end office equipped with the apparatus 10. It is further assumed that the dial-back security option is installed.

In the circuit layout record contained in the files at the remote site 2, the tester locates the seven-digit access number (i.e., its "telephone number") for the particular apparatus 10 in the end office. The tester then goes off-hook from the test position on a local line and outpulses in DTMF with the appropriate telephone number.

The apparatus 10 answers within 400 milliseconds and provides off-hook supervision and holding current for the local central office loop. The direct dial interface circuit 18, under control by the central processing unit 26, responds with an introductory tone and a voice response: "Hello, this is (NXX-XXXX)." (short pause) "Enter your identification please." The tester than enters, via the telephone set DTMF keypad, the telephone number of the test position followed by a pound (#) sign to indicate the last digit transmitted. This pound sign entry is equal to a "S/R" key on a Dataspeed 40 terminal keyboard. After the pound sign entry is received by the apparatus 10, the direct dial interface circuit 18 responds with "thank you" followed by a disconnect tone and goes on-hook within 50 to 100 milliseconds.

The processor 26 within the apparatus 10 then takes the tester's telephone number and compares it with a table of telephone numbers previously programmed in the memory 28 of the apparatus 10.

While the search and comparison process is underway, the circuit 18 is instructed to deny or ignore any other incoming calls until this transaction is completed or aborted. This will preclude another tester from accessing the unit.

If the number is valid, the circuit 18 is instructed to offhook on the access line, detect dial tone and outpulse the valid access number. If the number entered is invalid, the apparatus 10 will reset and go to a system idle condition.

When the tester answers the dial-back call, he or she will hear a quasi dial tone to indicate that the register in the apparatus 10 is ready to accept command digits. The tester must then outpulse a "401" command from the DTMF pad (by depressing the "4," "0" and "1" keys) plus a pound sign for the "S/R" or enter command signal. The apparatus 10 responds with: "enter access point."

The tester must now enter the access point address of the circuit to be tested. This address consists of three digits NXX, where N=one of the digits 1-3 and X=one of the digits 0-9. This 3-digit numbering plan will determine the address of the access point and decode the type of circuit under test, i.e., 2-wire or 4-wire. Further, the digit N will define the side of a 4-wire access point assigned to a 2-wire circuit. The following table shows the functions of these digits.

| Digit | Explanation |
| --- | --- |
| N = 1 | Decodes to the "A" side of a 4-wire circuit or a 2-wire circuit assigned to the access point. |
| N = 2 | Decodes to the "B" side of a 4-wire circuit or a 2-wire circuit assigned to the access point. |
| N = 3 | Decodes any 4-wire circuit. |
| XX | Selects access points "01" through "96". |

After the tester has entered the access point address, the apparatus 10 will immediately verbalize the entry and wait for an acknowledgement or deletion from the tester before proceeding. If the test access point is correct, the tester enters a pound sign and the high impedance monitor function is immediately enabled at the 4-wire access point for a predetermined number of seconds, forcing the tester to monitor the circuit prior to making any type of test or interruption to the circuit. Further, if the tester wishes to continue monitoring the circuit after the initial automatic monitoring period, he or she must enter the appropriate command code: "401" from the DTMF keypad. This command will enable the monitor function on the receive side of the 4-wire access point for another time period.

During the monitor function the apparatus 10 has the register disabled from the telephone access line to preclude accidental cut-offs or other detectable supervisory signals from inadvertently controlling the unit.

After the initial automatic monitoring function is disabled and "monitor off" has been verbalized, the apparatus 10 prompts the tester by requesting a test command as follows: "enter test command." The monitor command can be re-enabled by entering the "761" command. Reference may be had to the command table set forth hereinbelow and the flow charts of FIGS. 11A-11AA for other commands and responses of the preferred embodiment.

For purposes of explanation, it will be assumed that the tester has selected a 4-wire test access point, has concluded the monitoring of the circuit under test and now wishes to send a tone from the far end office 4 back to the near end test site 2 equipped with SMAS and an RTS. The tester will instruct the RTS in the near end office 2 to measure only after tone has been applied at the far end, as SARTS/SMAS system operates in quasi-real time.

If the tester enters the command "801" at the test position, the apparatus 10 then responds with "A Side", meaning does the tester wish to test the A or B side of the 4-wire access point just selected. The entry of a # sign affirms this choice. If an * is entered via the DTMF pad, the apparatus 10 responds with "B Side" and the tester affirms with a # sign.

The next prompted parameter is the test direction decision. The apparatus 10 verbalizes "facility" meaning the test direction is now set for the facility side of the access point. If the tester wishes to test in this direction, the entry of a # sign affirms this. The entry of an * toggles the instruction and subsequent response to "equipment." A # entry affirms this selection.

The apparatus 10 then responds with the standard default frequency (1004Hz) at the last transmitted level found in the data base or at −10 dBm0 which is the standard default level: "Send one zero zero four at minus ten d b m O." If the tester affirms this response with a pound sign entry, the apparatus 10 responds with "monitor on" and a 10-second window for monitoring the circuit precedes the enablement of the send oscillator. The tester than hears a short burst of tone (simulated) over the access loop for a psychological reinforcement.

The apparatus 10 then enters into memory the last level sent and associates this data with the access point selected. This function is known as the "evolutionary data base update." The next time a tester acquires this access point and elects to send tone, the verbalized response from the first default will reflect the level stored in memory; this is known as TLP information and is usually available on all circuit layout records or mechanized record-keeping systems and is normally in the SARTS data base. This obviates the necessity of entering the same information for a specific access point each time it is tested.

A single frequency tone from the DTMF encoder 124 will be sent back over the access loop through the hybrid circuit for approximately 250 milliseconds to let the tester know that tone has been applied to the circuit under test.

In this scenario the standard default level would be stored in memory. If the tester were to change the level he would enter a "802" command meaning "adjust send level." When the "802" command is sent to the apparatus 10, the unit responds with "enter level." The tester may enter any level between −3 dBm0 and −35 dBm0. The minus sign is not available on the DTMF pad and is not required for this entry as all entries are assumed to be minus. The apparatus 10 will verbalize all level changes and await confirmation from the tester as in the frequency selection mode. All verbalizations will conform to the format outlined in the 801 scenario described above which includes the frequency and the level.

After the RTS/SMAS has acquired and measured the tone from the far end and SARTS has displayed the level to the tester on the Dataspeed 40 terminal, he or she will then instruct the RTS to send tone to the far end for the apparatus 10 to measure.

The tester will then enter a command to instruct the apparatus 10 to disable the tone being sent over the circuit under test. The choice of commands here will be "411" (terminate all testing) or "807" (remove tone). If neither of these commands is sent after a 5-minute interval, the apparatus 10 will query the tester with "continue?" and provide an additional 180 seconds for some type of response. If no response is received or one of the termination commands is received, the apparatus 10 will respond with "tone off" followed by "enter test command."

At this point the tester could conceivably want the apparatus 10 on "hold;" therefore, the timing circuit for automatic disconnect should be set for a suitable predetermined time period, such as 300 seconds, and then a verbal time-out warning should be verbalized (e.g., "thank you" followed by a 180-second period allowing the tester to start the timer over by entering another command). Ideally, the entry of an asterisk, usually meaning "no" or "incorrect" should be entered by the tester if he or she desires to keep the apparatus 10 on hold for another time period.

Assuming that the trouble has not been isolated thus far in the testing, the tester now needs to look at the loop from the far end office 4 towards the subscriber 12. The tester should be able to enter any "NXX" command for VOM measurements. If any of these commands is entered, the apparatus 10 must again prompt the tester for "test direction" and verbalize the direction as well as the access point address to assure the tester he is still on the same access point. The apparatus 10 will verbalize the test to be performed along with the preceding information and wait for confirmation by the tester. A pound sign entry will confirm and execute the test. The results of the test will be verbalized in the appropriate terms (e.g., "48 volts DC," or "24 volts AC," or "2 thousand 2 hundred ohms," or "tip ground," or "ring open," or "distance to fault, 3 point 5 kilofeet"). See the command table below and the flow charts in FIGS. 11A–11AA for the available commands and verbalized responses in the preferred embodiment. The flow charts are self-explanatory; therefore, they will not be specifically described other than to note that the "hidden decisions" pertain to deciding whether a 2-wire or 4-wire circuit is being tested (as specified by the "N" digit of the access point address) or whether an entered command number is valid or invalid at the time it is entered (i.e., invalid if a command is not numerically correct or if it is not entered at the appropriate time).

| COMMAND TABLE | |
|---|---|
| General | Loop Signalling |
| 401 on-line | 502 Ring Sig (25,20 Hz) |
| 402 repeat prompt/response | 503 DP in TD |
| 403 repeat previous test results | 504 TT in TD |
| 404 repeat previous test | |
| 411 terminate all testing | |
| 413 TLP data base loading | |
| 414 dial-back telephone # data | |
| 415 self-test/diagnostics | |
| 000 sign-off/good-bye | |
| Electrical Measurement | Listen/Mon |
| 601 bridge voltage | 701 bridge monitor high impedance |
| 602 bridge resistance | |
| 603 bridge capacitance | 702 bridge talk and monitor |
| 604 bridge current | |
| 611 split voltage | 711 monitor listen low impedance |
| 612 split resistance | |
| 613 split capacitance | 712 split talk/listen |
| 614 split current | |
| Transmission | Term/Leave |
| 801 send tone | 901 terminate |
| 802 send level adjust | 902 restore |
| 803 measure level | |
| 804 C-message noise | |
| 807 remove tone | |
| 810 select frequency | |
| 812 measure C-notch | |
| 813 3K flat | |
| 814 15K flat | |
| 815 program | |

The following table lists the vocabulary stored within the preferred embodiment of the present invention for use in verbalizing the prompts and test results to the tester:

| A | five | nine | self |
|---|---|---|---|
| access | flat | notch | side |
| at | four | number | six |
| B | ground | off | this |
| C | hello | on | telephone |
| check | hertz | ohms | terminate (ed) |
| command | identification | one | test |
| continue | is | page | thank you |
| D | K | pass | three |
| eight | level | pico | tip |
| error | megohms | please | to |
| enter | message | point | tone |
| equipment | micro | program | two |
| facility | milliamps | R | volts |
| fail | minus | restore (ed) | warning |
| farads | monitor | ring | your |
| frequency | N | send | zero |
| fifteen | nano | seven | |

Although the foregoing description has been made with reference to an environment wherein the present invention is used with a SARTS/SMAS system, the present invention can be used in other environments such as in a stand-alone capacity with commands simply received from, and test results reported to, a tester using a DTMF telephone set. Another example of an environment within which the present invention can be used includes use with a manual test board of a type as known to the art. From the foregoing specific scenario describing the operation of the present invention, it is also apparent that the preferred embodiment of the present invention is specifically suitable for stand-alone operation for permitting remote accessing and testing of 2-wire or 4-wire special services or private line circuits. This function is generally accomplished with the preferred embodiment being located within offices where the quantities of those types of circuits preclude the justification of a typical mechanized test access system with remote testing, such as the SARTS/SMAS system. However, another application for the preferred embodiment of the present invention is enlarged subscriber installations where subscriber carrier facilities, such as the SLC-96, are installed at the customer's premises. In this use, the apparatus 10 is installed at the demarcation point to provide remote testing from the analog side of the demarcation point. It is contemplated that the present invention can be adapted for use in other environments, both within and without the described telephone system.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts and the performance of steps can be made by those skilled in the art, which changes are encompassed within the spirit of this invention as defined by the appended claims.

What is claimed is:

1. A test system for testing from a test site a selectable one of a plurality of electrical circuits, comprising:

testing means, connectible to the plurality of electrical circuits, for receiving a control signal from the test site and for generating and applying a test signal to the one of the plurality of electrical circuits selected in response to the control signal from the test site; and synthesized voice means, connected to said testing means, for generating audible speech signals to verbally communicate a result from said testing means to the test site.

2. A test system as defined in claim 1, further comprising:

a push-button telephone set, disposed at the test site and switchably connected to said testing means and said synthesized voice means, having dual tone multiple frequency means for generating said control signal and having receiver means for receiving and audibly communicating said speech signals.

3. A test system for testing, from a remote site, a selectable one of a plurality of telephone system circuits passing through a common site located remotely from the remote site, but connected with the remote site by a communications circuit, said system comprising:

signal generating means, disposed at the remote site and connected to the communications circuit, for generating a first frequency-encoded control signal to select one of the plurality of telephone circuits to be tested and for generating a second frequency-encoded control signal to select a type of test to be performed on the selected circuit, said signal generating means including transmitter means for transmitting selectable dual tone multiple frequency signals as said first and second control signals;

frequency-encoded communication means, disposed at the common site and connected with the communications circuit, for establishing two-way communication with said signal generating means so that said first and second control signals are received therefrom and so that responses can be communicated thereto;

test means, disposed at the common site and connected with said frequency-encoded communication means, for generating a test signal in response to said second control signal and for controlling said frequency-encoded communication means to provide said responses; and selector means, disposed at the common site and connected with said test means and said frequency-encoded communication means, for communicating said test means with the selected circuit in response to said first control signal so that said test signals are imposed on the selected circuit in response to said second control signal.

4. A system as defined in claim 3, wherein said transmitter means includes a push-button telephone set.

5. A system as defined in claim 4, wherein said frequency-encoded communication means includes means, responsive to said test means, for generating speech synthesized signals so that said responses are communicated through said telephone set as audible voice signals.

6. A system as defined in claim 3, wherein said frequency-encoded communication means includes means, responsive to said test means, for generating speech synthesized signals so that said responses are communicated through said signal generating means as audible voice signals.

7. A system as defined in claim 3, wherein:

said second control signal represents a single multiple-digit number;

said test means includes:

analog signal processor means for generating a plurality of analog signals;

control means, responsive to said single number of said second control signal, for controlling said analog signal processor means so that a selectable one of said analog signals is output from said analog signal processor means as said test signal in response to said single number.

8. A system as defined in claim 7, wherein said control means further includes signal measurement means for detecting an analog response to said test signal and for converting the analog response into a digital signal and means for digitally computing the magnitude of said analog response from said digital signal.

9. A system as defined in claim 3, wherein said test means includes:

analog signal processor means for generating a plurality of analog signals;

means for operating said analog signal processor means in response to said second control signal;

analog signal measurement means for converting analog responses received from the selected circuit into corresponding digital signals; and means for operating said frequency-encoded communication means in response to said digital signals from said analog signal measurement means.

10. An apparatus located at a common site for testing a selectable one of a plurality of electrical circuits which at least pass through the common site, comprising:

an analog bus network through which analog electrical signals are communicated;

a digital bus network through which digital electrical signals are communicated;

first interface means, connected to said analog bus network and said digital bus network, for receiving through said analog bus network analog control signals;

control means, connected to said digital bus network, for generating digital control signals in response to said analog control signals;

analog test signal generating means, connected to said analog bus network and said digital bus network, for generating analog test signals with which to test the electrical circuits in response to said digital control signals;

second interface means, connected to said analog bus network and said digital bus network, for communicating said analog test signals to one of the electrical circuits selected in response to said digital control signals; and wherein:
said control means includes means for digitally determining a result from said analog test signals communicated by said second interface means; and said first interface means includes means for verbally communicating said result.

11. An apparatus as defined in claim 10, wherein said analog control signals are characterized as dual tone multiple frequency signals.

12. An apparatus as defined in claim 11, wherein said means for verbally communicating said result includes speech synthesizing means, responsive to said control means, for transferring said result by speech synthesizing signals.

13. An apparatus as defined in claim 12, wherein said control means includes evolutionary data base means for automatically updating and maintaining a current base of communications operating information.

14. An apparatus as defined in claim 10, wherein said means for verbally communicating said result includes speech snythesizing means, responsive to said control means, for transferring said result by speech synthesizing signals.

15. An apparatus as defined in claim 10, wherein said control means includes evolutionary data base means for automatically updating and maintaining a current base of communications operating information.

16. An apparatus as defined in claim 10, wherein:
said analog bus network includes connector means for connecting a push-button telephone set circuit to said first interface means; and
said means for verbally communicating said result includes transmitter means for transmitting voice analog signals through said connector means so that said result is received through said push-button telephone set circuit as verbalized numerical data.

17. An apparatus as defined in claim 16, wherein said control means includes:
memory means for storing first data representing a predetermined transmission level at which said apparatus is to communicate with said telephone set circuit; and
update means for storing in said memory means second data, representing a selected transmission level different from said predetermined transmission level, when said second data is received in response to said analog control signals and for subsequently automatically using said second data instead of said first data until said control means is otherwise instructed through said analog control signals.

18. A method of remotely controlling the testing of a selectable one of a plurality of circuits within a telephone system, comprising:
transmitting a plurality of control signals from a remote site;
receiving the control signals at a local site having access to the plurality of circuits;
selecting at the local site one of the circuits in response to the control signals;
generating at the local site at least one test signal in response to the received control signals;
communicating at the local site the at least one test signal to the selected circuit;
monitoring at the local site the selected circuit for a response to the at least one test signal;
measuring at the local site a response detected during the step of monitoring the selected circuit;
generating at the local site an answer based on the measured response; and
communicating the answer to the remote site by synthesized voice signals.

19. A method as defined in claim 18, wherein the step of transmitting includes generating at the remote site a plurality of dual tone multiple frequency signals and communicating the dual tone multiple frequency signals to the local site.

20. A method as defined in claim 19, wherein the step of generating a plurality of dual tone multiple frequency signals includes depressing a plurality of keys on a push-button telephone set in respective predetermined sequences to define the control signals.

* * * * *